US010483582B2

(12) United States Patent
Chiang et al.

(10) Patent No.: US 10,483,582 B2
(45) Date of Patent: *Nov. 19, 2019

(54) SEMI-SOLID ELECTRODES HAVING HIGH RATE CAPABILITY

(71) Applicant: 24M Technologies, Inc., Cambridge, MA (US)

(72) Inventors: Yet-Ming Chiang, Weston, MA (US); Mihai Duduta, Somerville, MA (US); Richard Holman, Wellesley, MA (US); Pimpa Limthongkul, Boston, MA (US); Taison Tan, Cambridge, MA (US)

(73) Assignee: 24M Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,179

(22) Filed: Oct. 24, 2017

(65) Prior Publication Data
US 2018/0175428 A1   Jun. 21, 2018

Related U.S. Application Data

(63) Continuation of application No. 15/148,048, filed on May 6, 2016, now Pat. No. 9,831,518, which is a (Continued)

(51) Int. Cl.
*H01M 8/18* (2006.01)
*H01M 8/20* (2006.01)
(Continued)

(52) U.S. Cl.
CPC ........... *H01M 8/188* (2013.01); *H01M 4/382* (2013.01); *H01M 4/62* (2013.01); *H01M 8/20* (2013.01); *H01M 10/36* (2013.01)

(58) Field of Classification Search
CPC .......... H01M 8/188; H01M 8/20; H01M 8/18; H01M 8/225; H01M 4/485; H01M 4/62; H01M 4/382; H01M 10/36
See application file for complete search history.

(56) References Cited

U.S. PATENT DOCUMENTS

| 3,255,046 A | 6/1966 | Ghormley |
| 3,360,401 A | 12/1967 | Grasselli |

(Continued)

FOREIGN PATENT DOCUMENTS

| CN | 1209219 | 2/1999 |
| CN | 1372703 | 10/2002 |

(Continued)

OTHER PUBLICATIONS

Office Action for U.S. Appl. No. 13/872,613, dated Jul. 14, 2014, 18 pages.

(Continued)

*Primary Examiner* — Sarah A. Slifka
*Assistant Examiner* — Lilia Nedialkova
(74) *Attorney, Agent, or Firm* — Cooley LLP

(57) ABSTRACT

Embodiments described herein relate generally to electrochemical cells having high rate capability, and more particularly to devices, systems and methods of producing high capacity and high rate capability batteries having relatively thick semi-solid electrodes. In some embodiments, an electrochemical cell includes an anode and a semi-solid cathode. The semi-solid cathode includes a suspension of an active material of about 35% to about 75% by volume of an active material and about 0.5% to about 8% by volume of a conductive material in a non-aqueous liquid electrolyte. An ion-permeable membrane is disposed between the anode and the semi-solid cathode. The semi-solid cathode has a thickness of about 250 μm to about 2,000 μm, and the electro- (Continued)

chemical cell has an area specific capacity of at least about 7 mAh/cm$^2$ at a C-rate of C/4. In some embodiments, the semi-solid cathode slurry has a mixing index of at least about 0.9.

23 Claims, 20 Drawing Sheets

Related U.S. Application Data continuation of application No. 14/719,566, filed on May 22, 2015, now Pat. No. 9,362,583, which is a continuation of application No. PCT/US2013/075106, filed on Dec. 13, 2013, which is a continuation-in-part of application No. 13/872,613, filed on Apr. 29, 2013, now Pat. No. 8,993,159.

(60) Provisional application No. 61/787,382, filed on Mar. 15, 2013, provisional application No. 61/736,798, filed on Dec. 13, 2012.

(51) Int. Cl.
  H01M 4/38 (2006.01)
  H01M 4/62 (2006.01)
  H01M 10/36 (2010.01)

(56) References Cited

U.S. PATENT DOCUMENTS

| | | |
|---|---|---|
| 3,476,602 A | 11/1969 | Brown et al. |
| 3,540,933 A | 11/1970 | Boeke |
| 3,540,934 A | 11/1970 | Boeke |
| 3,551,207 A | 12/1970 | Herbst |
| 3,827,910 A * | 8/1974 | Cairns ............... H01M 4/58 429/206 |
| 3,996,064 A | 12/1976 | Thaller |
| 4,018,971 A | 4/1977 | Sheibley |
| 4,126,733 A | 11/1978 | Doniat |
| 4,159,366 A | 6/1979 | Thaller |
| 4,192,910 A | 3/1980 | Frosch |
| 4,318,969 A | 3/1982 | Peled |
| 4,320,180 A | 3/1982 | Nozaki |
| 4,335,191 A | 6/1982 | Peled |
| 4,352,864 A | 10/1982 | Struthers |
| 4,370,392 A | 1/1983 | Savinell |
| 4,375,501 A | 3/1983 | Peled |
| 4,382,116 A | 5/1983 | Gahn |
| 4,410,609 A | 10/1983 | Peled |
| 4,431,718 A | 2/1984 | Bernard et al. |
| 4,443,522 A | 4/1984 | Struthers |
| 4,456,665 A | 6/1984 | Peled |
| 4,461,815 A | 7/1984 | Peled |
| 4,485,154 A | 11/1984 | Remick et al. |
| 4,517,258 A | 5/1985 | Bronoel |
| 4,576,878 A | 3/1986 | Gahn |
| 4,614,693 A | 9/1986 | Hashimoto et al. |
| 4,755,440 A | 7/1988 | Peled |
| 4,784,924 A | 11/1988 | Savinell et al. |
| 4,814,240 A | 3/1989 | Zaromb |
| 4,956,244 A | 9/1990 | Shimizu et al. |
| 5,061,578 A | 10/1991 | Kozuma et al. |
| 5,079,104 A | 1/1992 | Roche et al. |
| 5,308,718 A | 5/1994 | Eidler |
| 5,368,952 A | 11/1994 | Sonneveld |
| 5,441,820 A | 8/1995 | Siu et al. |
| 5,558,961 A | 9/1996 | Doeff et al. |
| 5,591,538 A | 1/1997 | Eidler |
| 5,600,534 A | 2/1997 | Eidler |
| 5,601,943 A | 2/1997 | Eidler |
| 5,610,802 A | 3/1997 | Eidler |
| 5,638,952 A | 6/1997 | Kim |
| 5,650,239 A | 7/1997 | Lex |
| 5,656,390 A | 8/1997 | Kageyama |
| 5,674,802 A | 10/1997 | Sheppard |
| 5,705,296 A | 1/1998 | Kamauchi et al. |
| 5,759,711 A | 6/1998 | Miyabayashi |
| 5,792,576 A | 8/1998 | Xing et al. |
| 5,837,397 A | 11/1998 | Xing |
| 5,849,427 A | 12/1998 | Siu et al. |
| 5,869,200 A | 2/1999 | Nunnally |
| 5,912,088 A | 6/1999 | Ernst |
| 6,004,445 A | 12/1999 | Genders et al. |
| 6,143,443 A | 11/2000 | Kazacos et al. |
| 6,174,625 B1 | 1/2001 | Yamahira et al. |
| 6,187,479 B1 | 2/2001 | Liu |
| 6,203,947 B1 | 3/2001 | Peled |
| 6,207,322 B1 | 3/2001 | Kelsey et al. |
| 6,242,125 B1 | 6/2001 | Eidler |
| 6,261,714 B1 | 7/2001 | Eidler |
| 6,277,520 B1 | 8/2001 | Moutsios et al. |
| 6,296,958 B1 | 10/2001 | Pinto et al. |
| 6,447,943 B1 | 9/2002 | Peled |
| 6,455,187 B1 | 9/2002 | Tomazic |
| 6,468,688 B2 | 10/2002 | Kazacos |
| 6,492,047 B1 | 12/2002 | Peled |
| 6,497,973 B1 | 12/2002 | Amendola |
| 6,551,745 B2 | 4/2003 | Moutsios et al. |
| 6,555,267 B1 | 4/2003 | Broman et al. |
| 6,562,514 B1 | 5/2003 | Kazacos |
| 6,645,668 B2 | 11/2003 | Etou |
| 6,689,507 B1 | 2/2004 | Tsutsumi et al. |
| 6,720,107 B1 | 4/2004 | Holtom |
| 6,761,945 B1 | 7/2004 | Adachi et al. |
| 6,764,789 B1 | 7/2004 | Sekiguchi |
| 6,811,911 B1 | 11/2004 | Peled |
| 6,979,512 B2 | 12/2005 | Phillips |
| 6,986,966 B2 | 1/2006 | Clarke |
| 7,033,696 B2 | 4/2006 | Clarke |
| 7,078,123 B2 | 7/2006 | Kazacos |
| 7,214,443 B2 | 5/2007 | Clarke et al. |
| 7,252,905 B2 | 8/2007 | Clarke |
| 7,270,911 B2 | 9/2007 | Clarke |
| 7,297,437 B2 | 11/2007 | Clarke |
| 7,320,844 B2 | 1/2008 | Skyllas-Kazacos |
| 7,338,734 B2 | 3/2008 | Chiang et al. |
| 7,412,824 B1 | 8/2008 | Newburry et al. |
| 7,413,824 B2 | 8/2008 | Peled |
| 7,521,149 B2 | 4/2009 | Medeiros |
| 7,560,189 B2 | 7/2009 | Clarke |
| 7,625,663 B2 | 12/2009 | Clarke |
| 8,097,364 B2 | 1/2012 | Reynolds |
| 8,133,629 B2 | 3/2012 | McLean et al. |
| 8,541,138 B2 | 9/2013 | Kazacos et al. |
| 8,722,226 B2 | 5/2014 | Chiang et al. |
| 8,722,227 B2 | 5/2014 | Chiang et al. |
| 8,778,552 B2 | 7/2014 | Chiang et al. |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 2001/0000423 A1 | 4/2001 | Fischer et al. |
| 2001/0028977 A1 | 10/2001 | Kazacos et al. |
| 2001/0055713 A1 | 12/2001 | Eidler et al. |
| 2002/0146618 A1 | 10/2002 | Licht |
| 2003/0022059 A1 | 1/2003 | Ito et al. |
| 2003/0039868 A1 | 2/2003 | Liberatore et al. |
| 2003/0091883 A1 | 5/2003 | Peled et al. |
| 2003/0143456 A1 | 7/2003 | Kazacos et al. |
| 2003/0211377 A1 | 11/2003 | Holmes et al. |
| 2004/0151977 A1 | 8/2004 | Morrisey et al. |

(56) References Cited

U.S. PATENT DOCUMENTS

| | | |
|---|---|---|
| 2004/0191623 A1 | 9/2004 | Kubata et al. |
| 2004/0209153 A1 | 10/2004 | Peled et al. |
| 2004/0234843 A1 | 11/2004 | Skyllas-Kazacos |
| 2004/0234856 A1 | 11/2004 | Morigaki et al. |
| 2004/0241552 A1 | 12/2004 | Skyllas-Kazacos |
| 2005/0069752 A1 | 3/2005 | Tiquet et al. |
| 2005/0175890 A1 | 8/2005 | Tsutsumi et al. |
| 2005/0244707 A1 | 11/2005 | Skyllas-Kazacos et al. |
| 2005/0252786 A1 | 11/2005 | DiMascio |
| 2005/0266298 A1 | 12/2005 | Mitchell et al. |
| 2006/0032046 A1 | 2/2006 | Nathan et al. |
| 2006/0063065 A1 | 3/2006 | Clarke et al. |
| 2006/0183016 A1 | 8/2006 | Kozacos et al. |
| 2006/0194115 A1 | 8/2006 | De Jonghe et al. |
| 2006/0204810 A1 | 9/2006 | Surampudi et al. |
| 2007/0003837 A1 | 1/2007 | Nishimura et al. |
| 2008/0094937 A1 | 4/2008 | Li et al. |
| 2008/0131357 A1 | 6/2008 | Kumar et al. |
| 2008/0142373 A1 | 6/2008 | Joshi et al. |
| 2008/0241629 A1 | 10/2008 | Peled et al. |
| 2008/0292964 A1 | 11/2008 | Kazacos et al. |
| 2009/0017379 A1 | 1/2009 | Inatomi et al. |
| 2009/0032754 A1 | 2/2009 | Pechtold |
| 2009/0159347 A1 | 6/2009 | Zhou et al. |
| 2009/0202903 A1 | 8/2009 | Chiang et al. |
| 2009/0253025 A1 | 10/2009 | Whitacre, Jr. |
| 2010/0047671 A1 | 2/2010 | Chiang et al. |
| 2010/0141211 A1 | 6/2010 | Yazami |
| 2010/0190042 A1 | 7/2010 | Wahl et al. |
| 2010/0248046 A1 | 9/2010 | Kimura et al. |
| 2010/0323244 A1 | 12/2010 | Chiang et al. |
| 2010/0323264 A1 | 12/2010 | Chiang et al. |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2012/0003518 A1 | 1/2012 | Fischel |
| 2012/0164499 A1 | 6/2012 | Chiang et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0154546 A1 | 6/2014 | Carter et al. |
| 2014/0170524 A1 | 6/2014 | Chiang et al. |
| 2014/0248521 A1 | 9/2014 | Chiang et al. |
| 2014/0315097 A1 | 10/2014 | Tan et al. |
| 2015/0024279 A1 | 1/2015 | Tan et al. |
| 2015/0129081 A1 | 5/2015 | Chiang et al. |
| 2015/0140371 A1 | 5/2015 | Slocum et al. |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Hol |
| 2017/0288281 A1 | 10/2017 | Chiang et al. |
| 2018/0034090 A1 | 2/2018 | Chiang et al. |
| 2018/0233708 A1 | 8/2018 | Bazzarella et al. |

FOREIGN PATENT DOCUMENTS

| | | |
|---|---|---|
| CN | 1610155 A | 4/2005 |
| CN | 1623246 | 6/2005 |
| CN | 1697231 | 11/2005 |
| CN | 1838999 | 9/2006 |
| CN | 1319207 | 5/2007 |
| CN | 101110481 A | 1/2008 |
| CN | 101213700 | 7/2008 |
| CN | 201549546 | 8/2010 |
| CN | 102119461 | 7/2011 |
| EP | 0330290 | 5/1996 |
| EP | 1126533 A2 | 8/2001 |
| EP | 1176658 | 1/2002 |
| EP | 1519433 A1 | 3/2005 |
| EP | 3213956 | 9/2017 |
| GB | 2346006 | 7/2000 |
| GB | 2374722 | 10/2002 |
| JP | S57-69663 | 4/1982 |
| JP | S57-121167 | 7/1982 |
| JP | H05-182697 | 7/1993 |
| JP | 2000-502832 | 3/2000 |
| JP | 2002-518795 | 6/2002 |
| JP | 2002-216833 | 8/2002 |
| JP | 2002-536783 | 10/2002 |
| JP | 2006-520520 | 9/2006 |
| JP | 2008-544444 | 12/2008 |
| JP | 2009-224141 | 10/2009 |
| JP | 2009-290116 A | 12/2009 |
| JP | 2010-244972 A | 10/2010 |
| JP | 2011-524074 | 8/2011 |
| JP | 2012-523103 | 9/2012 |
| KR | 10-2003-0072291 | 9/2003 |
| WO | WO 97/24774 | 7/1997 |
| WO | WO 99/065100 | 12/1999 |
| WO | WO 00/44058 A2 | 7/2000 |
| WO | WO 2000/057504 | 9/2000 |
| WO | WO 2004/082056 | 9/2004 |
| WO | WO 2005/008807 | 1/2005 |
| WO | WO 2006/129635 | 12/2006 |
| WO | WO 2006/135958 | 12/2006 |
| WO | WO 2008/128341 | 10/2008 |
| WO | WO 2008/148148 | 12/2008 |
| WO | WO 2009/010051 | 1/2009 |
| WO | WO 2009/151639 | 12/2009 |
| WO | WO 2010/118060 | 10/2010 |
| WO | WO 2011/084649 | 7/2011 |
| WO | WO 2011/127384 | 10/2011 |
| WO | WO 2012/024499 | 2/2012 |
| WO | WO 2012/083233 | 6/2012 |
| WO | WO 2012/088442 | 6/2012 |
| WO | WO 2014/093876 | 6/2014 |

OTHER PUBLICATIONS

Office Action for U.S. Appl. No. 13/872,613, dated Aug. 26, 2013, 13 pages.

Office Action for U.S. Appl. No. 13/872,613, dated Feb. 25, 2014, 20 pages.

Notification of the First Office Action for Chinese Application No. 201380065437.7, dated Nov. 2, 2016, 15 pages.

Supplementary European Search Report for European Application No. 13863650.1, dated Jul. 6, 2016, 8 pages.

Office Action for European Application No. 13863650.1, dated Jun. 30, 2017, 5 pages.

Notice of Reasons for Rejection for Japanese Application No. 2015-548008, dated Sep. 26, 2017, 4 pages.

Office Action for U.S. Appl. No. 14/719,566, dated Dec. 17, 2015, 11 pages.

International Search Report and Written Opinion for International Application No. PCT/US2013/075106, dated Apr. 14, 2014, 9 pages.

(56) References Cited

OTHER PUBLICATIONS

Office Action for U.S. Appl. No. 14/597,869, dated Jun. 30, 2015, 6 pages.
Office Action for U.S. Appl. No. 14/875,076, dated Dec. 18, 2015, 8 pages.
Office Action for U.S. Appl. No. 15/148,048, dated Nov. 17, 2016, 20 pages.
Office Action for U.S. Appl. No. 15/148,048, dated May 19, 2017, 11 pages.
Office Action for U.S. Appl. No. 15/174,172, dated Nov. 30, 2016, 19 pages.
Office Action for U.S. Appl. No. 15/174,172, dated May 19, 2017, 11 pages.
International Search Report and Written Opinion for International Application No. PCT/US2010/030136, dated Jul. 20, 2010, 8 pages.
Office Action for U.S. Appl. No. 14/306,610, dated Feb. 13, 2015, 7 pages.
Office Action for U.S. Appl. No. 12/970,773, dated Jun. 13, 2013, 6 pages.
Office Action for Chinese Application No. 201180066814.X, dated Mar. 30, 2015, 17 pages.
Office Action for European Application No. 11848843.6, dated Jun. 19, 2015, 6 pages.
Supplementary European Search Report for European Application No. 11848843.6, dated Aug. 21, 2014, 10 pages.
Office Action for European Application No. 11848843.6, dated Jan. 22, 2016, 6 pages.
Office Action for Japanese Application No. 2013-544843, dated Nov. 10, 2015, 2 pages.
Notification of Reasons for Refusal for Japanese Application No. 2013-544843, dated Oct. 18, 2016, 2 pages.
Office Action for U.S. Appl. No. 14/002,304, dated May 5, 2016, 12 pages.
International Search Report and Written Opinion for International Application No. PCT/US2011/065615, dated Apr. 23, 2012, 8 pages.
Office Action for Chinese Application No. 201610083000.1, dated Jul. 4, 2017, 15 pages.
Supplementary European Search Report for European Application No. 16182033.7, dated Apr. 11, 2017, 15 pages.
Office Action for Japanese Application No. 2016-094560, dated Jul. 4, 2017, 4 pages.
Office Action for U.S. Appl. No. 14/276,723, dated Sep. 11, 2014, 5 pages.
Office Action for U.S. Appl. No. 14/840,810, dated Sep. 11, 2017, 6 pages.
Office Action for Canadian Application No. 2,727,399, dated Aug. 11, 2015, 3 pages.
Office Action for Canadian Application No. 2,727,399, dated Jun. 8, 2016, 3 pages.
Office Action for Chinese Application No. 200980127051.8, dated Aug. 14, 2013, 11 pages.
Office Action for Chinese Application No. 200980127051.8, dated Dec. 26, 2012, 16 pages.
Office Action for Chinese Application No. 200980127051.8, dated Feb. 12, 2015, 17 pages.
Office Action for Chinese Application No. 200980127051.8, dated Nov. 24, 2015.
Office Action for European Application No. 09762935.6, dated Feb. 21, 2013, 3 pages.
Office Action for European Application No. 09762935.6, dated Sep. 27, 2011, 4 pages.
Office Action for Japanese Application No. 2011-513506, dated Jul. 29, 2013, 3 pages.
Office Action for Korean Application No. 10-2011-7000724, dated Aug. 28, 2015.
Office Action for Korean Application No. 10-2011-7000724, dated Jul. 11, 2016, 1 page.
International Search Report and Written Opinion for International Application No. PCT/US2009/003551, dated Sep. 21, 2009, 16 pages.
International Preliminary Report on Patentability for International Application No. PCT/US2009/003551, dated Dec. 23, 2010, 11 pages.
Supplementary European Search Report for European Application No. 13187507.2, dated Dec. 9, 2013, 8 pages.
Office Action for Japanese Application No. 2014-014830, dated Feb. 25, 2016, 5 pages.
European Search Report for European Application No. 17163848.9, dated Jun. 14, 2017, 8 pages.
Office Action for Canadian Application No. 2,784,745, dated Nov. 21, 2016, 4 pages.
Office Action for Canadian Application No. 2,784,745, dated Aug. 30, 2017, 3 pages.
Office Action for Chinese Application No. 201080063874.1, dated Apr. 24, 2014.
Supplementary European Search Report for European Application No. 10842630.5, dated Mar. 12, 2014, 6 pages.
Office Action for Japanese Application No. 2012-544855, dated Dec. 22, 2014.
Office Action for Japanese Application No. 2012-544855, dated Sep. 30, 2015, 5 pages.
Office Action for U.S. Appl. No. 12/970,753, dated Jul. 1, 2014, 9 pages.
Office Action for U.S. Appl. No. 12/970,753, dated Feb. 12, 2015, 11 pages.
Office Action for U.S. Appl. No. 12/970,753, dated Jun. 10, 2016, 9 pages.
International Search Report and Written Opinion for International Application No. PCT/US2010/060876, dated May 23, 2011, 9 pages.
International Preliminary Report on Patentability for International Application No. PCT/US2010/060876, dated Jun. 28, 2012, 7 pages.
Notification of the First Office Action for Chinese Application No. 201410526190.0, dated Aug. 18, 2016, 19 pages.
Office Action for Japanese Application No. 2015-059248, dated Jan. 13, 2016, 2 pages.
Office Action for U.S. Appl. No. 13/975,474, dated Jan. 30, 2014, 23 pages.
Notice of Allowance for U.S. Appl. No. 13/975,474, dated Mar. 4, 2014, 13 pages.
International Search Report and Written Opinion for International Application No. PCT/US2011/031748, dated Aug. 24, 2011, 8 pages.
International Preliminary Report on Patentability for International Application No. PCT/US2011/031748, dated Oct. 18, 2012, 6 pages.
International Search Report and Written Opinion for International Application No. PCT/US2011/048266, dated Nov. 23, 2011, 11 pages.
International Preliminary Report on Patentability for International Application No. PCT/US2011/048266, dated Feb. 28, 2013, 9 pages.
Amatucci, G. G. et al., "Fluoride based electrode materials for advanced energy storage devices," Journal of Fluorine Chemistry, 128(4):243-262 (2007).
Amatucci, G. G., "Battery Materials and Issues for Grid Applications," Rutgers, Department of Material Science and Engineering, Stanford University Global Climate & Energy Project, Nov. 2, 2007, http://gcep.stanford.edu/pdfs/iq9b0/11bOrRuH/veOA2jA/Amatucci-20071102, 33 pages.
Armand, M. et al., "Conjugated dicarboxylate anodes for Li-ion batteries," Nature Materials, 8:120-125 (2009).
Asgeirsson, H., "Zinc Bromine Flow Battery at Detroit Edison Utility Application," California Energy Commission Workshop, Feb. 24, 2005, DTE Energy, 35 pages.
Badway, F. et al., "Carbon-Metal Fluoride Nanocomposites," Journal of the Electrochemical Society, 150(9):A1209-A1218 (2003).
Badway, F. et al., "Carbon-Metal Fluoride Nanocomposites: High-Capacity Reversible Metal Fluoride Conversion Materials as Recharge-

(56) References Cited

OTHER PUBLICATIONS able Positive Electrodes for Li Batteries," Journal of the Electrochemical Society, 150(10):A1318-A1327 (2003).
Badway, F. et al., "Structure and Electrochemistry of Copper Fluoride Nanocomposites Utilizing Mixed Conducting Matrices," Chem. Mater., 19:4129-4141 (2007).
Bae, C.-H. et al., "Chromium redox couples for application to redox flow batteries," Electrochimica Acta, 48:279-287 (2002).
Bartolozzi, M., "Development of Redox Flow Batteries. A Historical Bibliography," Journal of Power Sources, 27:219-234 (1989).
Bazylak, A. et al., "Improved fuel utilization in microfluidic fuel cells. A computational study," Journal of Power Sources, 143:57-66 (2005).
Bervas, M. et al., "Bismuth Fluoride Nanocomposite as a Positive Electrode Material for Rechargeable Lithium Batteries," Electrochemical and Solid-State Letters, 8(4):A179-A183 (2005).
Bervas, M. et al., "Investigation of the Lithiation and Delithiation Conversion Mechanisms in a Bismuth Fluoride Nanocomposites," Journal of the Electrochemical Society, 153(4):A799-A808 (2006).
Bervas, M. et al., "Reversible Conversion Reactions with Lithium in Bismuth Oxyfluoride Nanocomposites," Journal of the Electrochemical Society, 153(1):A159-A170 (2006).
Cellennium (Thailand) Company Limited, Technology, "Basic Principle of the Vandium Fuel Cell," http://www.vandiumbattery.com/technology.asp, Retrieved from the Internet: Apr. 12, 2009, 2 pages.
Chakrabarti, M. H., "Evaluation of electrolytes for redox flow battery applications," Electrochemica Acta, 52:2189-2195 (2007).
Chan, C. K. et al., "High-performance lithium battery anodes using silicon nanowires," Nature Nanotechnology, 3:31-35 (2008).
Chen, Y-W D. et al., "Solution Redox Couples for Electrochemical Energy Storage," J. Electrochem. Soc., 128(7):1460-1467 (1981).
Chung et al., "Electronically conductive phospho-olivines as lithium storage electrodes," Nat Mater. Oct. 2002;1(2):123-128.
Cosandey, F. et al., "EELS Spectroscopy of Iron Fluorides and $FeF_x/C$ Nanocomposite Electrodes Used in Li-Ion Batteries," Microscopy and Microanalysis, 13(2):87-95 (2007).
Davidson, P., "New battery packs powerful punch," USA Today, Jul. 4, 2007, 3 pages.
De Boer, P. et al., "Briefing Paper: Flow Batteries," KEMA, Jun. 2007, Leonardo Energy, 9 pages.
Definition of "paste", Oxford University Press (2015).
De Leon, C. P. et al., "Redox Flow Cells for Energy Conversion," Journal of Power Sources, 160:716-732 (2006).
Department of Energy Tutorial, "II. Energy Storage Technology Overview," http://www.netl.doe.gov/technolgies/coalpower/fuelcells/seca/tutoriai/TutorialII/files/TutorialII, Courtesy: Energy Storage Association (ESA), 61 pages.
DTI, Regenesys Utility Scale Energy Storage, Project Summary, Contract No. K/EL/00246/00/00, URN No. 04/1048, (2004), 20 pages.
Duduta, M. et al., "Semi-Solid Lithium Rechargeable Flow Battery," Advanced Energy Materials. 1(4):511-516 (2011).
Endo, A. et. al., "Electrochemistry of Tris(β-diketonato)ruthenium(III) Complexes at Platinum Electrodes in Nonaqueous Solutions and Substituent Effects on their Rreversible Half-Wave Potentials," Bulletin of the Chemical Society of Japan, 62(3): 709-716 (1989).
Erol, M. et al., "Assessment of the Degree of Mixedness of Filled Polymers," Intern. Polymer Processing XX, 3:228-237 (2005).
"Flow Cell Battery Recharges Power Grid," Advanced Battery Technology, Apr. 2003, http://findarticles.com/p/articles/mi/qa3864/is/200304/ai/n9167647/.pdf, 4 pages.
EscoVale Consultancy Services, "Flow/Redox Batteries: Technologies, Applications and Markets," The New Management Report #5061, No date given, 8 pages.
Garrard, A. et al., "Numerical model of a single phase, regenerative fuel cell," Fuel Cell Science, Engineering and Technology, The Second International Conference on Fuel Cell Science, Jun. 14-16, 2004, Rochester, NY, The American Society of Mechanical Engineers, The Rochester Institute of Technology, p. 79-84.

Giridharan, M. G. et al., "Computational simulation of microfluidics, electrokinetics, and particle transport in biological mems devices," In Proceedings of SPIE, Part of the Symposium on Design, Test, and Microfabrication of MEMS and MOEMS, Paris, France, Mar.-Apr. 1999, pp. 150-160.
"High System-Power Density Flow Battery for Advanced Modular, Energy Storage Technology," Navy SBIR FY2009.1, Proposal No. N091-053-0414, http://www.navysbir.com/09_1/179.htm, Retrieved from the Internet: Apr. 12, 2009, 2 pages.
Hong, C-C et al., "A novel in-plane passive microfluidic mixer with modified Tesla structures," The Royal Society of Chemistry Lab Chip, 4:109-113 (2004).
Huang et al., "Preparation and electrochemical performance of Ag doped $Li_4Ti_5O_{12}$," Electrochemistry Communications Nov. 2004;6(110):1093-1097.
Johnson, T. J. et al., "Characterization and optimization of slanted well designs for microfluidic mixing under electroosmotic flow," The Royal Society of Chemistry Lab Chip, 2(3):135-140 (2002).
Jossen, A. et al., "Advances in redox-flow batteries," First International Renewable Energy Storage Conference, Gelsenkirchen, Germany, Oct. 30-31, 2006, 23 pages.
Katz, E. et al., "Chapter 21: Biochemical Fuel Cells," in Handbook of Fuel Cells—Fundamentals, Technology and Applications, vol. 1: Fundamentals and Survey of Systems, Vielstich et al. (eds.) John Wiley & Sons (2003), 27 pages.
Kinchin, G. H., "The Electrical Properties of Graphite," Proceedings of the Royal Society A, Mathematical, Physical and Engineering Sciences Mar. 24, 1953; 217(1128):9-26.
Koo, J. et al., "Liquid flow in microchannels: experimental observations and computational analyses of microfluidics effects," Journal of Micromechanics and Microengineering, 13(5):568-579 (2003).
Kumar, A. et al., "Effect of channel dimensions and shape in the flow-field distributor on the performance of polymer electrolyte membrane fuel cells," Journal of Power Sources, 113:11-18 (2003).
Kuntz, M. T., "Flow battery storage application with wind power," California Energy Commission Staff, Workshop: Meeting California's electricity system challenges through electricity energy storage, Feb. 24, 2005, VRB Power Systems Inc., 15 pages.
Lee, Y. J. et al., "Fabricating Genetically Engineered High-Power Lithium-Ion Batteries Using Multiple Virus Genes," Science, 324:1051-1055 (2009).
Leonidov, I. A. et al., "Structure, Iconic Conduction, and Phase Transformations in Lithium Titanate $Li_4Ti_5O_{12}$," Physics of the Solid State, vol. 45, No. 11, 2003, pp. 2183-2188. Translated from Fizika Tverdogo Tela, vol. 45, No. 11, 2003, pp. 2079-2085.
Li, H. et al., "Li-Storage via Heterogeneous Reaction in Selected Binary Metal Fluorides and Oxides," Journal of Electrochemical Society, 151(11):A1878-A1885 (2004).
Li, W. et al., "Rechargeable Lithium Batteries with Aqueous Electrolytes," Science, 264:1115-1118 (1994).
Lithium, U.S. Geological Survey, Mineral Commodity Summaries, Jan. 2010, p. 93.
Medeiros, M. G. et al., "Magnesium-Solution Phase Catholyte Semi-Fuel Cell for Undersea Vehicles," Selected papers presented at the International Power Sources Symposium, Journal of Power Sources, 136(2):226-231 (2004) Abstract.
Miley, G. H. et al., "Optimization of the $H_2O_2$—$NaBH_4$ Regenerative Fuel Cell for Space Power Applications Using FEMLAB Modeling," Excerpt from the Proceedings of the COMSOL Multiphysics User's Conference, Boston (2005), http://cds.comsol.com/access/dl/papers/1090/Miley.pdf, 6 pages.
Molenda, J. et al., "Modification in the electronic structure of cobalt bronze $Li_xCoO_2$ and the resulting electrochemical properties," Solid State Ionics, 36:53-58 (1989).
Morikawa, H. et al., "Development and Advances of a V-Flow FC Stack for FCX Clarity," SAE Int. J. Engines, 2(1):955-959 (2009).
Nakahara, K. et al. "Rechargeable batteries with organic radical cathodes," Chemical Physics Letters, 359:351-354 (2002).
Nam, K. T. et al., "Virus-enabled synthesis and assembly of nanowires for lithium ion battery electrodes," Science, 312(5775):885-888 (2006).
Nishide, H. et al., "Organic radical battery: nitroxide polymers as a cathode-active material," Electrochimica Acta, 50:827-831 (2004).

(56) References Cited

OTHER PUBLICATIONS

Officer, C., "Better rechargable batteries," Anzode (NZ) Ltd., Anzode Clean Energy Solutions, 2009, 13 pages.
Peek, G., "Evaluation of utility scale system," TVA Regenesys Flow Battery Demonstration, Sandia National Laboratories, Oct. 30, 2003, 18 pages.
Pereira, N. et al., "Iron Oxyfluorides as High Capacity Cathode Materials for Lithium Batteries," Journal of the Electrochemical Society, 156(6):A407-A416 (2009).
Pillai, K. C. et al., "Studies on Promising Cell Performance with $H_2SO_4$ as the Catholyte for Electrogeneration of $AG^{2+}$ from $AG^+$ in $HNO_3$ Anolyte in Mediated Electrochemical Oxidation Process," J. Appl. Electrochem, 39:23-30 (2009).
Plitz, I. et al., "Structure and Electrochemistry of Carbon-Metal Fluoride Nanocomposites Fabricated by a Solid State Redox Conversion Reaction", Journal of the Electrochemical Society, 152(2):A307-A315 (2005).
Plurion Technology Platform, Flow Batteries Vs. Conventional Batteries, Plurion Advantages Webpage, web.archive.org/web/20100623000411/http://plurionsystems.com/tech_flow_advantages.html, Retrieved from the Internet: Jun. 23, 2010, 2 pages.
Plurion Technology Platform, Flow Batteries Vs. Conventional Batteries, Plurion Advantages Webpage, web.archive.org/web/20080514160556/http://plurionsystems.com/tech_flow_advantages.html, Retrieved from the Internet: May 14, 2008, 2 pages.
Ponce De Leon, C. et al., "Redox flow batteries for energy conversion," Journal of Power Sources, 160(1):716-732 (2006).
Price, A. et al., "The Regenesys Utility-Scale Flow Battery Technology: Flow Battery Technologies for Electrical Energy Storage," VDI Berichte Nr., 1734:47-56 (2002).
Ruffo, R. et al., "Electrochemical behavior of $LiCoO_2$ as aqueous lithium-ion battery electrodes," Electrochemistry Communications, 11:247-249 (2009).
Rydh, C. J. et al., "Energy analysis of batteries in photovoltaic systems," EESAT, San Francisco, CA, Oct. 27-29, 2003, 6 pages.
Rydh, C. J. et al., "Energy analysis of batteries in photovoltaic systems. Part 1: Performance and energy requirements," Energy Conversion and Management, 46:1957-1979 (2005).
Rydh, C. J. et al., "Energy analysis of batteries in photovoltaic systems. Part II: Energy return factors and overall battery efficiencies," Energy Conversion and Management, 46:1980-2000 (2005).
Skyllas-Kazacos, M., "Efficient Vanadium Redox Flow Cell," Journal of the Electrochemical Society, 134(12):2950-2953 (1987).
Thaller, L. H., "Cleantech Energy Storage Blog: Redox Flow Batteries . . . Then and Now (Part 1 )," posted Sep. 4, 2008, http://www.deeyaenergy.com/blog/bid/5225/Redox-Flow-Batteries-Then-And-Now-Part-1, accessed Apr. 12, 2009, 4 paqes.
Thomas, M. H., "Persistence and progress: The zinc bromine battery," ZBB Energy Corporation, No date given, 27 pages.
VRB Power Systems Inc., News Release, "USF and Progress Energy Florida Purchase Two 5kW x 4hr VRB Energy Storage Systems," Jul. 25, 2007, 2 pages.
Walsh, F. C., "Electrochemical technology for environmental treatment and clean energy conversion," Pure Appl. Chem., 73(12):1819-1837 (2001).
Wang, H. et al., "Optimizing layout of obstacles for enhanced mixing in microchannels," Smart Materials and Structures, 11(5):662-667 (2002).
Wen, Y. H. et al., "A study of the Fe(III)/Fe(II)-triethanolamine complex redox couple for redox flow battery application," Electrochimica Acta, 51:3769-3775 (2006).
Yamamura, T. et. al., "Enhancements in the electron transfer kinetics of uranium-based redox couples induced by tetraketone ligands with potential chelate effect," Journal of Physical Chemistry, 111:18812-18820 (2007).
Yu, D. Y. W. et al., "Effect of electrode parameters on $LiFePO_4$ cathodes," Journal of the Electrochemical Society, 153(5):A835-A839 (2006).
ZBB Energy Corporation, "ZBB Energy aims for sales of up to US$38m in zinc bromine batteries form new Chinese joint venture," Media Release, Mar. 30, 2005, 2 pages.
ZBB Energy Corporation, "The ZBB is the best battery for renewable energy storage!," No date given, 42 pages.
Office Action for Canadian Application No. 2,822,069, dated Dec. 15, 2017, 4 pages.
Office Action for Korean Application No. 10-2013-7018406, dated Apr. 19, 2018, 36 pages.
Office Action for European Application No. 16182033.7, dated Mar. 14, 2018, 8 pages.
Office Action for European Application No. 16182033.7, dated Aug. 13, 2018, 9 pages.
Office Action for Japanese Application No. 2016-094560, dated Mar. 6, 2018, 4 pages.
Office Action for U.S. Appl. No. 14/840,810, dated Jun. 25, 2018, 18 pages.
Office Action for Chinese Application No. 201610534399.0, dated May 2, 2018, 11 pages.
Office Action for Korean Application No. 10-2012-7018384, dated Mar. 16, 2017, 6 pages.
Office Action for Korean Application No. 10-2012-7018384, dated Jul. 5, 2017, 2 pages.
Second Office Action for Chinese Application No. 201410526190.0, dated Jun. 30, 2017, 6 pages.
Horiba Instruments, Inc., "A guidebook to particle size analysis," [Online], Jan. 1, 2010 (Jan. 1, 2010), pp. 1-30, XP002682130. Retrieved from the Internet: <URL: http://www.horiba.com/fileadmin/uploads/Scientific/Documents/PSA/PSA_Guidebook.pdf>, 2010, 17 pages.
Office Action for European Application No. 13863650.1, dated Oct. 25, 2018, 6 pages.
Office Action for Indian Application No. 2023/KOLNP/2013, dated Oct. 12, 2018, 6 pages.
Office Action for European Application No. 13863650.1, dated Jun. 14, 2019, 4 pages.
Office Action for Indian Application No. 5507/DELNP/2015, dated Jul. 12, 2019, 6 pages.

* cited by examiner

SEMI-SOLID ELECTRODES HAVING HIGH RATE CAPABILITY

CROSS-REFERENCE TO RELATED APPLICATIONS

This application is a continuation of U.S. patent application Ser. No. 15/148,048, filed May 6, 2016, entitled "Semi-Solid Electrodes Having High Rate Capability," which is a continuation of U.S. patent application Ser. No. 14/719,566, filed May 22, 2015, now U.S. Pat. No. 9,362,583, entitled "Semi-Solid Electrodes Having High Rate Capability," which is a continuation of international patent application PCT/US2013/075106, filed Dec. 13, 2013, entitled "Semi-Solid Electrodes Having High Rate Capability," which is a continuation-in-part of and claims priority to U.S. patent application Ser. No. 13/872,613, filed Apr. 29, 2013, now U.S. Pat. No. 8,993,159, entitled "Semi-Solid Electrodes Having High Rate Capability," which claims priority to and the benefit of U.S. Provisional Application No. 61/736,798, filed Dec. 13, 2012, and U.S. Provisional Application No. 61/787,382, filed Mar. 15, 2013, the disclosures of each of which are hereby incorporated by reference in their entirety.

STATEMENT REGARDING FEDERALLY SPONSORED RESEARCH OR DEVELOPMENT

This invention was made with government support under Grant Number DE-AR0000102 awarded by the Department of Energy. The government has certain rights in the invention.

BACKGROUND

Embodiments described herein relate generally to electrochemical cells having high rate capability, and more particularly to devices, systems and methods of producing high capacity and high rate capability batteries having relatively thick semi-solid electrodes.

Batteries are typically constructed of solid electrodes, separators, electrolyte, and ancillary components such as, for example, packaging, thermal management, cell balancing, consolidation of electrical current carriers into terminals, and/or other such components. The electrodes typically include active materials, conductive materials, binders and other additives.

Some known methods for preparing batteries include coating a metallic substrate (e.g., a current collector) with slurry composed of an active material, a conductive additive, and a binding agent dissolved or dispersed in a solvent, evaporating the solvent, and calendering the dried solid matrix to a specified thickness. The electrodes are then cut, packaged with other components, infiltrated with electrolyte and the entire package is then sealed.

Such known methods generally involve complicated and expensive manufacturing steps such as casting the electrode and are only suitable for electrodes of limited thickness, for example, less than 100 μm (final single sided coated thickness). These known methods for producing electrodes of limited thickness result in batteries with lower capacity, lower energy density and a high ratio of inactive components to active materials. Furthermore, the binders used in known electrode formulations can increase tortuosity and decrease the Ionic conductivity of the electrode.

Thus, it is an enduring goal of energy storage systems development to simplify and reduce manufacturing cost, reduce inactive components in the electrodes and finished batteries, and increase energy density, charge capacity and overall performance.

SUMMARY

Embodiments described herein relate generally to electrochemical cells having high rate capability, and more particularly to devices, systems and methods of producing high capacity and high rate capability batteries having relatively thick semi-solid electrodes. In some embodiments, an electrochemical cell Includes an anode and a semi-solid cathode. The semi-solid cathode includes a suspension of about 35% to about 75% by volume of an active material and about 0.5% to about 8% by volume of a conductive material in a non-aqueous liquid electrolyte. An ion permeable membrane disposed between the anode and the cathode. The semi-solid cathode has a thickness in the range of about 250 μm-2,500 μm, and the electrochemical cell has an area specific capacity of at least 7 mAh/cm$^2$ at a C-rate of C/4. In some embodiments, the semi-solid cathode slurry has a mixing index of at least about 0.9.

DETAILED DESCRIPTION

Figure 1:
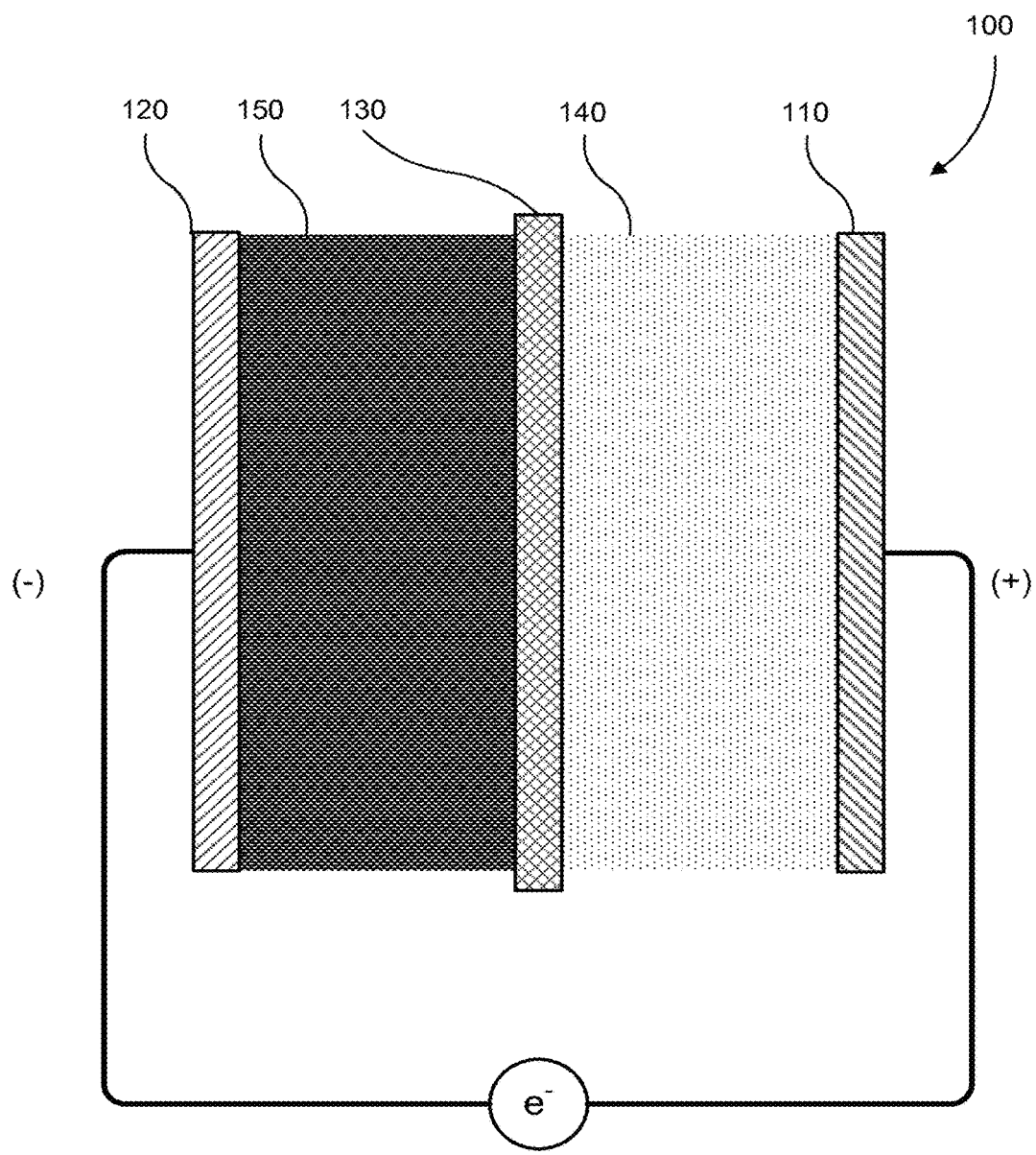
FIG. 1 is a schematic illustration of an electrochemical cell according to an embodiment.

Consumer electronic batteries have gradually increased in energy density with the progress of lithium-ion battery technology. The stored energy or charge capacity of a manufactured battery is a function of: (1) the inherent charge capacity of the active material (mAh/g), (2) the volume of the electrodes (cm$^3$) (i.e., the product of the electrode thickness, electrode area, and number of layers (stacks)), and (3) the loading of active material in the electrode media (e.g., grams of active material per cm$^3$ of electrode media). Therefore, to enhance commercial appeal (e.g., increased energy density and decreased cost), it is generally desirable to increase the areal charge capacity (mAh/cm$^2$) also referred to as "area specific capacity" or "area capacity" herein. The areal charge capacity can be increased, for example, by utilizing active materials that have a higher inherent charge capacity, increasing relative percentage of active charge storing material (i.e., "loading") in the overall electrode formulation, and/or increasing the relative percentage of electrode material used in any given battery form factor. Said another way, increasing the ratio of active charge storing components (e.g., the electrodes) to inactive components (e.g., the separators and current collectors), increases the overall energy density of the battery by eliminating or reducing components that are not contributing to the overall performance of the battery. One way to accomplish increasing the areal charge capacity, and therefore reducing the relative percentage of inactive components, is by increasing the thickness of the electrodes.

Conventional electrode compositions have capacities of approximately 150-200 mAh/g and generally cannot be made thicker than about 100 μm because of certain performance and manufacturing limitations. For example, i) conventional electrodes having a thickness over 100 μm (single sided coated thickness) typically have significant reductions in their rate capability due to diffusion limitations through the thickness of the electrode (e.g. porosity, tortuosity, impedance, etc.) which grows rapidly with increasing thickness; ii) thick conventional electrodes are difficult to manufacture due to drying and post processing limitations, for example, solvent removal rate, capillary forces during drying that leads to cracking of the electrode, poor adhesion of the electrode to the current collector leading to delamination (e.g., during the high speed roll-to-roll calendering process used for manufacturing conventional electrodes), migration of binder during the solvent removal process and/or deformation during a subsequent compression process; iii) without being bound to any particular theory, the binders used in conventional electrodes may obstruct the pore structure of the electrodes and increase the resistance to diffusion of ions by reducing the available volume of pores and increasing tortuosity (i.e. effective path length) by occupying a significant fraction of the space between the functional components of the electrodes (i.e. active and conductive components). It is also known that binders used in conventional electrodes can at least partially coat the surface of the electrode active materials, which slows down or completely blocks the flow of ions to the active materials, thereby increasing tortuosity.

Furthermore, known conventional batteries either have high capacity or high rate capability, but not both. A battery having a first charge capacity at first C-rate, for example, 0.5 C generally has a second lower charge capacity when discharged at a second higher C-rate, for example, 2 C. This is due to the higher energy loss that occurs inside a conventional battery due to the high internal resistance of conventional electrodes (e.g. solid electrodes with binders), and a drop in voltage that causes the battery to reach the low-end voltage cut-off sooner. The theoretical area specific capacity can hypothetically be increased without limit by increasing the thickness of the electrode and/or by increasing the volume fraction of the active material in the electrode. However, such arbitrary increases in theoretical area specific capacity are not useful if the capacity cannot be used at a practical C-rate. Increases in area specific capacity that cannot be accessed at practical C-rates are highly detrimental to battery performance. The capacity appears as unused mass and volume rather than contributing to stored energy, thereby lowering the energy density and area specific capacity of the battery. Moreover, a thicker electrode generally has a higher internal resistance and therefore a lower rate capability. For example, a lead acid battery does not perform, well at 1 C C-rate. They are often rated at a 0.2 C C-rate and even at this low C-rate, they cannot attain 100% capacity. In contrast, ultracapacitors can be discharged at an extremely high C-rate and still, maintain 100% capacity, however, they have a much lower capacity than conventional batteries. Accordingly, a need exists for batteries with thicker electrodes, but without the aforementioned limitations. The resulting batteries with superior performance characteristics, for example, superior rate capability and charge capacity, and also are simpler to manufacture.

Semi-solid electrodes described herein can be made; (i) thicker (e.g., greater than about 250 μm-up to about 2,000 μm or even greater) due to the reduced tortuosity and higher electronic conductivity of the semi-solid electrode, (ii) with higher loadings of active materials, (iii) with a simplified manufacturing process utilizing less equipment, and (iv) can be operated between a wide range of C-rates while maintaining a substantial portion of its theoretical charge capacity. These relatively thick semi-solid electrodes decrease the volume, mass and cost contributions of inactive components with respect to active components, thereby enhancing the commercial appeal of batteries made with the semi-solid electrodes. In some embodiments, the semi-solid electrodes described herein, are binderless and/or do not use binders that are used in conventional battery manufacturing. Instead, the volume of the electrode normally occupied by binders in conventional electrodes, is now occupied, by: 1) electrolyte, which has the effect of decreasing tortuosity and increasing the total salt available for ion diffusion, thereby countering the salt depletion effects typical of thick conventional electrodes when used at high rate, 2) active material, which has the effect of increasing the charge capacity of the battery, or 3) conductive additive, which has the effect of increasing the electronic conductivity of the electrode, thereby countering the high internal impedance of thick conventional electrodes. The reduced tortuosity and a higher electronic conductivity of the semi-solid electrodes described herein, results in superior rate capability and charge capacity of electrochemical cells formed from the semi-solid electrodes. Since the semi-solid electrodes described herein, can be made substantially thicker than conventional electrodes, the ratio of active materials (i.e., the semi-solid cathode and/or anode) to inactive materials (i.e. the current collector and separator) can be much higher in a battery formed from electrochemical cell stacks that include semi-solid electrodes relative to a similar battery formed form electrochemical cell stacks that include conventional electrodes. This substantially increases the overall charge capacity and energy density of a battery that includes the semi-solid electrodes described herein.

In some embodiments, an electrochemical cell includes an anode, and a semi-solid cathode. The semi-solid cathode includes a suspension of about 35% to about 75% by volume of an active material and about 0.5% to about 8% by volume of a conductive material in a non-aqueous liquid electrolyte.

An ion-permeable membrane is disposed between the anode and the semi-solid cathode. The semi-solid cathode has a thickness in the range of about 250 μm to about 2,000 μm and the electrochemical cell has an area, specific capacity of at least about 7 mAh/cm$^2$ at a C-rate of C/4. In some embodiments, the semi-solid cathode suspension has an electronic conductivity of at least about 10$^{-3}$ S/cm. In some embodiments, the semi-solid cathode suspension has a mixing index of at least about 0.9.

In some embodiments, an electrochemical cell includes a semi-solid anode and a semi-solid cathode. The semi-solid anode includes a suspension of about 35% to about 75% by volume of a first active material and about 0% to about 10% by volume of a first conductive material in a first non-aqueous liquid electrolyte. The semi-solid cathode includes a suspension of about 35% to about 75% by volume of a second active material, and about 0.5% to about 8% by volume of a second conductive material in a second, non-aqueous liquid electrolyte. An ion-permeable membrane is disposed between the semi-solid anode and the semi-solid cathode. Each of the semi-solid anode and the semi-solid cathode have a thickness of about 250 μm to about 2,000 μm and the electrochemical cell has an area specific capacity of at least about 7 mAh/cm$^2$ at a C-rate of C/4. In some embodiments, the first conductive material included in the semi-solid anode is about 0.5% to about 2% by volume. In some embodiments, the second active material included in the semi-solid cathode is about 59% to about 75% by volume.

In some embodiments, an electrochemical cell includes an anode and a semi-solid cathode. The semi-solid cathode includes a suspension of about 35% to about 75% by volume of an active material, and about 0.5% to about 8% by volume of a conductive material in a non-aqueous liquid electrolyte. An ion-permeable membrane is disposed between the anode and semi-solid cathode. The semi-solid cathode has a thickness in the range of about 250 μm to about 2,000 μm, and the electrochemical cell has an area specific capacity of at least about 7 mAh/cm$^2$ at a C-rate of C/2. In some embodiments, the semi-solid cathode suspension has a mixing index of at least about 0.9.

In some embodiments, an electrochemical cell includes a semi-solid anode and a semi-solid cathode. The semi-solid anode includes a suspension of about 35% to about 75% by volume of a first, active material and about 0% to about 10% by volume of a first conductive material in a first non-aqueous liquid electrolyte. The semi-solid cathode includes a suspension of about 35% to about 75% by volume of a second active material, and about 0.5% to about 8% by volume of a second conductive material in a second non-aqueous liquid electrolyte. An ion-permeable membrane is disposed between the semi-solid anode and the semi-solid cathode. Each of the semi-solid anode and the semi-solid cathode have a thickness of about 250 μm to about 2,000 μm and the electrochemical cell has an area specific capacity of at least about 7 mAh/cm$^2$ at a C-rate of C/2. In some embodiments, the first conductive material included in the semi-solid anode is about 0.5% to about 2% by volume. In some embodiments, the second active material included in the semi-solid cathode is about 50% to about 75% by volume.

In some embodiments, the electrode materials described herein can be a flowable semi-solid or condensed liquid composition. A flowable semi-solid electrode can include a suspension of an electrochemically active material (anodic or cathodic particles or particulates), and optionally an electronically conductive material (e.g., carbon) in a non-aqueous liquid electrolyte. Said another way, the active electrode particles and conductive panicles are co-suspended in an electrolyte to produce a semi-solid electrode. Examples of battery architectures utilizing semi-solid suspensions are described in international Patent Publication No. WO 2012/024499, entitled "Stationary, Fluid Redox Electrode," and International Patent Publication No. WO 2012/088442, entitled "Semi-Solid Filled Battery and Method of Manufacture," the entire disclosures of which are hereby incorporated by reference.

In some embodiments, semi-solid electrode compositions (also referred to herein as "semi-solid suspension" and/or "slurry") described herein can be mixed in a batch process e.g., with a batch mixer that can include, e.g., a high shear mixture, a planetary mixture, a centrifugal planetary mixture, a sigma mixture, a CAM mixture, and/or a roller mixture, with a specific spatial and/or temporal ordering of component addition, as described in more detail herein. In some embodiments, slurry components can be mixed in a continuous process (e.g. in an extruder), with a specific spatial and/or temporal ordering of component addition.

The mixing and forming of a semi-solid electrode generally includes; (i) raw material conveyance and/or feeding, (ii) mixing, (iii) mixed slurry conveyance, (iv) dispensing and/or extruding, and (v) forming. In some embodiments, multiple steps in the process can be performed at the same time and/or with the same piece of equipment. For example, the mixing and conveyance of the slurry can be performed at the same time with an extruder. Each step in the process can include one or more possible embodiments. For example, each step in the process can be performed manually or by any of a variety of process equipment. Each step can also include one or more sub-processes and, optionally, an inspection step to monitor process quality.

In some embodiments, the process conditions can be selected to produce a prepared slurry having a mixing index of at least about 0.80, at least about 0.90, at least, about 0.95, or at least about 0.975. In some embodiments, the process conditions can be selected to produce a prepared, slurry having an electronic conductivity of at least about 10$^{-6}$ S/cm, at least about 10$^{-5}$ S/cm, at least about 10$^{-4}$ S/cm, at least about 10$^{-3}$ S/cm, or at least about 10$^{-2}$ S/cm. In some embodiments, the process conditions can be selected to produce a prepared slurry having an apparent viscosity at room temperature of less than about 100,000 Pa-s, less than about 10,000 Pa-s, or less than about 1,000 Pa-s, all at an apparent shear rate of 1,000 s$^{-1}$. In some embodiments, the process conditions can be selected to produce a prepared slurry having two or more properties as described herein. Examples of systems and methods that can be used for preparing the semi-solid compositions and/or electrodes are described in U.S. patent application Ser. No. 13/832,861, filed Mar. 15, 2013, entitled "Electrochemical Slurry Compositions and Methods for Preparing the Same," the entire disclosure of which is hereby incorporated by reference.

As used herein, the term "about" and "approximately" generally mean plus or minus 10% of the value slated, e.g., about 250 μm would include 225 μm to 275 μm, about 1,000 μm would include 900 μm to 1,100 μm.

As used herein, the term, "semi-solid" refers to a material that is a mixture of liquid and solid phases, for example, such as particle suspension, colloidal suspension, emulsion, gel, or micelle.

As used herein, the term "condensed ion-storing liquid" or "condensed liquid" refers to a liquid that is not merely a solvent, as in the case of an aqueous flow cell semi-solid cathode or anode, but rather, it is itself redox active. Of course, such a liquid form may also be diluted by or mixed with another, non-redox active liquid that is a diluent or solvent, including mixing with such a diluent to form a lower-melting liquid phase, emulsion or micelles including the ion-storing liquid.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles and through the thickness and length of the electrode. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

As used herein, the term "area specific capacity", "area capacity", or "areal capacity" are used interchangeably to define the charge capacity of an electrode or an electrochemical cell per unit area having units of $mAh/cm^2$.

In some embodiments, an electrochemical cell for storing energy includes an anode, a semi-solid cathode including a suspension of an active material and a conductive material in a non-aqueous liquid electrolyte, and an ion permeable separator disposed between the anode and the cathode. The semi-solid cathode can have a thickness in the range of about 250 μm to about 2,000 μm. In some embodiments, the electrochemical cell is configured such that at a C-rate of C/4, the electrochemical cell has an area specific capacity of at least, about 7 $mAh/cm^2$, at least about 8 $mAh/cm^2$, at least about 9 $mAh/cm^2$, or at least about 10 $mAh/cm^2$. In some embodiments, at a C-rate of C/2, the electrochemical cell has an area specific capacity of at least about 7 $mAh/cm^2$, at least about 8 $mAh/cm^2$, or at least about 9 $mAh/cm^2$. In some embodiments, at a C-rate of 1 C, the electrochemical cell has an area specific capacity of at least about 4 $mAh/cm^2$, at least about 5 $mAh/cm^2$, at least about 6 $mAh/cm^2$, or at least about 7 $mAh/cm^2$. In some embodiments, at a C-rate of 2 C, the electrochemical cell has an area specific capacity of at least about 3 $mAh/cm^2$, at least about 4 $mAh/cm^2$, or at least about 5 $mAh/cm^2$. In some embodiments, at C-rates between about 2 C and about 5 C, the electrochemical cell has an area specific capacity of at least about 1 $mAh/cm^2$, or at least about 2 $mAh/cm^2$.

In some embodiments, the thickness of the semi-solid cathode is at least about 250 μm. In some embodiments, the thickness of the semi-solid electrodes can be at least about 300 μm, at least about 350 μm, at least about 400 μm, at least about 450 μm, at least about 500 μm, at least about 600 μm, at least about 700 μm, at least about 800 μm, at least about 900 μm, at least about 1,000 μm, at least about 1,500 μm, and up to about 2,000 μm, inclusive of all thicknesses therebetween.

In some embodiments, the anode can be a conventional anode, for example, a lithium metal anode or a calendered anode. In some embodiments, the anode can be a semi-solid anode that can have a thickness that is substantially similar to the thickness of the semi-solid cathode such as, for example, of at least about 250 μm, at least about 300 μm, at least about 350 μm, at least about 400 μm, at least about 450 μm, at least about 500 μm, and so on.

In some embodiments, the thickness of the semi-solid electrodes can be in the range of about 250 μm to about 2,000 μm, about 300 μm to about 2,000 μm, about 350 μm to about 2,000 μm, 400 μm to about 2,000 μm, about 450 μm to about 2,000 μm, about 500 to about 2,000 μm, about 250 μm to about 1,500 μm, about 300 μm to about 1,500 μm, about 350 μm to about 1,500 μm, about 400 μm to about 1,500 μm, about 450 μm to about 1,500 μm, about 500 to about 1,500 μm, about 250 μm to about 1,000 μm, about 300 μm to about 1,000 μm, about 350 μm to about 1,000 μm, about 400 μm to about 1,000 μm, about 450 μm to about 1,000 μm, about 500 μm to about 1,000 μm, about 250 μm to about 750 μm, about 300 μm to about 750 μm, about 350 μm to about 750 μm, about 400 μm to about 750 μm, about 450 μm to about 750 μm, about 500 μm to about 750 μm, about 250 μm to about 700 μm, about 300 μm to about 700 μm, about 350 μm to about 700 μm, about 400 μm to about 700 μm, about 450 μm to about 700 μm, about 500 μm to about 700 μm, about 250 μm to about 650 μm, about 300 μm to about 650 μm, about 350 μm to about 650 μm, about 400 μm to about 650 μm, about 450 μm to about 650 μm, about 500 μm to about 650 μm, about 250 μm to about 600 μm, about 300 μm to about 600 μm, about 350 μm to about 600 μm, about 400 μm to about 600 μm, about 450 μm to about 600 μm, about 500 μm to about 600 μm, about 250 μm to about 550 μm, about 390 μm to about 550 μm, about 350 μm to about 550 μm, about 400 μm to about 550 μm, about 450 μm to about 550 μm, or about 500 μm to about 550 μm, inclusive of all ranges or any other distance therebetween.

In some embodiments, a semi-solid anode can include an anode active material selected from lithium metal, carbon, lithium-intercalated carbon, lithium nitrides, lithium alloys and lithium alloy forming compounds of silicon, bismuth, boron, gallium, indium, zinc, tin, tin oxide, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon oxide, silicon carbide, any other materials or alloys thereof, and any other combination thereof.

In some embodiments, a semi-solid cathode can include about 35% to about 75% by volume of an active material. In some embodiments, a semi-solid cathode can include about 40% to about 75% by volume, about 45% to about 75% by volume, about 50% to about 75% by volume, about 55% to about 75% by volume, about 60% to about 75% by volume, or about 65% to about 75% by volume of an active material, inclusive of all ranges therebetween.

In some embodiments, a semi-solid cathode can include about 0.5% to about 8% by volume of a conductive material. For example, in some embodiments, a semi-solid cathode can include about 0.6% to about 7.5% by volume, about 0.7% to about 7.0% by volume, about 0.8% to about 6.5% by volume, about 0.9% to about 6% by volume, about 1.0% to about 6% by volume, about 1.5% to about 5.0% by volume, or about 2% to about 4% by volume of a conductive material, inclusive of all ranges therebetween.

In some embodiments, a semi-solid cathode can include about 25% to about 70% by volume of an electrolyte. In some embodiments, a semi-solid cathode can include about 30% to about 50%, or about 20% to about 40% by volume of an electrolyte, inclusive of all ranges therebetween.

In some embodiments, a semi-solid anode can include about 35% to about 75% by volume of an active material. In some embodiments, a semi-solid anode can include about 40% to about 75% by volume, about 45% to about 75% by volume, about 50% to about 75% by volume, about 55% to about 75% by volume, about 60% to about 75% by volume, or about 65% to about 75% by volume of an active material, inclusive of all ranges therebetween.

In some embodiments, a semi-solid anode can include about 0% to about 10% by volume of a conductive material. In some embodiments, a semi-solid anode can include about 0.2% to about 9% by volume, about 0.4% to about 8% by volume, about 0.6% to about 7% by volume, about 0.8% to about 6% by volume, about 1% to about 5% by volume, or about 2% to about 4% by volume of a conductive material, inclusive of all ranges therebetween. In some embodiments, the semi-solid anode includes about 1% to about 6% by volume of a conductive material. In some embodiments, the semi-solid anode includes about 0.5% to about 2% by volume of a conductive material.

In some embodiments, a semi-solid anode can include about 10% to about 70% by volume of an electrolyte. In some embodiments, a semi-solid anode can include about 30% to about 50%, or about 20% to about 40% by volume of an electrolyte, inclusive of all ranges therebetween.

In some embodiments, a semi-solid cathode or semi-solid anode can include less than about 10% by volume of a polymeric binder. In some embodiments, a semi-solid cathode or semi-solid anode can include less than about 5% by volume, or less than about 3% by volume, or less than about 1% by volume of a polymeric binder. In some embodiments, the polymeric binder comprises polyvinylidene difluoride (PVdF).

In some embodiments, an electrochemical cell includes a semi-solid cathode that can include about 35% to about 75% by weight of an active material, about 0.5% to about 8% by weight of a conductive material, and about 20% to about 40% by weight of a non-aqueous liquid electrolyte. The semi-solid cathode suspension can have mixing index of at least about 0.9. The semi-solid cathode can have a thickness in the range of about 250 µm to about 2,000 µm. The electrochemical cell also includes a semi-solid anode that can include about 35% to about 75% by weight of an active material, about 1% to about 10% by weight of a conductive material, and about 20% to about 40% by weight of a non-aqueous liquid electrolyte. The semi-solid anode suspension can have a mixing index of at least about 0.9. The semi-solid anode can have a thickness in the range of about 250 µm to about 2,000 µm. The semi-solid anode and the semi-solid cathode are separated by an ion permeable membrane disposed therebetween. In such embodiments, the electrochemical cell can have an area specific capacity of at least about 7 mAh/cm$^2$.

FIG. 1 shows a schematic illustration of an electrochemical cell 100. The electrochemical cell 100 includes a positive current collector 110, a negative current collector 120 and a separator 130 disposed between the positive current collector 110 and the negative current collector 120. The positive current collector 110 is spaced from the separator 130 and at least partially defines a positive electroactive zone. The negative current collector 120 is spaced from the separator 130 and at least partially defines a negative electroactive zone. A semi-solid cathode 140 is disposed in the positive electroactive zone and an anode 150 is disposed in the negative electroactive zone. In some embodiments, the anode 150 can be a solid anode, for example, a lithium metal anode, a solid graphite electrode, or a calendered anode. In some embodiments, the anode 150 can be a semi-solid anode.

The semi-solid cathode 140 and/or anode 150 can be disposed on the positive current collector 110 and the negative current collector 120, respectively using any suitable method, for example, coated, casted, drop coated, pressed, roll pressed, or deposited. The positive current collector 110 and the negative current collector 120 can be any current collectors that are electronically conductive and are electrochemically inactive under the operation conditions of the cell. Typical current collectors for lithium cells include copper, aluminum, or titanium for the negative current collector and aluminum for the positive current collector, in the form of sheets or mesh, or any combination thereof. Current collector materials can be selected to be stable at the operating potentials of the positive and negative electrodes of an electrochemical cell 100. For example, in non-aqueous lithium systems, the positive current collector 110 can include aluminum, or aluminum coated with conductive material that does not electrochemically dissolve at operating potentials of 2.5-5.0V with respect to Li/Li$^+$. Such materials include platinum, gold, nickel, conductive metal oxides such as vanadium oxide, and carbon. The negative current collector 120 can include copper or other metals that, do not form alloys or intermetallic compounds with lithium, carbon, and/or coatings comprising such materials disposed on another conductor.

The separator 130 is disposed between the semi-solid cathode 140 and the anode 150 (e.g., a semi-solid anode) can be any conventional membrane that is capable of ion transport. In some embodiments, the separator 130 is a liquid impermeable membrane that permits the transport, of ions therethrough, namely a solid or gel ionic conductor. In some embodiments the separator 130 is a porous polymer membrane infused with a liquid electrolyte that allows for the shuttling of ions between the cathode 140 and anode 150 electroactive materials, while preventing the transfer of electrons. In some embodiments, the separator 130 is a microporous membrane that prevents particles forming the positive and negative electrode compositions from crossing the membrane. In some embodiments, the separator 130 is a single or multilayer microporous separator, optionally with the ability to fuse or "shut down" above a certain temperature so that it no longer transmits working ions, of the type used in the lithium ion battery industry and well-known to those skilled in the art. In some embodiments, the separator 130 material can include polyethyleneoxide (PEO) polymer in which a lithium salt is complexed to provide lithium conductivity, or Nafion™ membranes which are proton conductors. For example, PEO based electrolytes can be used as the membrane, which is pinhole-free and a solid, ionic conductor, optionally stabilized with other membranes such as glass fiber separators as supporting layers, PEO can also be used as a slurry stabilizer, dispersant, etc. in the positive or negative redox compositions. PEO is stable in contact with typical alkyl carbonate-based electrolytes. This can be especially useful in phosphate-based cell chemistries with cell potential at the positive electrode that is less than about 3.6 V with respect to Li metal. The operating temperature of the redox cell can be elevated as necessary to improve the ionic conductivity of the membrane.

The cathode 140 can be a semi-solid stationary cathode or a semi-solid flowable cathode, for example of the type used in redox flow cells. The cathode 140 can include an active material such as a lithium bearing compound as described in further detail below. The cathode 140 can also include a conductive material such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls," graphene sheets and/or aggregate of graphene sheets, any other conductive material, alloys or combination thereof. The cathode 140 can also include a non-aqueous liquid electrolyte as described in further detail below.

In some embodiments, the anode 150 can be a semi-solid stationary anode, in some embodiments, the anode 150 can be a semi-solid flowable anode, for example, of the type used in redox flow cells.

The anode 150 can also include a carbonaceous material such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls", graphene sheets and/or aggregate of graphene sheets, any other carbonaceous material or combination thereof. In some embodiments, the anode 150 can also include a non-aqueous liquid electrolyte as described in further detail herein.

In some embodiments, the semi-solid cathode 140 and/or the anode 150 (e.g. a semi-solid anode) can include active materials and optionally conductive materials in particulate form suspended in a non-aqueous liquid electrolyte. In some embodiments, the semi-solid cathode 140 and/or anode 150 particles (e.g., cathodic or anodic particles) can have an effective diameter of at least about 1 µm. In some embodiments, the cathodic or anodic particles can have an effective diameter between about 1 µm and about 10 µm. In other embodiments, the cathodic or anodic particles can have an effective diameter of at least about 10 µm or more. In some embodiments, the cathodic or anodic particles can have an effective diameter of at less than about 1 µm. In other embodiments, the cathodic or anodic particles can have an effective diameter of at less than about 0.5 µm. In other embodiments, the cathodic or anodic particles can have an effective diameter of at less than about 0.25 µm. In other embodiments, the cathodic or anodic particles can have an effective diameter of at less than about 0.1 µm. In other embodiments, the cathodic or anodic particles can have an effective diameter of at less than about 0.05 µm. In other embodiments, the cathodic or anodic particles can have an effective diameter of at less than about 0.01 µm.

In some embodiments, the semi-solid cathode 140 can include about 35% to about 75% by volume of an active material. In some embodiments, the semi-solid cathode 140 can include about 40% to about 75% by volume, 45% to about 75% by volume, about 50% to about 75% by volume, about 55% to about 75% by volume, about 60% to about 75% by volume, or about 65% to about 75% by volume of an active material, inclusive of all ranges therebetween.

In some embodiments, the semi-solid cathode 140 can include about 0.5% to about 8% by volume of a conductive material. In some embodiments, the semi-solid cathode 140 can include about 0.6% to about 7.5% by volume, about 0.7% to about 7.0% by volume, about 0.8% to about 6.5% by volume, about 0.9% to about 6% by volume, about 1.0% to about 6%, about 1.5% to about 5.0% by volume, or about 2% to about 4% by volume of a conductive material, inclusive of all ranges therebetween.

In some embodiments, the semi-solid cathode 140 can include about 25% to about 70% by volume of an electrolyte. In some embodiments, the semi-solid cathode 140 can include about 30% to about 50%, or about 20% to about 40% by volume of an electrolyte, inclusive of all ranges therebetween.

In some embodiments, the semi-solid cathode 140 can have an electronic conductivity of at least about $10^{-3}$ S/cm, or at least about $10^{-2}$ S/cm. In some embodiments, the semi-solid cathode 140 suspension can have a mixing index of at least about 0.9, at least about 0.95, or at least about 0.975.

In some embodiments, the semi-solid cathode 140 can have an area specific capacity of at least, about 7 mAh/cm², at least about 8 mAh/cm², at least about 9 mAh/cm², or at least, about 10 mAh/cm² at a C-rate of C/4. In some embodiments, the semi-solid cathode 140 can have an area specific capacity of at least about 7 mAh/cm², at least about 8 mAh/cm², at least about 9 mAh/cm², or at least about 10 mAh/cm² at a C-rate of C/2.

In some embodiments, the semi-solid anode 150 can include about 35% to about 75% by volume of an active material. In some embodiments, the semi-solid anode 150 can include about 40% to about 75% by volume, about 45% to about 75% by volume, about 50% to about 75% by volume, about 55% to about 75% by volume, about 60% to about 75% by volume, or about 65% to about 75% by volume of an active material, inclusive of all ranges therebetween.

In some embodiments, the semi-solid anode 150 can include about 0% to about 10% by volume of a conductive material. In some embodiments, the semi-solid anode 150 can include about 0.2% to about 9% by volume, about 0.4% to about 8% by volume, about 0.6% to about 7% by volume, about 0.8% to about 6% by volume, about 1% to about 5% by volume, or about 2% to about 4% by volume of a conductive material, inclusive of all ranges therebetween. In some embodiments, the semi-solid anode 150 can include about 1% to about 6% by volume of a conductive material. In some embodiments, the semi-solid anode 150 can include about 0.5% to about 2% by volume of a conductive material, inclusive of all ranges therebetween.

In some embodiments, the semi-solid anode 150 can include about 10% to about 70% by volume of an electrolyte. In some embodiments, the semi-solid anode 150 can include about 30% to about 50%, or about 20% to about 40% by volume of an electrolyte, inclusive of all ranges therebetween.

In some embodiments, the semi-solid anode 150 suspension can have a mixing index of at least about 0.9, at least about 0.95, or at least about 0.975.

In some embodiments, the semi-solid cathode 140 and/or the semi-solid anode 150 can have a thickness in the range of about 250 µm to about 2,000 µm. In some embodiments, the semi-solid cathode 140 and/or the semi-solid anode 150 can have a thickness in the range of about 250 µm to about 600 µm, about 300 µm to about 600 µm, about 350 µm to about 600 µm, about 400 µm to about 600 µm, about 450 µm to about 600 µm, or about 500 µm to about 600 µm, inclusive of all ranges therebetween.

In some embodiments, the electrochemical cell 100 can include the semi-solid cathode 140 and a semi-solid anode 150. In such embodiments, the electrochemical cell 100 can have an area specific capacity of at least about 7 mAh/cm² at a C-rate of C/4. In some embodiments, the electrochemical cell 100 can have an area specific capacity of at least about 8 mAh/cm², at least about 9 mAh/cm², or at least about 10 mAh/cm² at a C-rate of C/4. In some embodiments, the electrochemical cell 100 can have an area specific capacity of at least about 7 mAh/cm², at a C-rate of C/2. In some embodiments, the electrochemical cell 100 can have an area specific capacity of at about least 8 mAh/cm², or at least about 9 mAh/cm², at a C-rate of C/2.

In some embodiments, a redox mediator is used to improve the charge transfer within the semi-solid suspension. In some embodiments, the redox mediator is based on $Fe^{2+}$ or $V^{2+}$, $V^{3+}$, or $V^{4+}$. In some embodiments, the redox mediator is ferrocene.

In some embodiments, the conductive particles have shapes, which may include spheres, platelets, or rods to optimize solids packing fraction, increase the semi-solid's net electronic conductivity, and improve rheological behavior of semi-solids. In some embodiments, low aspect or substantially equiaxed or spherical particles are used to improve the ability of the semi-solid to flow under stress.

In some embodiments, the particles have a plurality of sizes so as to increase packing fraction. In particular, the particle size distribution can be bi-modal, in which the average particle size of the larger particle mode is at least 5 times larger than average particle size of the smaller particle mode. In some embodiments, the mixture of large and small particles improves flow of the material during cell loading and increases solid volume fraction and packing density in the loaded cell.

In some embodiments, the nature of the semi-solid cathode 140 and/or the semi-solid anode 150 suspensions can be modified prior to and subsequent to filling of the negative electroactive zone and the positive electroactive zone of an electrochemical cell to facilitate flow during loading and packing density in the loaded cell.

In some embodiments, the particle suspension is initially stabilized by repulsive interparticle steric forces that arise from surfactant molecules. After the particle suspension is loaded into the positive electroactive zone and/or the negative electroactive zone, chemical or heat treatments can cause these surface molecules to collapse or evaporate and promote densification. In some embodiments, the suspension's steric forces are modified intermittently during loading.

For example, the particle suspension can be initially stabilized by repulsive interparticle electrostatic double layer forces to decrease viscosity. The repulsive force reduces interparticle attraction and reduces agglomeration. After the particle suspension is loaded into the positive electroactive zone and/or negative electroactive zone, the surface of the particles can be further modified to reduce interparticle repulsive forces and thereby promote particle attraction and packing. For example, ionic solutions such as salt solutions can be added to the suspension to reduce the repulsive forces and promote aggregation and densification so as to produce increased solids fraction loading after filling of the electroactive zones. In some embodiments, salt is added intermittently during suspension loading to increase density in incremental layers.

In some embodiments, the positive and/or negative electroactive zones are loaded with a particle suspension that is stabilized by repulsive forces between particles induced by an electrostatic double layer or short-range steric forces due to added surfactants or dispersants. Following loading, the particle suspension is aggregated and densified by increasing the salt concentration of the suspension. In some embodiments, the salt that is added is a salt of a working ion for the battery (e.g., a lithium salt, for a lithium ion battery) and upon being added, causes the liquid phase to become an ion-conducting electrolyte (e.g., for a lithium rechargeable battery, may be one or more alkyl carbonates, or one or more ionic liquids). Upon increasing the salt concentration, the electrical double layer causing repulsion between the particles is "collapsed", and attractive interactions cause the particle to floe, aggregate, consolidate, or otherwise densify. This allows the electrode of the battery to be formed from the suspension while it has a low viscosity, for example, by pouring, injection, or pumping into the positive and/or negative electroactive zones that can form a net-shaped electrode, and then allows particles within the suspension to be consolidated for improved electrical conduction, higher packing density and longer shelf life.

In some embodiments, the cathode 140 and/or anode 150 semi-solid suspensions can initially be flowable, and can be caused to become non-flowable by "fixing". In some embodiments, fixing can be performed by the action of electrochemically cycling the battery. In some embodiments, electrochemical cycling is performed within the current, voltage, or temperature range over which the battery is subsequently used. In some embodiments, fixing is performed by electrochemical cycling of the battery to a higher or lower current, higher or lower voltage, or higher or lower temperature, that the range over which the battery is subsequently used. In some embodiments, fixing can be performed by the action of photopolymerization. In some embodiments, fixing is performed by action of electromagnetic radiation with wavelengths that are transmitted by the unfilled positive and/or negative electroactive zones of the electrochemical cell 100 formed from the semi-solid cathode 140 and/or the semi-solid anode 150. In some embodiments, one or more additives are added, to the semi-solid suspensions to facilitate fixing.

In some embodiments, the injectable and flowable cathode 140 and/or anode 150 semi-solid is caused to become less flowable or more flowable by "plasticizing". In some embodiments, the rheological properties of the injectable and flowable semi-solid suspensions can be modified by the addition of a thinner, a thickener, and/or a plasticizing agent. In some embodiments, these agents promote processability and help retain compositional uniformity of the semi-solid under flowing conditions and positive and negative electroactive zone filling operations. In some embodiments, one or more additives can be added to the flowable semi-solid suspension to adjust its flow properties to accommodate processing requirements.

Semi-Solid Composition

In some embodiments, the semi-solid cathode 140 and in some embodiments, the anode 150 (e.g., a semi-solid anode) suspensions provide a means to produce a substance that functions collectively as an ion-storages/ion-source, electron conductor, and ionic conductor in a single medium that acts as a working electrode.

The cathode 140 and/or anode 150 semi-solid ion-storing redox composition as described herein can have, when taken in moles per liter (molarity), at least 10M concentration of redox species. In some embodiments, the cathode 140 and/or the anode 150 semi-solids ion-storing redox composition can include at least 12M, at least 15M, or at least 20M of the redox species. The electrochemically active material can be an ion storage material and or any other compound or ion complex that, is capable of undergoing Faradaic reaction in order to store energy. The electroactive material can also be a multiphase material including the above described redox-active solid mixed with a non-redox-active phase, including solid-liquid suspensions, or liquid-liquid multiphase mixtures, including micelles or emulsions having a liquid ion-storage material intimately mixed with a supporting liquid phase. Systems that utilize various working ions can include aqueous systems in which $Li^+$, $Na^+$, or other alkali ions are the working ions, even alkaline earth working ions such as $Ca^{2+}$, $Mg^{2+}$, or $Al^{3+}$. In each of these instances, a negative electrode storage material and a positive electrode storage material may be required, the negative electrode storing the working ion of interest at a lower absolute electrical potential than the positive electrode. The cell voltage can be determined approximately by the difference in ion-storage potentials of the two ion-storage electrode materials.

Systems employing negative and/or positive ion-storage materials that are insoluble storage hosts for working ions, meaning that said materials can take up or release the working ion while all other constituents of the materials remain substantially insoluble in the electrolyte, are particularly advantageous as the electrolyte does not become contaminated with electrochemical composition products. In addition, systems employing negative and/or positive lithium ion-storage materials are particularly advantageous when using non-aqueous electrochemical compositions.

In some embodiments, the semi-solid ion-storing redox compositions include materials proven to work in conventional lithium-ion batteries. In some embodiments, the semi-solid cathode 140 electroactive material contains lithium positive electroactive materials and the lithium cations are shuttled between the anode 150 (e.g., a semi-solid anode) and the semi-solid cathode 140, intercalating into solid, host particles suspended in a liquid electrolyte.

In some embodiments, at least one of the semi-solid cathode 140 and/or anode 150 (e.g., a semi-solid anode) includes a condensed ion-storing liquid of a redox-active compound, which may be organic or inorganic, and includes but is not limited to lithium metal, sodium metal, lithium-metal alloys, gallium and indium alloys with or without dissolved lithium, molten transition metal chlorides, thionyl chloride, and the like, or redox polymers and organics that can be liquid under the operating conditions of the battery. Such a liquid form may also be diluted by or mixed with another, non-redox-active liquid that is a diluent, or solvent, including mixing with such diluents to form a lower-melting liquid phase. In some embodiments, the redox-active component can comprise, by mass, at least 10% of the total mass of the electrolyte. In other embodiments, the redox-active component will comprise, by mass, between approximately 10% and 25% of the total mass of the electrolyte. In some embodiments, the redox-active component will comprise by mass, at least 25% or more of the total mass of the electrolyte.

In some embodiments, the redox-active electrode material, whether used as a semi-solid or a condensed liquid format as defined above, comprises an organic redox compound that stores the working ion of interest at a potential useful for either the positive or negative electrode of a battery. Such organic redox-active storage materials include "p"-doped conductive polymers such as polyaniline or polyacetylene based materials, polynitroxide or organic radical electrodes (such as those described in: H. Nishide et al., Electrochim. Acta, 50, 827-831, (2004), and K. Nakahara, et al., Chem. Phys. Lett., 359, 351-354 (2002)), carbonyl based organics, and oxocarbons and carboxylate, including compounds such as $Li_2C_6O_6$, $Li_2C_8H_4O_4$, and $Li_2C_6H_4O_4$ (see for example M. Armand et. al., Nature Materials, DOI: 10.1038/nmat2372) and organosulfur compounds.

In some embodiments, organic redox compounds that are electronically insulating are used. In some instance, the redox compounds are in a condensed liquid phase such as liquid or flowable polymers that are electronically insulating. In such cases, the redox active slurry may or may not contain an additional carrier liquid. Additives can be combined, with the condensed, phase liquid redox compound to increase electronic conductivity. In some embodiments, such electronically insulating organic redox compounds are rendered electrochemically active by mixing or blending with particulates of an electronically conductive material, such as solid inorganic conductive materials including but not limited to metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), mufti wall carbon nanotubes (MWNTs), single wall carbon nanotubes (SWNTs), graphene sheets or aggregates of graphene sheets, and materials comprising fullerenic fragments.

In some embodiments, such electronically insulating organic redox compounds are rendered electronically active by mixing or blending with an electronically conductive polymer, including but not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocene-substituted polyethylene, carbazole-substituted polyethylene, polyoxyphenazine, polyacenes, or poly(heteroacenes). The conductive additives form an electrically conducting framework within the insulating liquid redox compounds that significantly increases the electrically conductivity of the composition. In some embodiments, the conductive addition forms a percolative pathway to the current collector. In some embodiments the redox-active electrode material comprises a sol or gel, including for example metal oxide sols or gels produced by the hydrolysis of metal alkoxides, amongst other methods generally known as "sol-gel processing." Vanadium oxide gels of composition $V_xO_y$ are amongst such redox-active sol-gel materials.

Other suitable positive active materials for use in the semi-solid cathode 140 include solid compounds known to those skilled in the art as those used in NiMH (Nickel-Metal Hydride) Nickel Cadmium (NiCd) batteries. Still other positive electrode compounds for Li storage include those used in carbon monofluoride batteries, generally referred to as $CF_x$, or metal fluoride compounds having approximate stoichiometry $MF_2$ or $MF_3$ where M comprises, for example, Fe, Bi, Ni, Co, Ti, or V. Examples include those described in H. Li, P. Balaya, and J. Maier, Li-Storage via Heterogeneous Reaction, in Selected Binary Metal Fluorides and Oxides, Journal of The Electrochemical Society, 151 [11] A1878-A1885 (2004), M. Bervas, A. N. Mansour, W.-S. Woon, J. F. Al-Sharab, F. Badway, F. Cosandey, L. C. Klein, and G. G. Amatucci, "Investigation of the Lithiation and Delithiation Conversion Mechanisms in a Bismuth Fluoride Nanocomposites", J. Electrochem. Soc., 153, A799 (2006), and I. Plitz, F. Badway, J. Al-Sharab, A. DuPasquier, F. Cosandey and G. G. Amatucci, "Structure and Electrochemistry of Carbon-Metal Fluoride Nanocomposites Fabricated by a Solid State Redox Conversion Reaction", J. Electrochem. Soc., 152, A307 (2005).

As another example, fullerenic carbon including single-wall carbon nanotubes (SWNTs), multiwall carbon nanotubes (MWNTs), or metal or metalloid nanowires may be used as ion-storage materials. One example is the silicon nanowires used as a high energy density storage material in a report by C. K. Chan, H. Peng, G. Liu, K. McIlwrath, X. F. Zhang, R. A. Huggins, and Y. Cui, High-performance lithium battery anodes using silicon nanowires, Nature Nanotechnology, published online 16 Dec. 2007; doi: 10.1038/nnano.2007.411. In some embodiments, electroactive materials for the semi-solid cathode 140 in a lithium system can include the general family of ordered rocksalt compounds $LiMnO_2$ including those having the α-$NaFeO_2$ (so-called "layered compounds") or orthorhombic-$LiMnO_2$ structure type or their derivatives of different crystal symmetry, atomic ordering, or partial substitution for the metals or oxygen. M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, Li(Ni, Co, Al)$O_2$ (known as "NCA") and Li(Ni, Mn, Co)$O_2$ (known as "NMC"). Other families of exemplary cathode 140 electroactive materials includes those of spinel structure, such as $LiMn_2O_4$ and its derivatives, so-called "layered-spinel nanocomposites" in which the structure includes nanoscopic regions having ordered rocksalt and spinel ordering, olivines $LiMPO_4$ and their derivatives, in which M comprises one or more of Mn, Fe, Co, or Ni, partially fluorinated compounds such as $LiVPO_4F$, other "polyanion" compounds as described below, and vanadium oxides $V_zO_y$, including $V_2O_5$ and $V_6O_{11}$.

In some embodiments, the semi-solid cathode 140 electroactive material comprises a transition metal polyanion compound, for example as described in U.S. Pat. No. 7,338,734. In some embodiments the active material comprises an alkali metal transition metal oxide or phosphate, and for example, the compound has a composition $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, and have values such that x, plus y(1-a) times a formal valence or valences of M', plus y times a formal valence or valence of M", is equal to z times a formal valence of the $XD_4$, $X_2D_7$, or $DXD_4$ group; or a compound comprising a composition $(A_{1-a}M'_a)_xM'_y(XD_4)_z$, $(A_{1-a}M'_a)_xM'_y(DXD_4)z(A_{1-a}M'_a)_xM'_y(X_2D_7)_z$ and have values such that (1-a)x plus the quantity ax times the formal valence or valences of M" plus y times the formal valence or valences of M' is equal to z times the formal valence of the $XD_4$, $X_2D_7$ or $DXD_4$ group. In the compound, A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VII A, VIIIA, IB, IIB, IIIB, IVB, VB, and VIB metal, D is at least one of oxygen, nitrogen, carbon, or a halogen. The positive electroactive material can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material comprises a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In other embodiments, the lithium transition metal phosphate material has an overall composition of $Li_{1-x-z}M_{1+z}PO_4$, where M comprises at least one first row transition metal selected from the group consisting of Ti, V, Cr, Mn, Fe, Co and Ni, where x is from 0 to 1 and z can be positive or negative. M includes Fe, z is between about 0.15-0.15. The material can exhibit a solid solution over a composition range of 0<x<0.15, or the material can exhibit a stable solid solution over a composition range of x between 0 and at least about 0.05, or the material can exhibit a stable solid solution over a composition range of x between 0 and at least about 0.07 at room temperature (22-25° C.). The material may also exhibit a solid solution in the lithium-poor regime, e.g., where x≥0.8, or x≥0.9, or x≥0.95.

In some embodiments the redox-active electrode material comprises a metal salt that stores an alkali ion by undergoing a displacement or conversion reaction. Examples of such compounds include metal oxides such as CoO, $Co_3O_4$, NiO, CuO, MnO, typically used as a negative electrode in a lithium battery, which upon reaction with Li undergo a displacement or conversion reaction to form a mixture of $Li_2O$ and the metal constituent in the form of a more reduced oxide or the metallic form. Other examples include metal fluorides such as $CuF_2$, $FeF_2$, $FeF_3$, $BiF_3$, $CoF_2$, and $NiF_2$, which undergo a displacement or conversion reaction to form LiF and the reduced metal constituent. Such fluorides may be used as the positive electrode in a lithium battery. In other embodiments, the redox-active electrode material comprises carbon monofluoride or its derivatives. In some embodiments the material undergoing displacement or conversion reaction is in the form of particulates having on average dimensions of 100 nanometers or less. In some embodiments the material undergoing displacement or conversion reaction comprises a nanocomposite of the active material mixed with an inactive host, including but not limited to conductive and relatively ductile compounds such as carbon, or a metal, or a metal sulfide. $FeS_2$ and $FeF_3$ can also be used as cheap and electronically conductive active materials in a nonaqueous or aqueous lithium system. In some embodiments, a $CF_x$ electrode, $FeS_2$ electrode, or $MnO_2$ electrode is a positive electrode used with a lithium metal negative electrode to produce a lithium battery. In some embodiments, such battery is a primary battery. In some embodiments, such battery is a rechargeable battery.

In some embodiments, the working ion is selected from the group consisting of $Li^+$, $Na^+$, $H^+$, $Mg^{2+}$, $Al^{3+}$, or $Ca^{2+}$.

In some embodiments, the working ion is selected from the group consisting of $Li^+$ or $Na^+$.

In some embodiments, the semi-solid ion-storing redox composition includes a solid including an ion-storage compound.

In some embodiments, the ion is proton or hydroxyl ion and the ion storage compound includes those used in a nickel-cadmium or nickel metal hydride battery.

In some embodiments, the ion is lithium and the ion storage compound is selected from the group consisting of metal fluorides such as $CuF_2$, $FeF_2$, $FeF_3$, $BiF_3$, $CoF_2$, and $NiF_2$.

In some embodiments, the ion is lithium and the ion storage compound is selected from the group consisting of metal oxides such as CoO, $Co_3O_4$, NiO, CuO, MnO.

In some embodiments, the ion is lithium and the ion storage compound includes an intercalation compound selected from compounds with formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In some embodiments, the ion is lithium and the ion storage compound includes an intercalation compound selected from compounds with formula $LiMPO_4$, where M is one or more of V, Cr, Mn, Fe, Co, and Ni, in which the compound is optionally doped at the Li, M or O-sites.

In some embodiments, the ion is lithium and the ion storage compound includes an intercalation compound selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)_z$, wherein x, plus y(1-a) times a formal valence or valences of M', plus ya times a formal valence or valence of M", is equal to z times a formal valence of the $XD_4$, $X_2D_7$, or $DXD_4$ group; and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the ion storage compound includes an intercalation compound selected from the group consisting of $A_{1-a}M''_aM'_y(XD_4)_z$, $(A_{1-a}M''_a)_xM'_y(DXD_4)z$ and $A_{1-a}M''_a)_xM'_y(X_2D_7)_z$, where (1-a)x plus the quantity ax times the formal valence or valences of M" plus y times the formal valence or valences of M' is equal to z times the formal valence of the $XD_4$, $X_2D_7$ or $DXD_4$ group, and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the ion storage compound, includes an intercalation compound selected from the group consisting of ordered rocksalt compounds $LiMO_2$ including those having the α-$NaFeO_2$ and orthorhombic-$LiMnO_2$ structure type or their derivatives of different crystal symmetry, atomic ordering, or partial substitution for the metals or oxygen, where M includes at least one first-row transition metal but may include non-transition metals including but not limited to Al, Ca, Mg or Zr.

In some embodiments, the semi-solid ion storing redox composition includes a solid including amorphous carbon, disordered carbon, graphitic carbon, or a metal-coated or metal decorated carbon.

In some embodiments, the semi-solid ion storing redox composition can include a solid including nanostructures, for example, nanowires, nanorods, and nanotetrapods.

In some embodiments, the semi-solid ion storing redox composition includes a solid including an organic redox compound.

In some embodiments, the positive electrode can include a semi-solid ion storing redox composition including a solid selected from the groups consisting of ordered rocksalt compounds $LiMO_2$ including those having the α-$NaFeO_2$ and orthorhombic-$LiMnO_2$ structure type or their derivatives of different crystal symmetry, atomic ordering, or partial substitution for the metals or oxygen, wherein M Includes at least one first-row transition metal but may include non-transition metals including but not limited to Al, Ca, Mg, or Zr. The anode 150 can include a semi-solid ion-storing composition including a solid selected from the group consisting of amorphous carbon, disordered carbon, graphitic carbon, or a metal-coated or metal-decorated carbon.

In some embodiments, the semi-solid cathode 140 can include a semi-solid ion-storing redox composition such as, for example, a solid selected from the group consisting of $A_x(M'_{1-a}M''_a)_y(XD_4)_z$, $A_x(M'_{1-a}M''_a)_y(DXD_4)_z$, and $A_z(M'_{1-a}M''_a)_y(X_2D_7)_z$, where x, plus y(1-a) times a formal valence or valences of M', plus ya times a formal valence or valence of M", is equal to z times a formal valence of the $XD_4$, $X_2D_7$, or $DXD_4$ group, and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen. In some embodiments, the anode 150 can be semi-solid anode which includes a semi-solid ion-storing redox composition such as, for example, a solid selected from the group consisting of amorphous carbon, disordered carbon, graphitic carbon, or a metal-coated or metal-decorated carbon. In some embodiments, the anode 150 can include a semi-solid ion-storing redox composition including a compound with a spinel structure.

In some embodiments, the semi-solid cathode 140 can include a semi-solid ion-storing redox composition such as, for example, a compound selected from the group consisting of $LiMn_2O_4$ and its derivatives; layered-spinel nanocomposites in which the structure includes nanoscopic regions having ordered rocksalt and spinel, ordering; so-called "high voltage spinels" with a potential vs. Li/Li+ that exceeds 4.3V including but not limited to $LiNi_{0.5}Mn_{1.5}O_4$; olivines $LiMPO_4$ and their derivatives, in which M includes one or more of Mn, Fe, Co, or Ni, partially fluoridated compounds such as $LiVPO_4F$, other "polyanion" compounds, and vanadium oxides $V_xO_y$ including $V_2O_5$ and $V_6O_{11}$.

In some embodiments the semi-solid battery is a lithium battery, and the anode 150 compound includes graphite, graphitic or non-graphitic carbon, amorphous carbon, mesocarbon microbeads, boron-carbon alloys, hard or disordered carbon, lithium titanate spinel, or a solid metal or metal alloy or metalloid or metalloid alloy that reacts with lithium to form intermetallic compounds, e.g., Si, Ge, Sn, Bi, Zn, Ag, Al, any other suitable metal alloy, metalloid alloy or combination thereof, or a lithiated metal or metal alloy including such compounds as LiAl, $Li_9Al_4$, $Li_3Al$, LiZn, LiAg, $Li_{10}Ag_3$, $Li_5B_4$, $Li_7B_6$, $Li_{12}Si_7$, $Li_{21}Si_8$, $Li_{13}Si_4$, $Li_{21}Si_5$, $Li_5Sn_2$, $Li_{13}Sn_5$, $Li_7Sn_2$, $Li_{22}Sn_5$, $Li_2Sb$, $Li_3Sb$, LiBi, or $Li_3Bi$, or amorphous metal alloys of lithiated or non-lithiated compositions, any other materials or alloys thereof, or any other combination thereof.

In some embodiments, the electrochemical function of the electrochemical cell 100 can be improved by mixing or blending the semi-solid cathode 140 and/or the semi-solid anode 150 particles with particulates of an electronically conductive material, such as solid inorganic conductive materials including but not limited to metals, metal carbides, metal nitrides, metal oxides, and allotropes of carbon including carbon black, graphitic carbon, carbon fibers, carbon micro fibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments. In some embodiments, such electronically insulating organic redox compounds are rendered electronically active by mixing or blending with an electronically conductive polymer, including but not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocene-substituted polyethylene, carbazole-substituted polyethylene, polyoxyphenazine, polyacenes, or poly(heteroacenes).). In some embodiments, the resulting semi-solid cathode 140 and/or semi-solid anode 150 mixture has an electronic conductivity of at least about $10^{-3}$ S/cm, of at least about $10^{-2}$ S/cm or more.

In some embodiments, the particles included in the semi-solid cathode 140 and/or semi-solid anode 150 can be configured to have a partial or full conductive coating.

In some embodiments, the semi-solid ion-storing redox composition includes an ion-storing solid coated with a conductive coating material, in some embodiments, the conductive coating material has higher electron conductivity than the solid. In some embodiments, the solid is graphite and the conductive coating material is a metal, metal carbide, metal oxide, metal nitride, or carbon. In some embodiments, the metal is copper.

In some embodiments, the solid of the semi-solid ion-storing material is coated with metal that is redox, inert at the operating conditions of the redox energy storage device. In some embodiments, the solid of the semi-solid ion storing material is coated with copper to increase the conductivity of the storage material particle, to increase the net conductivity of the semi-solid, and/or to facilitate charge transfer between energy storage particles and conductive additives. In some embodiments, the storage material particle is coated with about 1.5% by weight metallic copper. In some embodiments, the storage material particle is coated with about 3.0% by weight metallic copper. In some embodiments, the storage material particle is coated with about 8.5% by weight metallic copper. In some embodiments, the storage material particle is coated with about 10.0% by weight metallic copper. In some embodiments, the storage material particle is coated with about 15.0% by weight metallic copper. In some embodiments, the storage material particle is coated with about 20.0% by weight metallic copper.

In some embodiments, the conductive coating is placed on the semi-solid cathode 140 and/or anode 150 particles by chemical precipitation of the conductive element and subsequent drying and/or calcination.

In some embodiments, the conductive coating is placed on the semi-solid cathode 140 and/or anode 150 particles by electroplating (e.g., within a fluidized bed).

In some embodiments, the conductive coating is placed on the semi-solid cathode 140 and/or anode 150 particles by co-sintering with a conductive compound and subsequent comminution.

In some embodiments, the electrochemically active particles have a continuous intraparticle conductive material or are embedded in a conductive matrix.

In some embodiments, a conductive coating and intraparticulate conductive network is produced by multicomponent-spray-drying, a semi-solid cathode 140 and/or anode 150 particles and conductive material particulates.

In some embodiments, the semi-solid composition (e.g., the semi-solid cathode 140 composition or the semi-solid anode 150 composition) also includes conductive polymers that provide an electronically conductive element. In some embodiments, the conductive polymers can include one or more of a polyacetylene, polyaniline, polythiophene, polypyrrole, poly(p-phenylene), poly(triphenylene), polyazulene, polyfluorene, polynaphtalene, polyanthracene, polyfuran, polycarbazole, polyacenes, poly(heteroacenes). In some embodiments, the conductive polymer can be a compound that reacts in-situ to form a conductive polymer on the surface of the active material particles. In some embodiments, the compound can be 2-hexylthiophene or 3-hexylthiophene and oxidizes during charging of the battery to form a conductive polymer coating on solid particles in the cathode semi-solid suspension. In other embodiments, redox active material can be embedded in conductive matrix. The redox active material can coat the exterior and interior interfaces in a flocculated or agglomerated particulate of conductive material. In some embodiments, the redox-active material and the conductive material can be two components of a composite particulate. Without being bound by any theory or mode of operation, such coatings can pacify the redox active particles and can help prevent undesirable reactions with carrier liquid or electrolyte. As such, it can serve as a synthetic solid-electrolyte interphase (SEI) layer.

In some embodiments, inexpensive iron compounds such as pyrite ($FeS_2$) are used as inherently electronically conductive ion storage compounds. In some embodiments, the ion that is stored is $Li^+$.

In some embodiments, redox mediators are added to the semi-solid to improve the rate of charge transfer within the semi-solid electrode. In some embodiments, this redox mediator is ferrocene or a ferrocene-containing polymer. In some embodiments, the redox mediator is one or more of tetrathiafulvalene-substituted polystyrene, ferrocene-substituted polyethylene, carbazole-substituted polyethylene.

In some embodiments, the surface conductivity or charge transfer resistance of the positive current collectors 110 and/or the negative current collector 120 included in the electrochemical cell 100 is increased by coating the current collector surface with a conductive material. Such layers can also serve as a synthetic SEI layer. Non-limiting examples of conductive coating materials include carbon, a metal, metal-carbide, metal nitride, metal oxide, or conductive polymer. In some embodiments, the conductive polymer includes but is not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocene-substituted polyethylene, carbazole-substituted polyethylene, polyoxyphenazine, polyacenes, or poly(heteroacenes). In some embodiments, the conductive polymer is a compound that reacts in-situ to form a conductive polymer on the surface of the current collector. In some embodiments, the compound is 2-hexylthiophene and oxidizes at a high potential to form a conductive polymer coating on the current collector. In some embodiments, the current collector is coated with metal that is redox-inert at the operating conditions of the redox energy storage device.

The semi-solid redox compositions can include various additives to improve the performance of the redox cell. The liquid phase of the semi-solids in such instances would comprise a solvent, in which is dissolved an electrolyte salt, and binders, thickeners, or other additives added to improve stability, reduce gas formation, improve SEI formation on the negative electrode particles, and the like. Examples of such additives included vinylene carbonate (VC), vinylethylene carbonate (VEC), fluoroethylene carbonate (FEC), or alkyl, cinnamates, to provide a stable passivation layer on the anode or thin passivation layer on the oxide cathode, propane sultone (PS), propene sultone (PrS), or ethylene thiocarbonate as antigassing agents, biphenyl (BP), cyclohexylbenzene, or partially hydrogenated terphenyls, as gassing/safety/cathode polymerization agents, or lithium bis (oxatlato)borate as an anode passivation agent.

In some embodiments, the semi-solid cathode 140 and/or anode 150 can include a non-aqueous liquid electrolyte that can include polar solvents such as, for example, alcohols or aprotic organic solvents. Numerous organic solvents have been proposed as the components of Li-ion battery electrolytes, notably a family of cyclic carbonate esters such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl, propyl carbonate, dibutyl carbonate, butylmethyl carbonate, butylethyl carbonate and butylpropyl carbonate. Other solvents proposed as components of Li-ion battery electrolyte solutions include γ-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl, acetate, methyl propionate, ethyl propionate, dimethyl carbonate, tetraglyme, and the like. These nonaqueous solvents are typically used as multicomponent mixtures, into which a salt is dissolved to provide ionic conductivity. Exemplary salts to provide lithium conductivity include $LiClO_4$, $LiPF_6$, $LiBF_4$, LiTFSI, LiBETI, LiBOB, and the like.

In some embodiments, the non-aqueous cathode 140 and/or anode 150 semi-solid compositions are prevented from absorbing impurity water and generating acid (such as HF in the case of $LiPF_6$ salt) by incorporating compounds that, getter water into the active material suspension, or into the storage tanks or other plumbing of the system, for example, in the case of redox flow cell batteries. Optionally, the additives are basic oxides that neutralize the acid. Such compounds include but are not limited to silica gel, calcium sulfate (for example, the product known as Drierite), aluminum oxide and aluminum hydroxide.

In some embodiment, the cathode 140 can be a semi-solid cathode and the anode 150 can be a conventional anode for example, a solid anode formed from the calendering process as is commonly known in the arts. In some embodiments, the cathode 140 can be a semi-solid cathode and the anode 150 can also be a semi-solid anode as described herein. In some embodiments, the cathode 140 and the anode 150 can both be semi-solid flowable electrodes, for example, for use in a redox flow cell.

In some embodiments, the semi-solid cathode 140 and the semi-solid anode 150 can be prepared by combining a quantity of an active material with an electrolyte and a conductive material, and mixing until a substantially stable suspension forms that has a mixing index of at least about 0.9, at least about 0.95, or at least about 0.975, inclusive of all ranges therebetween. In some embodiments, the semi-solid cathode 140 and/or the semi-solid anode 150 material is mixed until the electrode material has an electronic conductivity of at least about $10^{-3}$ S/cm, or at least about $10^{-2}$ S/cm, inclusive of all ranges therebetween. In some embodiments, the electrode material, is mixed until the electrode material has an apparent viscosity of less than about 25,000 Pa-s, less than about 10,000 Pa-s, less than about 1,000 Pa-s, or less than about 100 Pa-s at an apparent shear rate of about 5 $s^{-1}$, inclusive of all ranges therebetween. In such embodiments, the semi-solid cathode 140 can Include about 35-75 vol % of active material and about 0.5-8 vol % of conductive material, and the semi-solid anode 150 can include about 35-75 vol % of active material and about 0-10 vol % of conductive material. Furthermore, the electrochemical cell 100 that includes the semi-solid cathode 140 and/or the semi-solid anode 150 can have an area specific capacity of at least about 7 $mAh/cm^2$, for example, at least about 8 $mAh/cm^2$, at least about 9 $mAh/cm^2$, or at least about 10 $mAh/cm^2$. In some embodiments, the active material included in the semi-solid cathode 140 can be LFP. In such embodiments, the electrochemical 100 can have an area specific capacity of at least about 7 $mAh/cm^2$ at a C-rate of C/4. In some embodiments, the active material included in the semi-solid cathode can be NMC. In such embodiments, the electrochemical cell 100 can have an area specific capacity of at least about 7 $mAh/cm^2$ at a C-rate of C/4.

In some embodiments, the mixing of the electrode material (e.g., the semi-solid cathode 140 or the semi-solid anode 150) can be performed with, for example, any one of a high shear mixer, a planetary mixer, a centrifugal planetary mixture, a sigma mixture, a CAM mixture and/or a roller mixture. In some embodiments, the mixing of the electrode material can supply a specific mixing energy of at least about 90 J/g, at least about 100 J/g, about 90 J/g to about 150 J/g, or about 100 J/g to about 120 J/g, inclusive of all ranges therebetween.

In some embodiments, the composition of the electrode material and the mixing process can be selected to homogeneously disperse the components of the slurry, achieve a percolating conductive network throughout the slurry and sufficiently high bulk electrical conductivity, which correlates to desirable electrochemical performance as described in further detail herein, to obtain a rheological state conducive to processing, which may include transfer, conveyance (e.g., extrusion), dispensing, segmenting or cutting, and post-dispense forming (e.g., press forming, rolling, calendering, etc.), or any combination thereof.

During mixing, the compositional homogeneity of the slurry will generally increase with mixing time, although the microstructure of the slurry may be changing as well. The compositional homogeneity of the slurry suspension can be evaluated quantitatively by an experimental method based on measuring statistical variance in the concentration distributions of the components of the slurry suspension. For example, mixing index is a statistical measure, essentially a normalized variance or standard deviation, describing the degree of homogeneity of a composition. (See, e.g., Erol, M, & Kalyon, D. M., *Assessment of the Degree of Mixedness of Filled Polymers*, Intern. Polymer Processing XX (2005) 3, pps. 228-237). Complete segregation would have a mixing index of zero and a perfectly homogeneous mix a mixing index of one. Alternatively, the homogeneity of the slurry can be described by its compositional uniformity (+x %/-y %), defined herein as the range: (100%-y)*C to (100%+x)*C. All of the values x and y are thus defined by the samples exhibiting maximum positive and negative deviations from the mean value C, thus the compositions of all mixed material samples taken fall within this range.

The basic process of determining mixing index includes taking a number of equally and appropriately sized material samples from the aggregated mix and conducting compositional analysis on each of the samples. The sampling and analysis can be repeated at different times in the mixing process. The sample size and volume is based on considerations of length scales over which homogeneity is important, for example, greater than a multiple of both the largest solid particle size and the ultimate mixed state average intraparticle distance at the low end, and 1/Nth of the total, volume where N is the number of samples at the high end. Optionally, the samples can be on the order of the electrode thickness, which is generally much smaller than the length and width of the electrode. Capabilities of certain experimental equipment, such as a thermo-gravimetric analyzer (TGA), will narrow the practical sample volume range further. Sample "dimension" means the cube root of sample volume. For, example, a common approach to validating the sampling (number of samples) is that the mean composition of the samples corresponding to a given mixing duration matches the overall portions of material components introduced to the mixer to a specified tolerance. The mixing index at a given mixing time is defined, according to the present embodiments, to be equal to $1-\sigma/\sigma_{ref}$, where $\sigma$ is the standard deviation in the measured composition (which may be the measured amount of any one or more constituents of the slurry) and $\sigma_{ref}$ is equal to $[C(1-C)]^{1/2}$, where C is the mean composition of the N samples, so as the variation in sample compositions is reduced, the mixing index approaches unity. It should be understood in the above description that "time" and "duration" are general terms speaking to the progression of the mixing event.

In one embodiment, a total sample volume of 43 cubic centimeters containing 50% by volume active material powder with a particle size distribution with D50=10 um and D90=15 um, and 6% by volume conductive additive agglomerates powder with D50=8 um and D90=12 um in organic solvent is prepared. This mixture can, for example, be used to build electrodes with an area of 80 cm², and a thickness of 500 µm. The sample dimension should be larger than the larger solid particle size, i.e., 15 µm, and also the larger mixed state intra-particle length scale, i.e., about 16 µm, by a predetermined factor. With a target of N=14 samples, the sample dimension should be less than 2,500 µm. The specific dimension of interest is in the middle of this range, i.e., 500 µm. Accordingly, to quantify mixing index, the samples are taken with a special tool having a cylindrical sampling cavity with a diameter of 0.5 mm and a depth of 0.61 mm. In this example, the sample volume would be 0.12 mm.

In some embodiments, the sample volume selection for mixing index measurement is guided by length scales over which uniformity is important. In some embodiments, this length scale is the thickness (e.g., 250 µm to 2,000 µm) of an electrode in which the slurry will be used. For example, if the electrode is 0.5 mm thick, the sample volume should preferably be on the order of $(0.5 \text{ mm})^3 = 0.125 \text{ mm}^3$, i.e. between about 0.04 mm³ and about 0.4 mm³. If the electrode is 0.2 mm thick, the sample volume should preferably be between 0.0025 and 0.025 mm³. If the electrode is 2.0 mm thick, the sample volume should preferably be between 2.5 mm³ and 25 mm³. In some embodiments, the sample volume by which mixing index is evaluated is the cube of the electrode thickness ±10%. In some embodiments, the sample volume by which mixing index is evaluated is 0.12 mm³±10%. In one embodiment, the mixing index is measured by taking N samples where N is at least 9, each sample having the sample volume, from a batch of the electrode slurry or from a formed slurry electrode that has a volume greater than the total volume of the N samples. Each of the sample volumes is heated in a thermo gravimetric analyzer (TGA) under flowing oxygen gas according to a time-temperature profile wherein there is 3 minute hold at room temperature, followed by heating at 20° C./min to 850° C., with the cumulative weight loss between 150° C. and 600° C. being used to calculate the mixing index. Measured in this manner, the electrolyte solvents are evaporated and the measured weight loss is primarily that due to pyrolysis of carbon in the sample volume.

As described herein, conductive additives can have technical characteristics and morphologies (i.e., hierarchical, clustering of fundamental particles) that influence their dispersive and electrochemical behavior in dynamic and/or static suspensions. Characteristics that can influence dispersive and electrochemical behavior of conductive additives include surface area and bulk conductivity. For example, in the case of certain conductive carbon additives, morphological factors can impact the dispersion of the carbon particles. The primary carbon particles have dimensions on the order of nanometers, the particles typically exist as members of larger aggregates, consisting of particles either electrically bound (e.g., by Van der Waals forces) or sintered together. Such agglomerates may have dimensions on the order of nanometers to microns. Additionally, depending on the surface energies of the particles, environment, and/or temperature, aggregates can form larger scale clusters commonly referred to as agglomerates, which can have dimensions on the order of microns to tens of microns.

When such conductive additives are included in a slurry, fluid shearing forces, e.g., imparted during mixing, can disrupt the carbon network, for example, by overcoming agglomerate and aggregate binding forces. By disrupting the conductive network, the additives can be present in a finer scale (more granular and more homogeneous) dispersion of the conductive solid. Mixing can also density clusters of the conductive solid. In some embodiments, mixing can both disrupt the conductive network and density clusters, which can sever electrical conduction pathways and adversely impact electrochemical performance.

Figure 2:
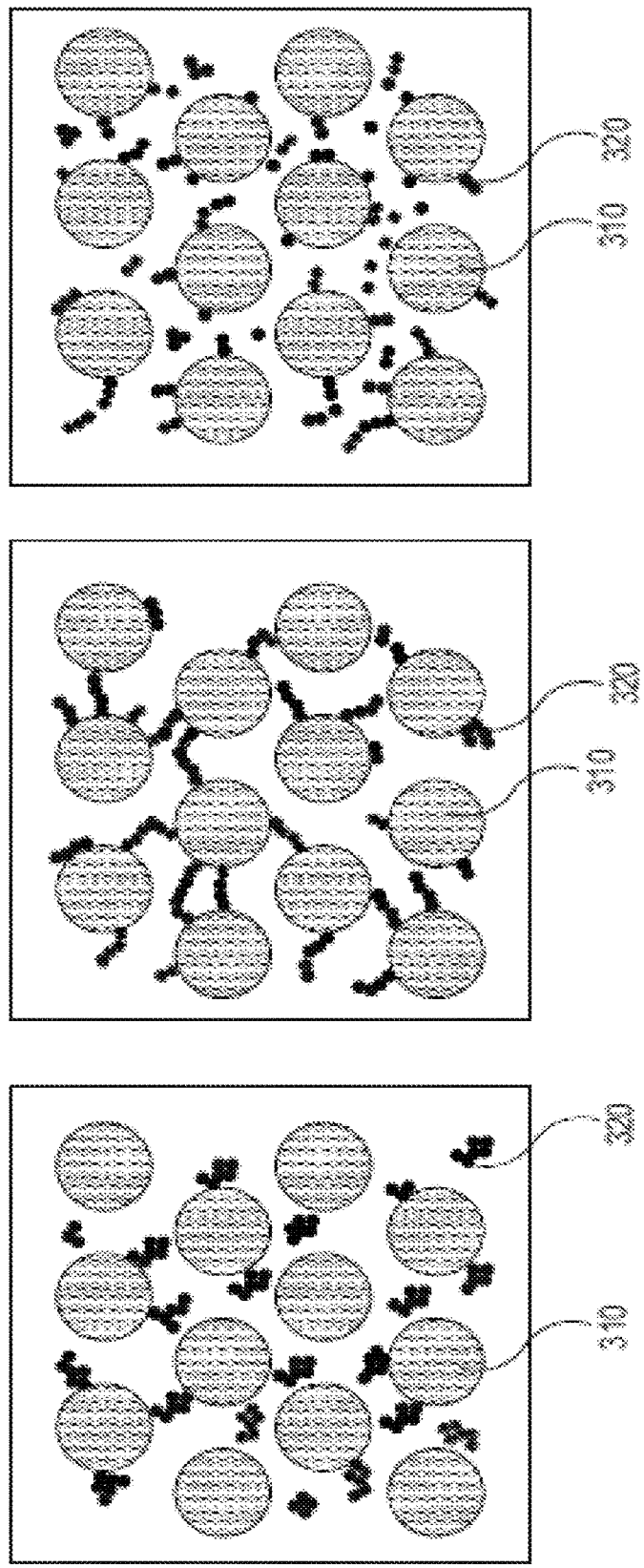
FIGS. 2A-2C and FIGS. 3A-3C are schematic illustrations of semi-solid suspensions, according to various embodiments.

FIG. 2A-2C are schematic diagrams of an electrochemically active slurry containing active material 310 and conductive additive 320 in which the quantity of the conductive additive 320 is not enough to form a conductive network. FIG. 2A depicts a slurry before any mixing energy has been applied or after only minimal mixing energy has been applied. FIG. 2B depicts the slurry with an optimal amount of mixing energy applied and FIG. 2C depicts the slurry with an excessive amount of mixing energy applied. As illustrated in FIG. 2B even with the optimal amount of mixing, the amount of conductive additive 320 is not adequate to create an appreciable conductive network throughout the electrode volume.

Figure 3:
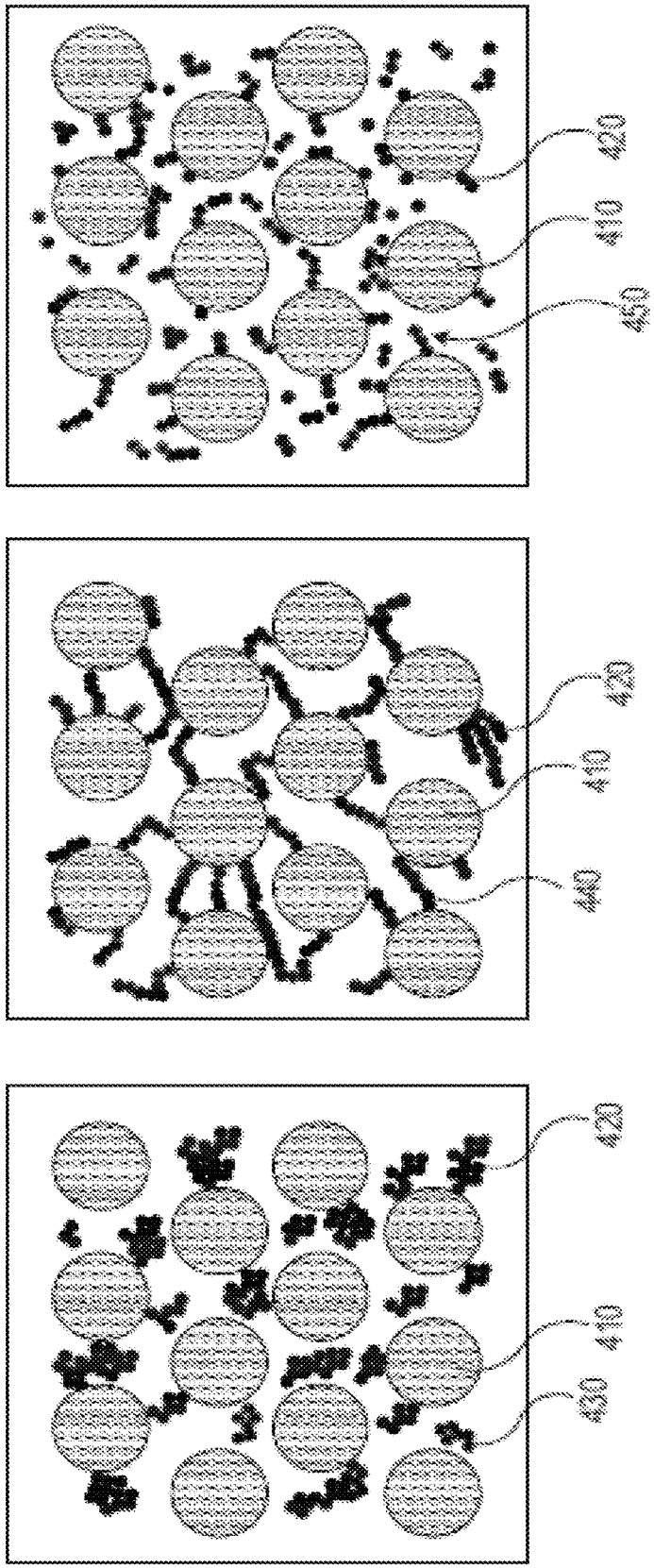

FIG. 3A-3C are schematic diagrams of an electrochemical active slurries containing an active material 410 and conductive additive 420. Contrary to FIG. 2A-C, in this example the quantity of the conductive additive 420 is enough to form a conductive network. As shown in FIG. 3A, the conductive additive 420 is largely in the form of unbranched agglomerates 430. The homogeneity of the conductive additive 420 could be characterized as non-uniform at this stage. As shown in FIG. 3B, the agglomerates 430 have been "broken up" by fluid shearing and/or mixing forces and have created the desired "wiring" of the conductive additive agglomerate 440 interparticle network (also referred to herein as "conductive pathway"). As shown in FIG. 3C, the conductive network has been disrupted by over mixing and the conductive additive 420 is now in the form of broken and/or incomplete (or non-conductive) pathways 450. Thus, FIGS. 2A-C and FIGS. 3A-C illustrate that an electrochemically active slurry can include a minimum threshold of conductive additive 320/420 loading, and an optimal processing regime between two extremes (i.e., the slurry depicted in FIG. 3B). By selecting an appropriate loading of conductive additive 320/420 and processing regime, a semi-solid suspension can be formed having an appreciable conductive interparticle network (e.g., conductive additive agglomerate 440 network). In some embodiments, the specific mixing energy applied can be about 90 J/g to about 150 J/g, e.g., at least about 90 J/g, at least about 100 J/g, at least about 120 J/g or at least about 150 J/g inclusive off all ranges therebetween.

Figure 4:
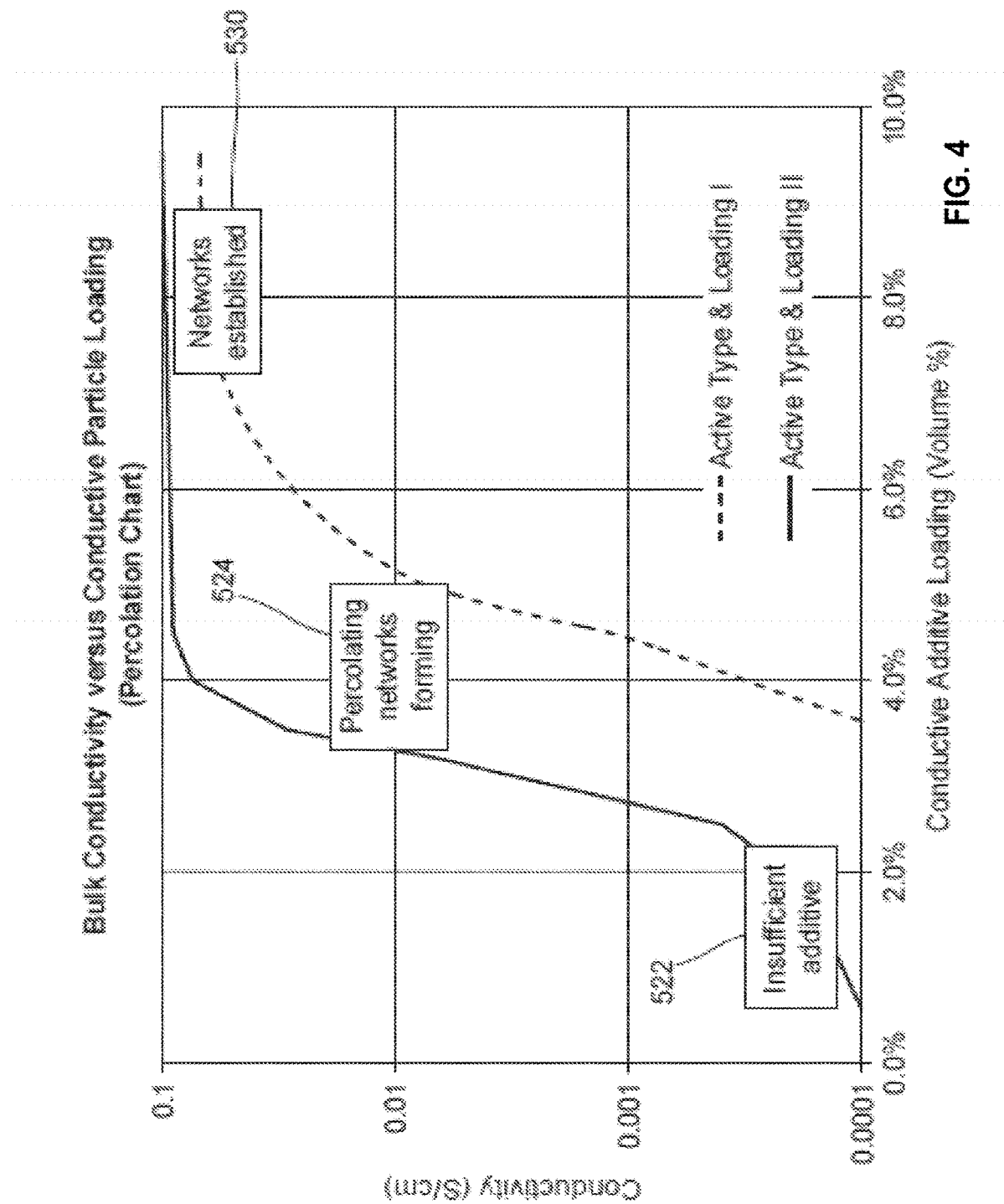
FIG. 4 is a plot of the conductivity of a semi-solid electrode versus conductive additive loading, according to various embodiments.

The quantity of a conductive additive, i.e., the mass or volume fraction of the conductive additive (also referred to herein as the conductive additive "loading") that is used in a given mixture relative to other components, such as an active material, that is suitable for the mixture to achieve a specified level of bulk electrical conductivity depends on the cluster state. Percolation theory can be used to select a loading of conductive additive. Referring now to FIG. 4, a plot of conductivity of an electrochemical slurry versus conductive additive loading is shown. As the loading of the conductive additive increases, so does the conductivity of the slurry. Three regions of conductivity are depicted on FIG. 4. At low loadings of conductive additive 522, the slurry has relatively low conductivity. For example, this slurry with low conductive additive loading 522 can correspond to the slurry depicted in FIG. 2A-2C, in which there is insufficient conductive material to form an appreciable interparticle network. As the conductive additive loading increases, a percolating network 524 begins to form as chains of conductive additive are able to at least intermittently provide connectivity between active particles. As the loading increases further (e.g., as shown in the slurry depicted in FIGS. 3A-3C), a relatively stable interparticle networks 530 is formed. The shape and height of the percolation curve can be modulated by the method of mixing and properties of the conductive additive, as described herein. The amount of conductive additive used in a slurry, however, can be constrained by other considerations. For example, maximizing battery attributes such as energy density and specific energy is generally desirable and the loading of active materials directly influences those attributes. Similarly stated, the quantity of other solids, such as active material, must be considered in addition to the loading of conductive material. The composition of the slurry and the mixing process described herein can be selected to obtain a slurry of relatively uniform composition, while enabling clustering of the conductive additive to improve electrical conductivity. In other words, the slurry can be formulated and mixed such that a minimum threshold of conductive additive is included to form the interparticle network after an appropriate amount of mixing, thereby maximizing the active material loading. In some embodiments, the amount of conductive additive in the semi-solid cathode 140 slurry can be about 0.5-8 vol % by volume, inclusive of all ranges therebetween. In some embodiments, the amount of conductive additive in the semi-solid anode 150 can be about 0-10 vol %, inclusive of all ranges therebetween. In some embodiments, the electronic conductivities of the prepared slurries (e.g., the semi-solid cathode 140 slurry or the semi-solid anode slurry 150) can be at least about $10^{-3}$ S/cm, or at least about $10^{-2}$ S/cm, inclusive of all ranges therebetween.

In some embodiments, it is desirable for the electrochemically active slurry to be "workable," in order to facilitate material handling associated with battery manufacturing. For example, if a slurry is too fluid it can be compositionally unstable. In other words, the homogeneity can be lost under exposure to certain forces, such as gravity (e.g., solids settling) or centrifugal forces. If the slurry is unstable, solid phase density differences, or other attributes, can give rise to separation and/or compositional gradients. Said another way, if the slurry is overly fluidic, which may be the result of low solids loadings or a significantly disrupted conductive network, the solids may not be sufficiently bound in place to inhibit particle migration. Alternatively, if an electrochemically active slurry is too solid, the shiny may break up, crumble, and/or otherwise segregate into pieces, which can complicate processing and dimensional control. Formulating the shiny within a band of adequate workability can facilitate easier slurry-based battery manufacturing. Workability of a slurry can typically be quantified using rheological parameters which can be measured using rheometers. Some examples of different types of rheometers that can be used to quantify slurry workability include: strain or stress-controlled rotational, capillary, slit, and extensional.

Figure 5C:
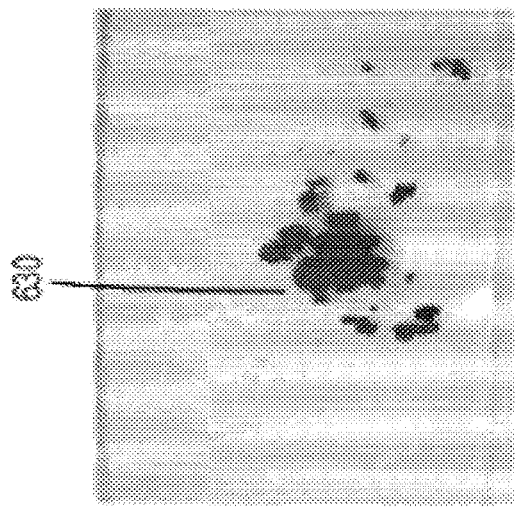
FIGS. 5A-5C depict electrode slurry mixtures with different conductive additive loadings, according to various embodiments.
Figure 5B:
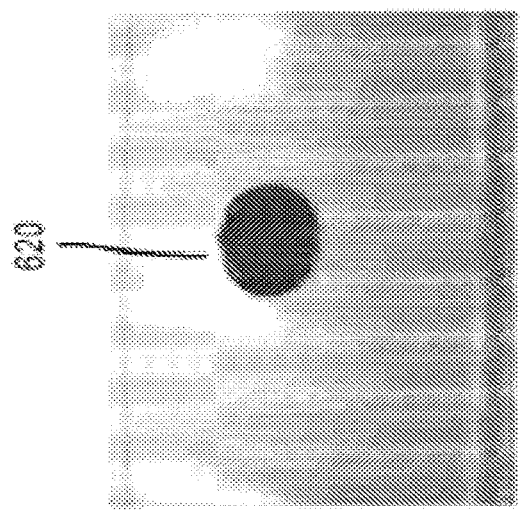
Figure 5A:
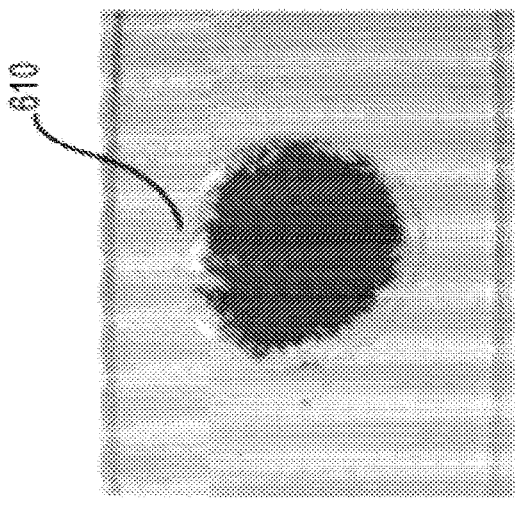

In some embodiments, the ratios between active material, conductive additive, and electrolyte can affect the stability, workability, and/or rheological properties of the slurry. FIG. 5A-5C depict electrode slurry mixtures with different loadings of active material and conductive additive relative to the electrolyte. At a low loading 610 (FIG. 5A), i.e., a slurry in which there is relatively little active material and conductive additive relative to the electrolyte, can result in an unstable or "runny" mixture. As shown, phase separation, i.e., separation of the active material, and conductive additive (solid phase) from the electrolyte (liquid phase), can be observed in the low loading 610 mixture. On the contrary, at a high loading mixture 630 (FIG. 5C) where the maximum packing of solid materials in the electrolyte has been exceeded, the mixture is too dry and is not fluidic enough to be conveyed or processed to a desired shape or thickness. Therefore, as shown in FIG. 5B, there is an optimal loading mixture 620 where the slurry is stable (i.e., the solid particles are maintained in suspension) and is sufficiently fluidic to be workable into electrodes.

Figure 6:
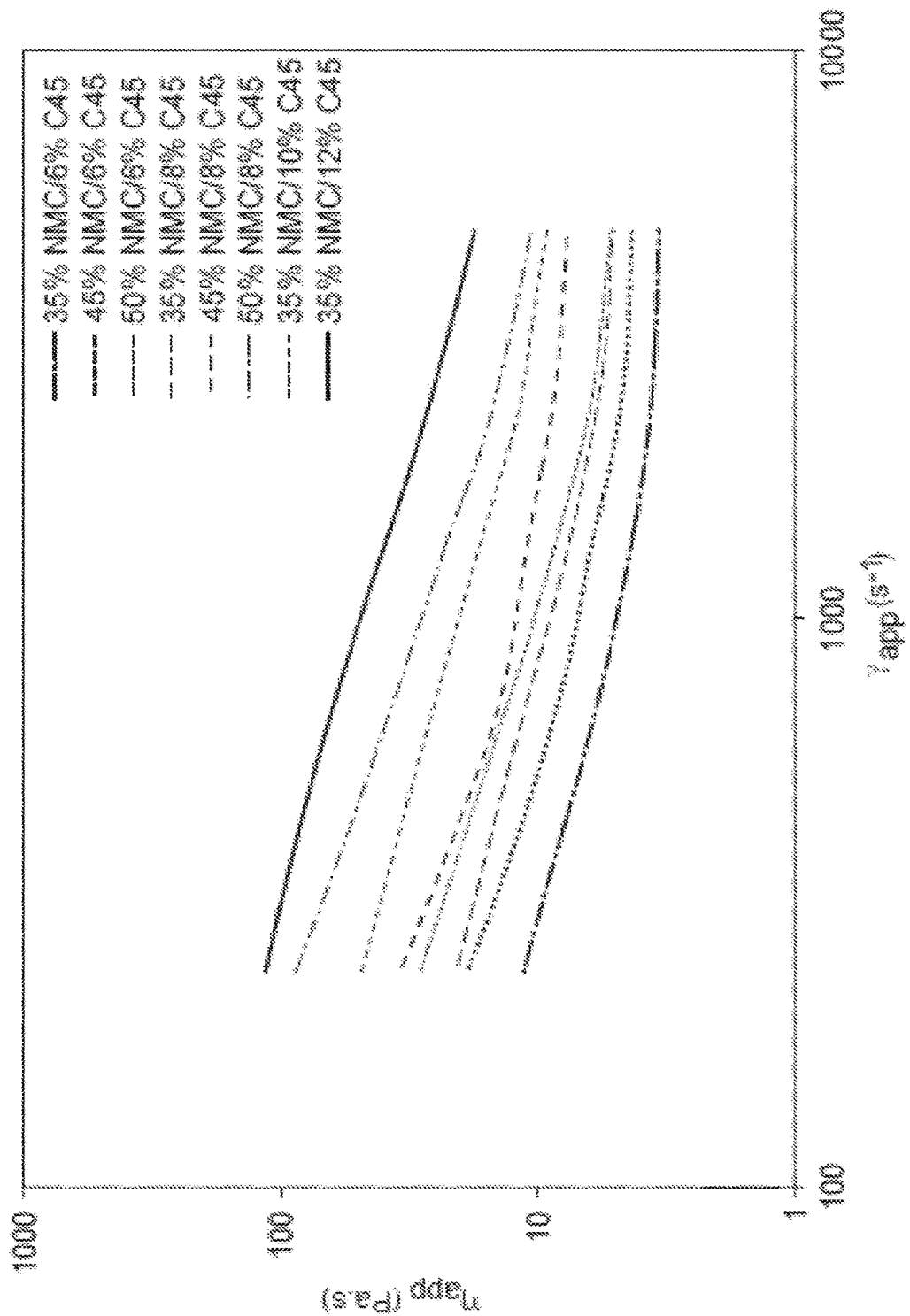
FIGS. 6-9 are plots illustrating rheological characteristics of slurry formulations, according to various embodiments.
Figure 7:
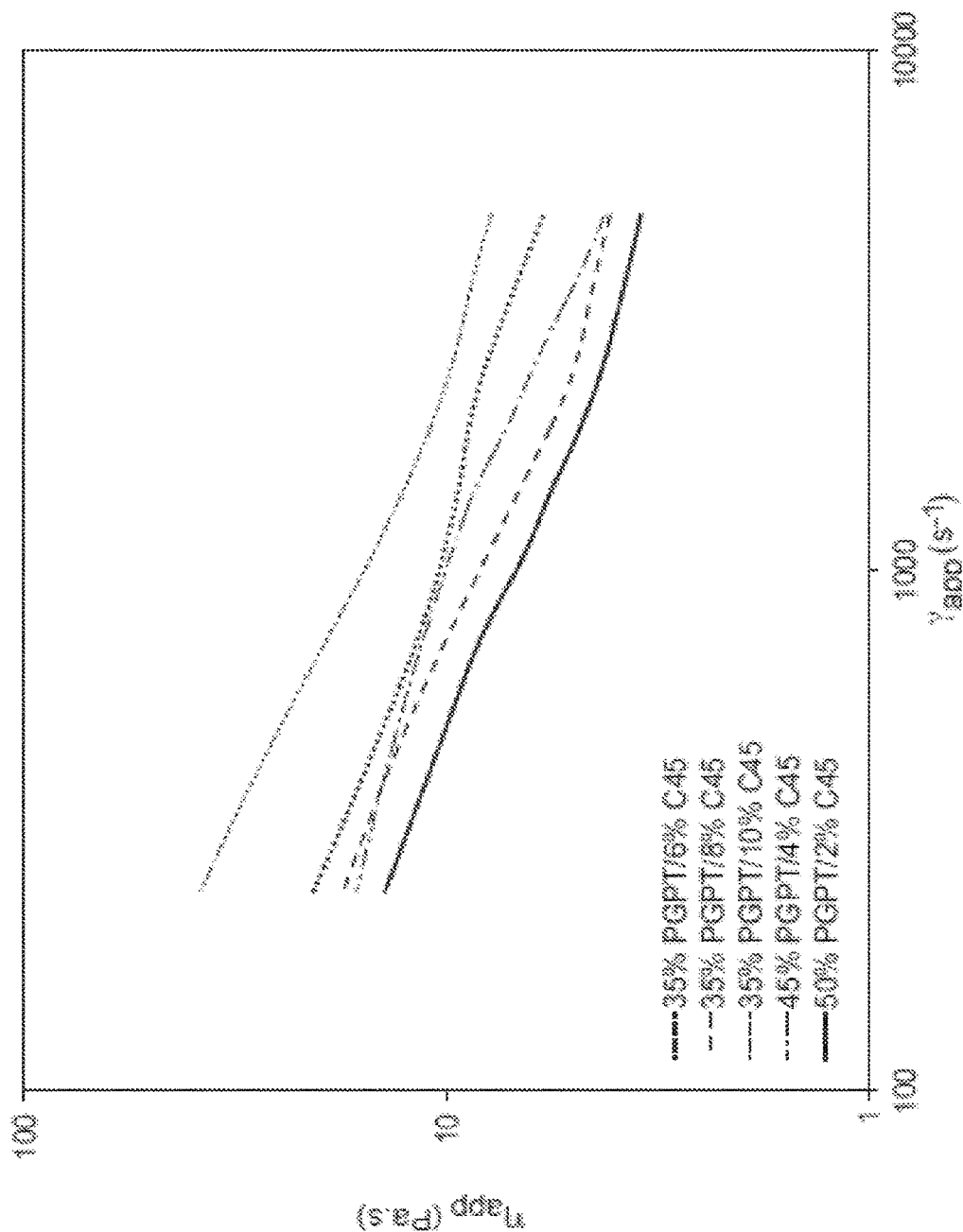

In some embodiments, the conductive additive can affect the rheology of the suspension. Thus, in such embodiments, at the same loading levels of conductive additive, increasing concentrations of active materials can contribute to the rheology of the slurry by increasing the shear viscosity of the suspension. FIG. 6 illustrates rheological characteristics including the apparent viscosity ($\eta_{appr}$, Pa-s) and apparent shear rate ($\gamma_{appr}$, s$^{-1}$) for various formulations of semi-solid cathode 140 slurries that are formulated from about 35% to about 50% by volume NMC and about 6% to about 12% by volume of conductive additive C45. FIG. 7 illustrates the rheological characteristics described herein for various formulations of semi-solid anode 150 slurries formulated from about 35% to about 50% by volume graphite (PGPT) and about 2% to about 1.0% by volume of the conductive additive C45. The apparent viscosity of the slurries described herein decreases as the apparent shear rate increases.

Figure 8:
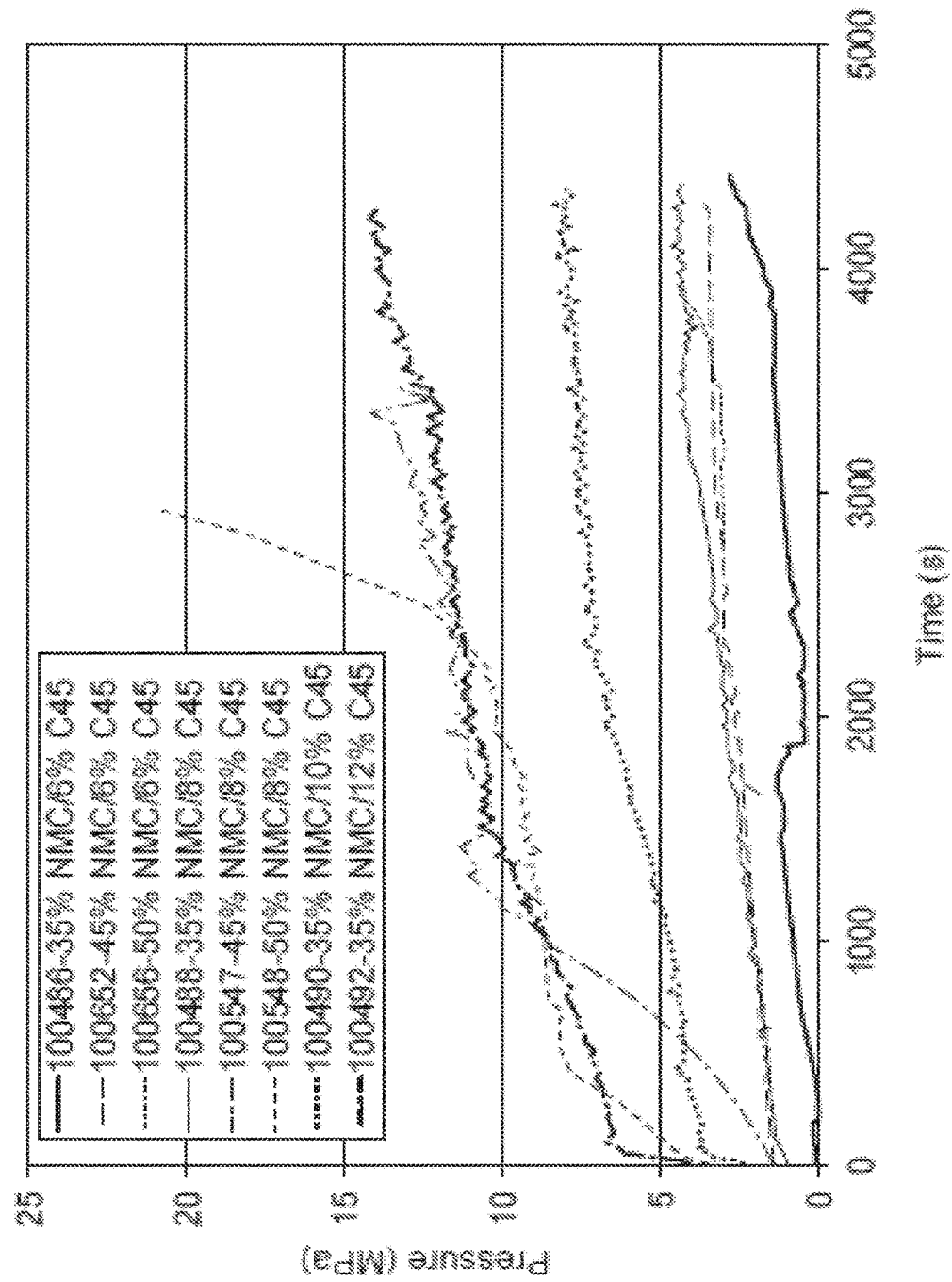
Figure 9:
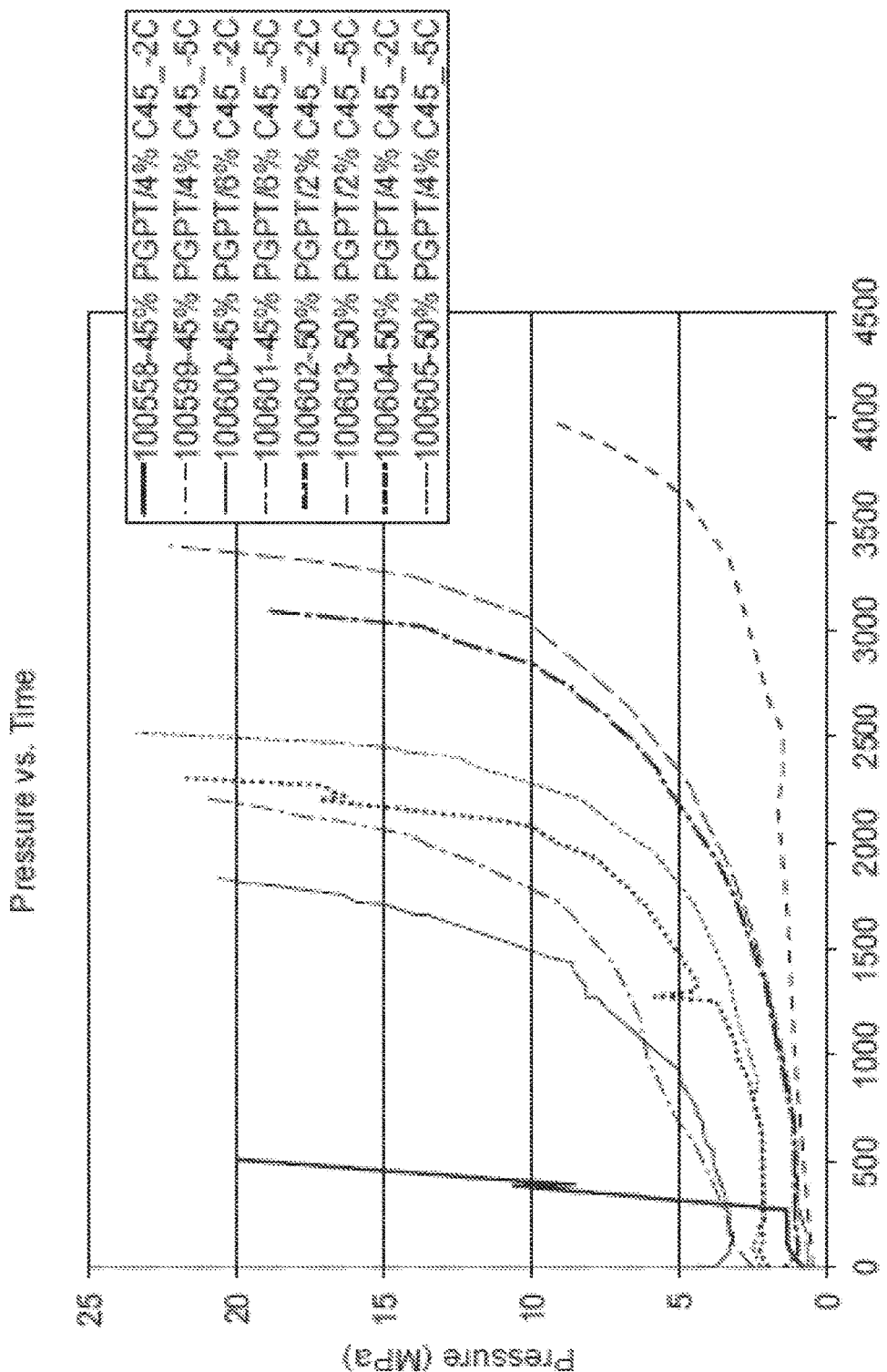

The slurry suspensions can be prone to separation and flow instabilities, structure development, mat formation and/or binder filtration when flowing under a critical shear stress values due to a low viscosity liquid matrix in the formulation. Such behavior can be characterized using a capillary rheometer using a small diameter and a long L/D. The compositional formulation, especially conductive carbon loading levels, and the extrusion temperature can impact such structural changes during a pressure driven flow. FIG. 8 and FIG. 9 illustrate time-pressure graphs for various formulations of a first slurry that includes about 35%-50% NMC and about 6%-12% C45 (FIG. 8) and various formulations of a second, slurry that includes about 45%-50% PGPT and about 2%-6% C45 (FIG. 9). As shown herein, varying amounts of pressure are required to dispense or flow a predefined quantity of slurry within a predetermined time period depending on the rheological characteristics of the slurry, for example the apparent viscosity and the apparent shear rate. In some embodiments, the apparent viscosity of the prepared, slurry at an apparent shear rate of about 1,000 s$^{-1}$ can be less than about 100,000 Pa-s, less than about 10,000 Pa-s, or less than about 1,000 Pa-s. In some embodiments, the reciprocal of mean slurry viscosity can be greater than about 0.001 1/(Pa-s). Some slurry formulations include three main components such as, for example, active material, (e.g., NMC, lithium iron phosphate (LFP), Graphite, etc.), conductive additive (e.g., carbon black), and electrolyte (e.g., a mix of carbonate based solvents with dissolved lithium based salt) that are mixed to form the slurry. In some embodiments, the three main components are mixed in a batch mixer. In some embodiments, active materials are first added to the mixing bowl followed by solvents. In some embodiments, the electrolyte can be incorporated homogeneously with a dense active material without experiencing any 'backing out' of material from the mixing section of the mixing bowl to form an intermediate material. Once the solvent and active materials are fully mixed, they can form a loose, wet paste. The conductive additive can be added to this intermediate material (i.e., loose paste), such that it can be evenly incorporated into the mix. In some embodiments, the active material can tend not to aggregate into clumps. In other embodiments, the components can be combined using another order of addition, for example, the solvent can be added first to the mixing bowl, then the active material added, and finally the additive can be added, in other embodiments, the slurry can be mixed using any other order of addition.

As mixing energy increases, homogeneity of the mixture can increase. If mixing is allowed to continue, eventually excessive mixing energy can be imparted to the slurry. For example, as described herein, excessive mixing energy can produce a slurry characterized by low electronic conductivity. As mixing energy is added to the slurry, the aggregates of conductive additive can be broken up and dispersed, which can tend to form a network like conductive matrix, as described above with reference to FIGS. 2 and 3. As mixing continues, this network can degrade as carbon particles are separated from each other, forming an even more homogenous dispersion of carbon at the microscopic scale. Such an over-dispersion and loss of network can exhibit itself as a loss of electronic conductivity, which is not desirable for an electrochemically active slurry. Furthermore, a slurry having excessive mixing energy imparted to it can display unstable rheology. As the carbon network affects mechanical, as well as electronic characteristics of the slurry, formulations which have been over mixed tend to appear "wetter" than slurries subjected to a lesser amount of mixing energy. Slurries having experienced an excessive amount, of mixing energy also tend to show poor long term compositional homogeneity as the solids phases tend to settle due to gravitational forces. Thus, a particular composition can have favorable electrical and/or rheological properties when subject to an appropriate amount, of mixing. For any given formulation, there is a range of optimal mixing energies to give acceptable dispersion, conductivity and rheological stability.

Figure 10:
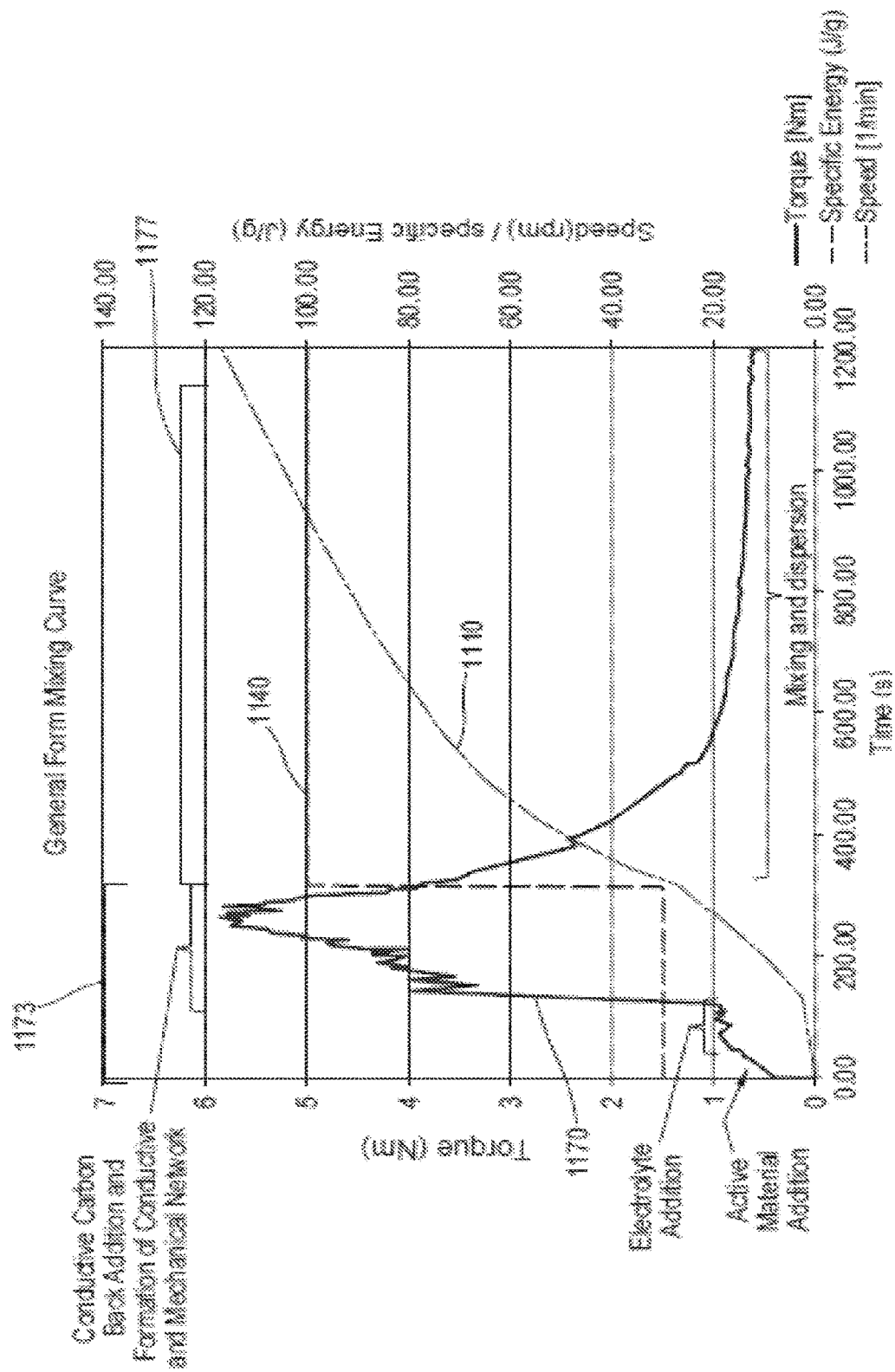
FIGS. 10-12 are plots illustrating mixing curves, according to various embodiments.
Figure 11:
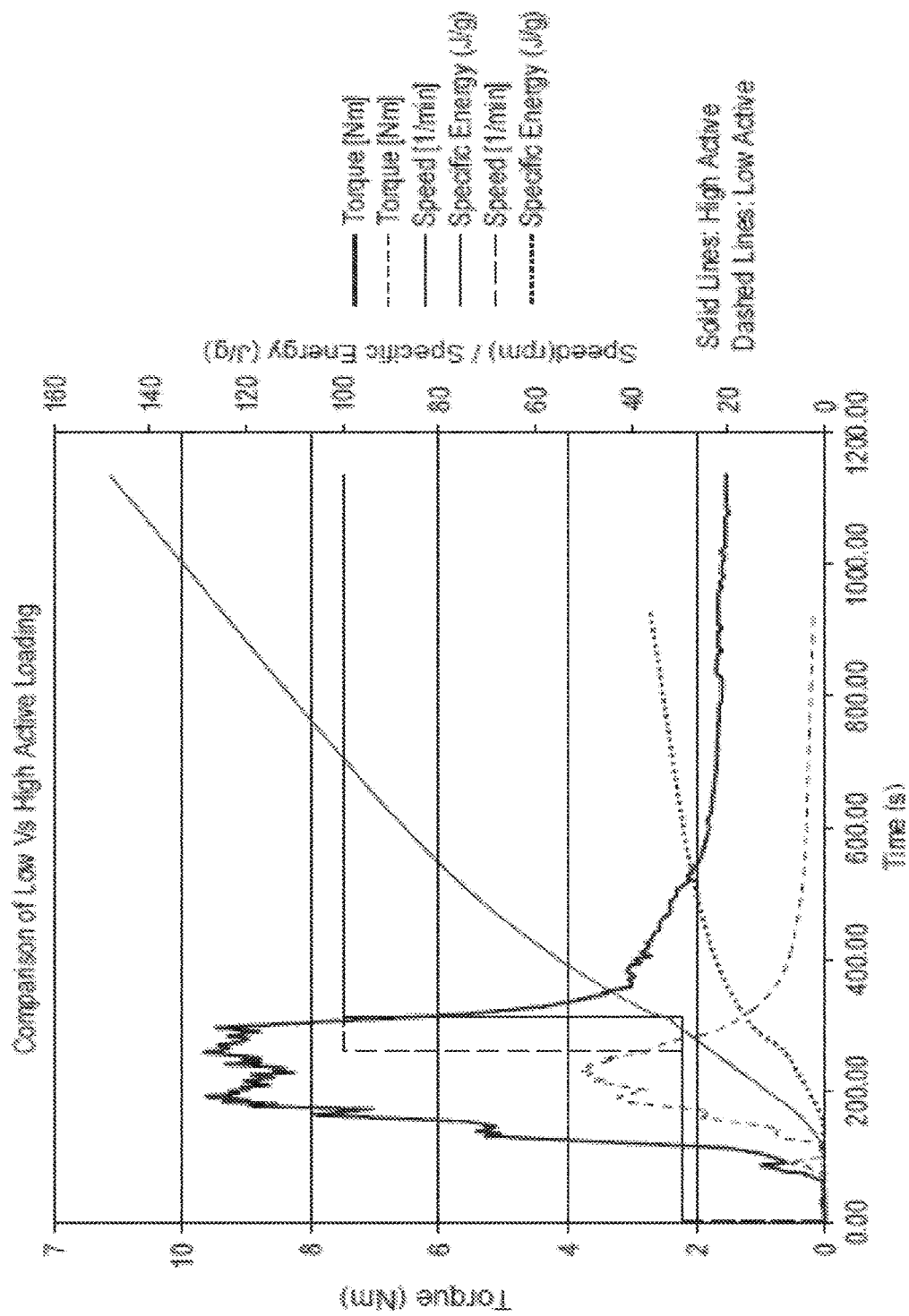
Figure 12:
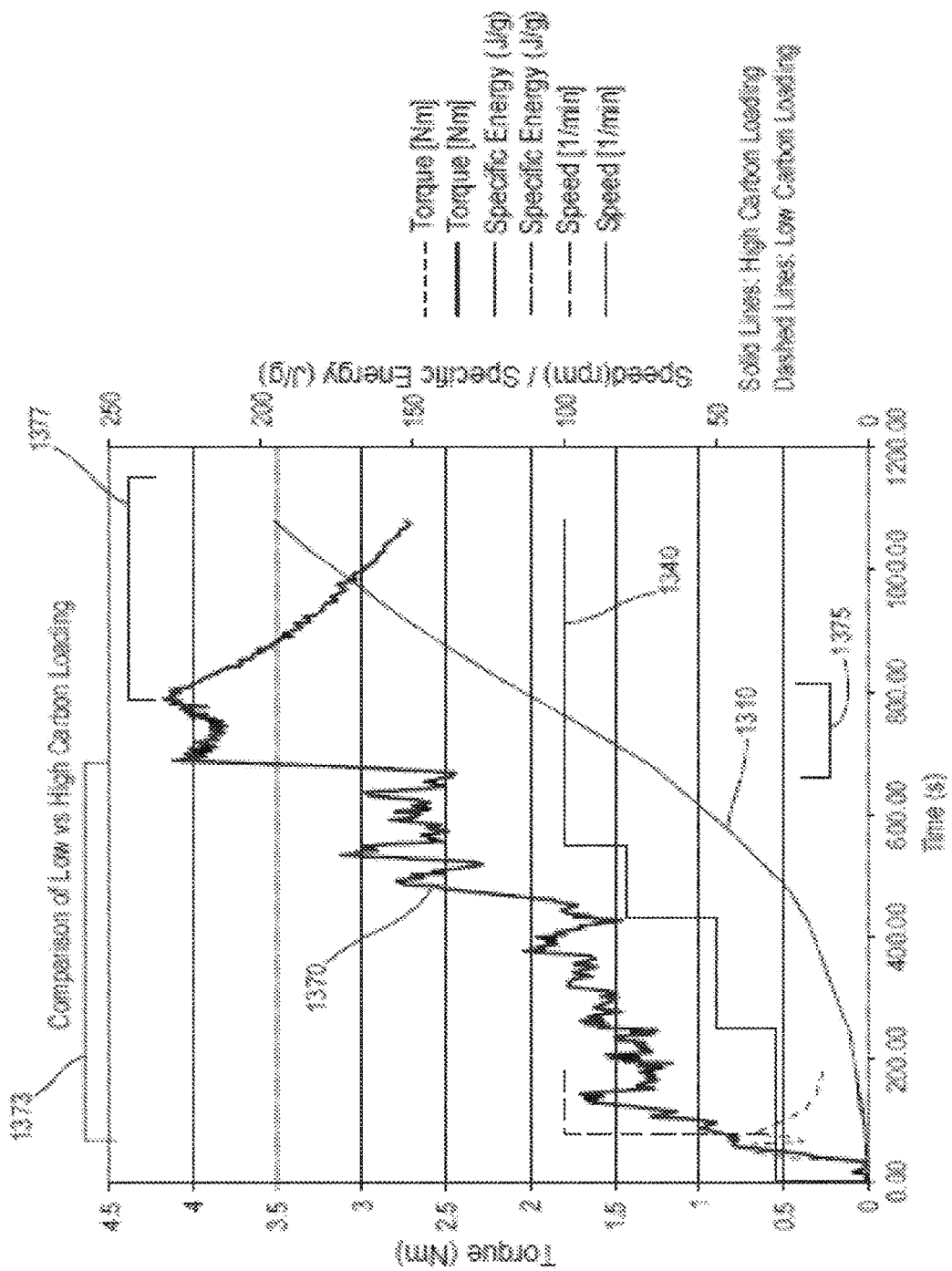

FIGS. 10-12 are plots illustrating an example mixing curve, comparative mixing curves of low and high active material loading for the same carbon additive loading, and comparative mixing curves of low and high carbon additive loading for the same active material loading, respectively.

FIG. 10 depicts a mixing curve including the specific mixing energy 1110, the speed 1140, and the torque 1170, of slurry, according to an embodiment. The first zone 1173 shows the addition of the raw materials. In some embodiments, the active material is added to the mixer, then the electrolyte, and finally the conductive additive (carbon black). The carbon additive takes the longest time to add to the mixing bowl due to the difficulty of incorporating a light and fluffy powder into a relatively dry mixture. The torque curve 1170 provides an indication of the viscosity, particularly, the change in viscosity. As the viscosity of the mixture increases with the addition of the carbon black, the torque required to mix the slurry increases. The increasing viscosity is indicative of the mechanical carbon network being formed. As the mixing continues in the second zone 1177, the mixing carve shows the dispersion of the raw materials and relatively lower viscosity as evidenced by the decreased torque required to mix the slurry.

FIG. 11 illustrates the difference between a low and high loading of active materials. It can be seen from this curve that the length of time needed to add the conductive carbon additive is approximately equal for low and high active loadings, but the overall torque (and consequently the mixing energy) is much higher for the higher active loading. This is indicative of a much higher viscosity.

FIG. 12 illustrates the difference between a low and high conductive carbon additive loading for the same active material loading. The mixing curve for the high carbon loading includes the specific mixing energy 1310, the speed 1340 and the torque 1373. The first zone 1373 shows the addition of raw materials. As the viscosity of the mixture increases with the addition of the carbon black, the torque required to mix the slurry increases as seen in the first mixing zone 1375. The increasing viscosity is indicative of the carbon network being formed. As the mixing continues in the second zone 1377, the mixing curve shows the dispersion of the raw materials and relatively lower viscosity as evidenced by the decreased torque required to mix the slurry. It should be noted that the time needed to add the carbon conductive additive is much longer for the high carbon loading and the overall torque (and mixing energy) is also much higher. This mixing curve illustrates that carbon loading has a much higher impact on material viscosity than active material loading.

Figure 13:
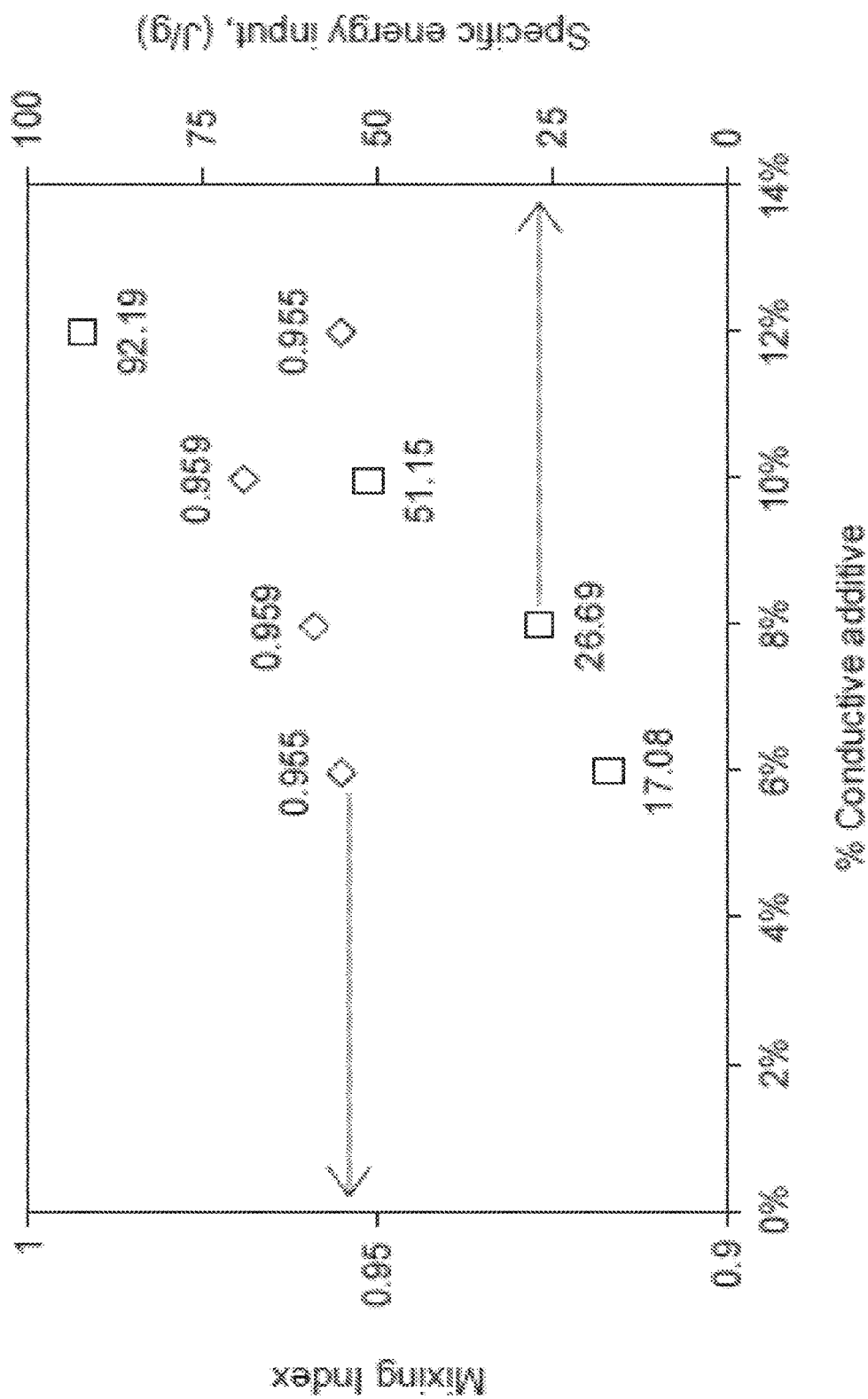
FIG. 13 is a plot illustrating the relationship of mixing index with specific energy input and conductive additive loading, according to various embodiments.

As described herein, compositional homogeneity of the slurry will generally increase with mixing time and the compositional homogeneity can be characterized by the mixing index. FIG. 13 illustrates the specific energy input required to achieve different mixing indexes for slurries of different conductive additive loadings. As shown, a higher amount of specific energy input is required to achieve the desired, specific index, e.g., about 0.95 as the vol % of conductive additive is increased in the slurry formulation. In some embodiments, the slurry is mixed until the slurry has a mixing index of at least about 0.8, about 0.9, about 0.95, or about 0.975, inclusive of all mixing indices therebetween.

Figure 14:
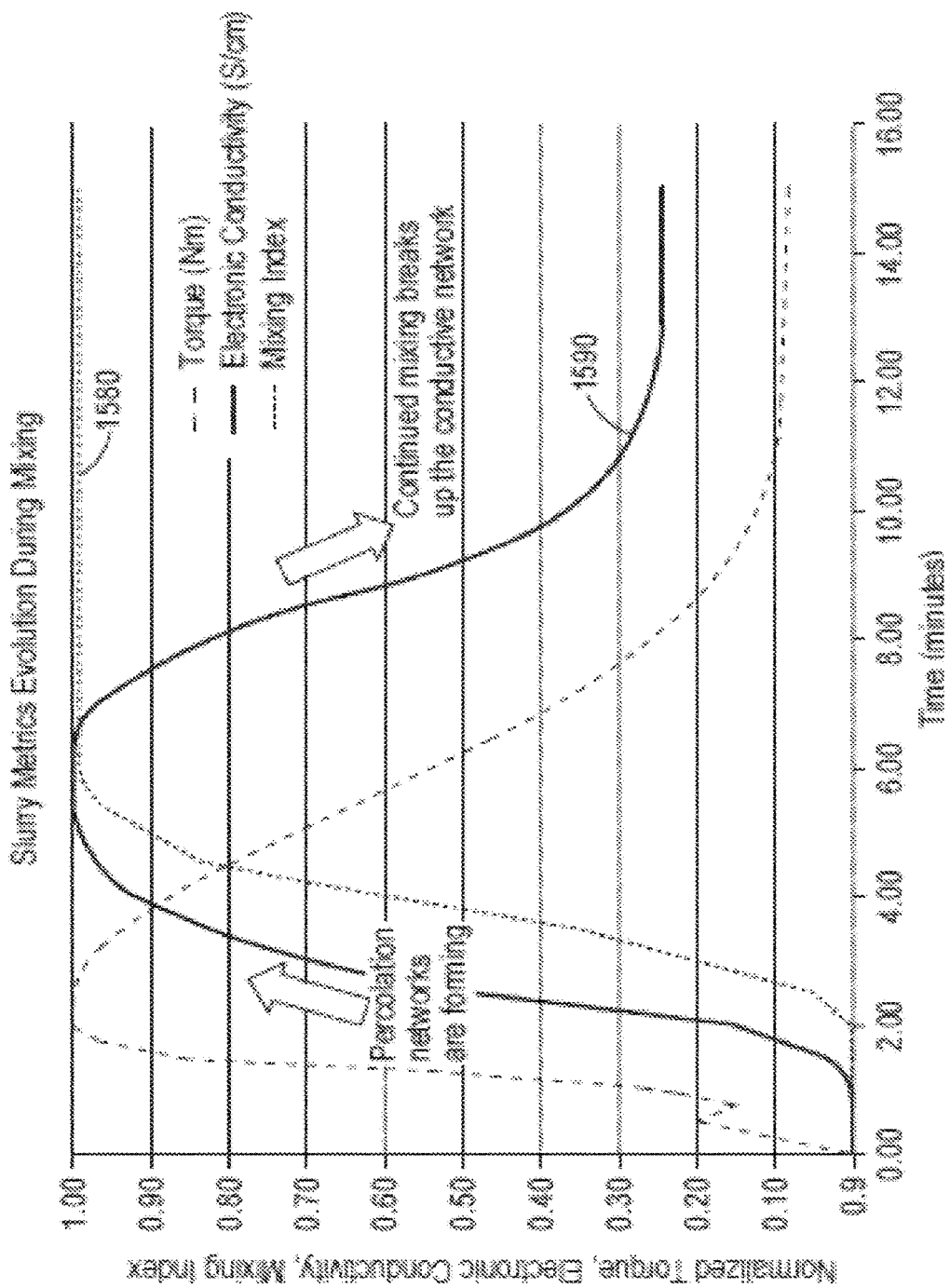
FIG. 14 is a plot illustrating the effect of mixing on certain slurry parameters, according to various embodiments.

FIG. 14 illustrates the effect of mixing on certain slurry parameters that include the mixing index and the electronic conductivity of the slurry, according to an embodiment. The mixing index 1580 rises monotonically while electronic conductivity 1590 initially increases (as conductive network is dispersed within the media), achieves a maximum value, and then decreases (network disruption due to "over mixing").

Figure 15:
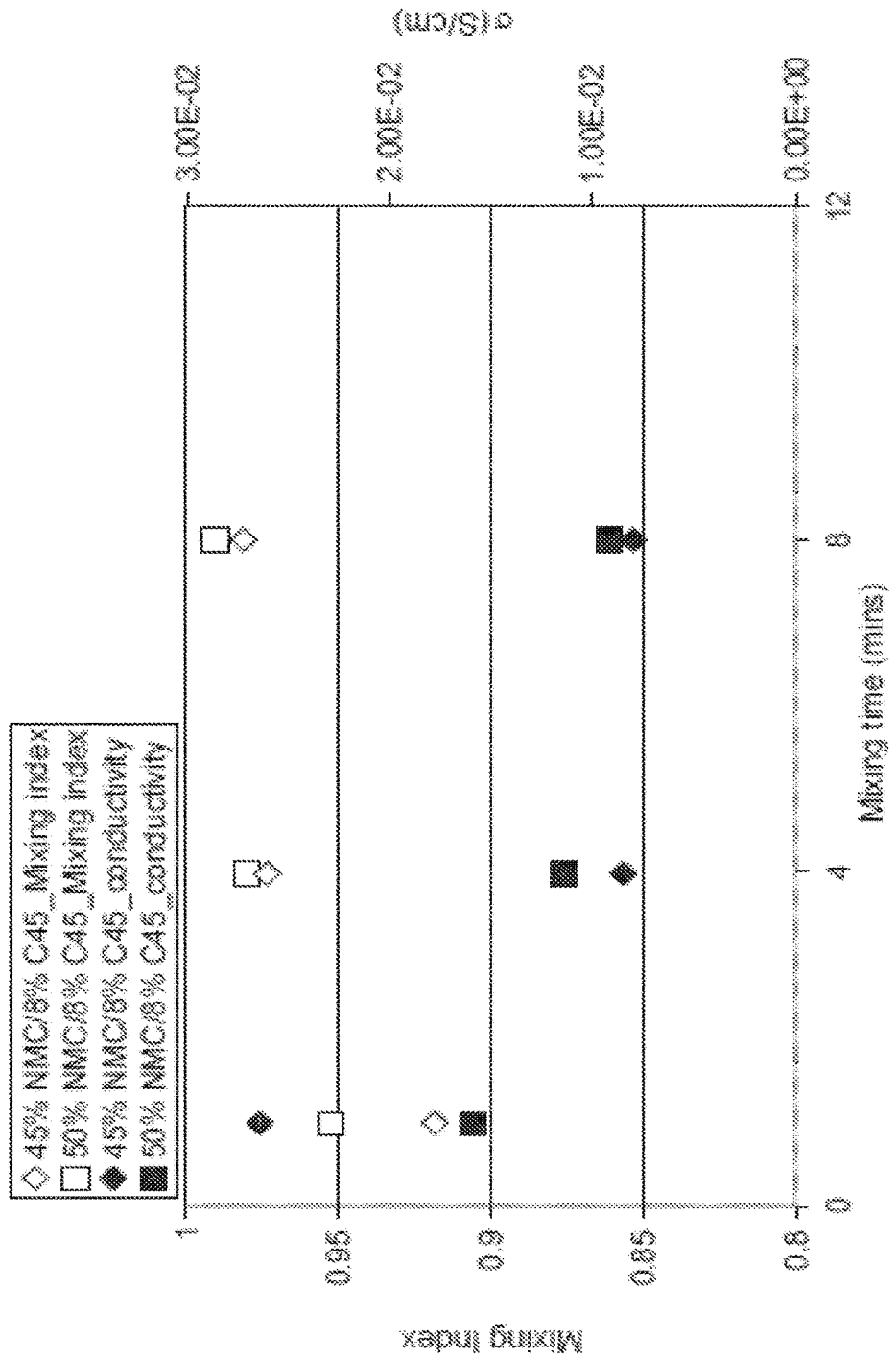
FIG. 15 illustrates the evolution of mixing index and conductivity with mixing duration at 100 rpm, for two different cathode compositions.

In some embodiments, the mixing time can have a simultaneous impact on the mixing index and conductivity of an electrode slurry. FIG. 15 illustrates the effect of mixing time on the mixing index and conductivity of various slurry formulations that include about 45%-50% NMC and about 8% C45. Here, and in subsequently presented measurements of mixing index, the mixing index is measured by taking sample volumes of 0.12 mm$^3$ from a batch of the electrode slurry that has a total volume greater than the sum of the individual sample volumes. Each sample volume of slurry is heated in a thermo gravimetric analyzer (TGA) under flowing oxygen gas according to a time-temperature profile beginning with a 3 minute hold, at room temperature, followed by heating at 20° C./min to 850° C., with the cumulative weight loss between 150° C. and 600° C. being used to calculate the mixing index. As shown in FIG. 15, the mixing index is observed to increase but the conductivity is observed to decrease with increased mixing times. In these embodiments, a mixing time of about 2 minutes provided a good, compromise between the conductivity and the mixing index, e.g., the slurry composition composed of 50% NMC and 8% C45 was observed to have a mixing index of about 0.95 and a conductivity of about 0.02 S/cm. Any further mixing has a negative impact on the conductivity.

Figure 16:
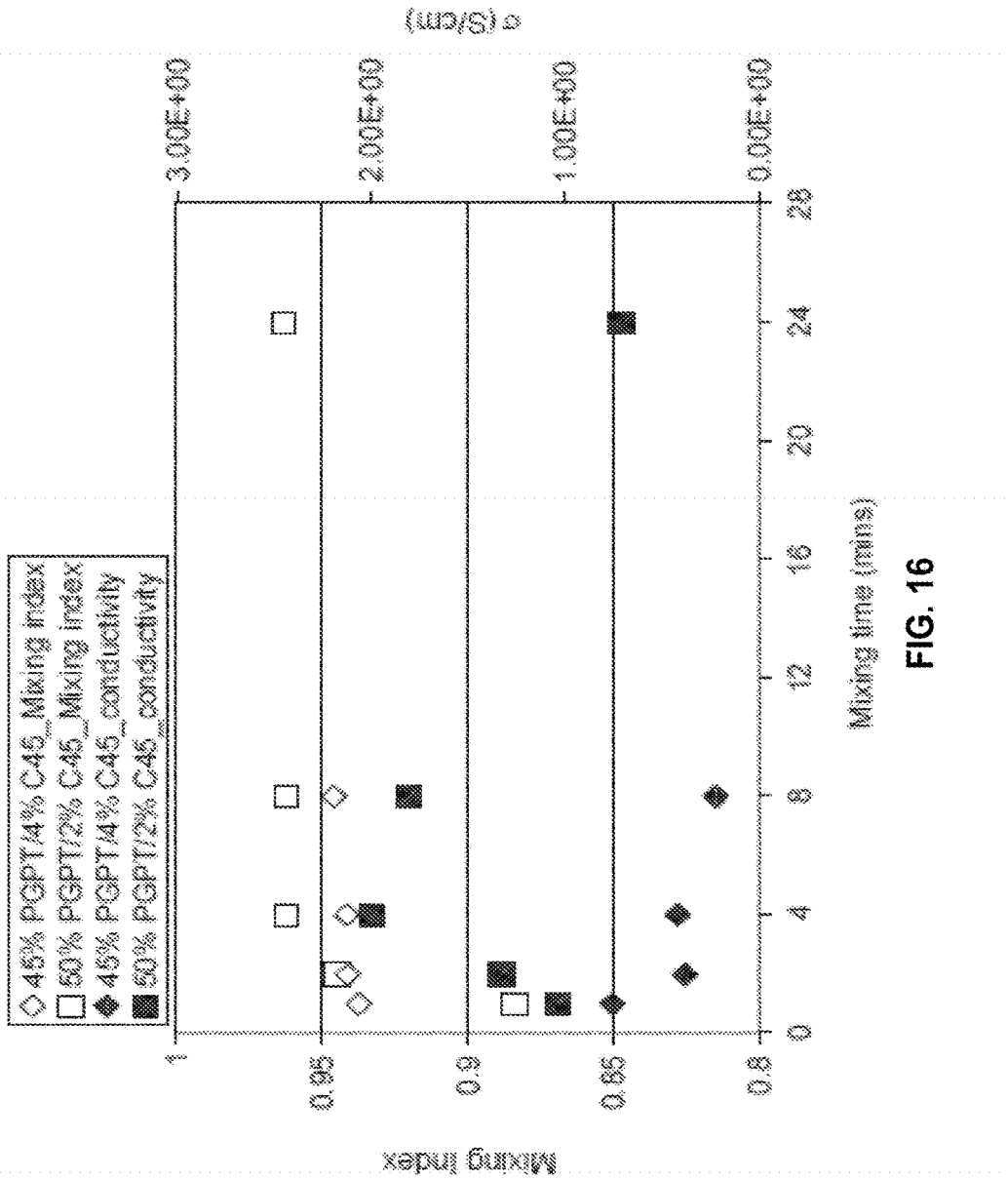
FIG. 16 illustrates the evolution of mixing index and conductivity with mixing duration at 100 rpm, for two different anode compositions.

FIG. 16 illustrates the effect of mixing time on the mixing index and conductivity of various shiny formulations that include about 45%-50% PGPT and about 2%-4% C45. For the 50% PGPT and 2% C45 mixture, the conductivity is observed to initially rise, peaking at a 4 minute mixing time, and then decrease by more than a factor of two at 24 minutes—consistent with the trend described in FIG. 14. Therefore the mixing times required to get an optimal mixing index and conductivity of a slurry depend on the slurry formulation.

Figure 17:
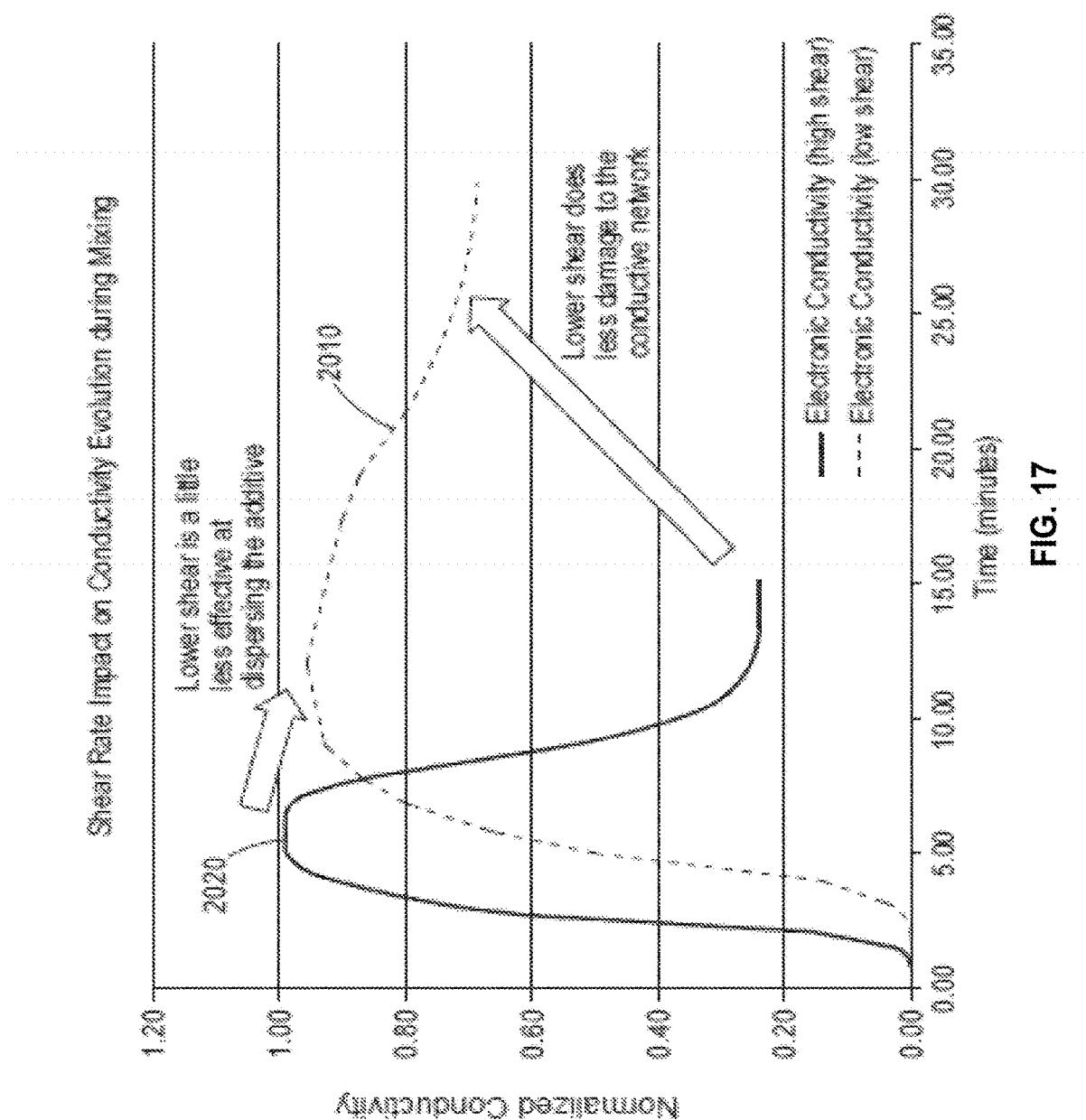
FIG. 17 is a plot illustrating conductivity as a function of mixing time for two shear conditions, according to various embodiments.

In some embodiments, shear rate can influence mixing dynamics and conductivity. As a result, in some embodiments, the selection of mixing element rotation speed, container and/or roller size, clearance dimensions/geometry, and so forth can have an effect on conductivity. FIG. 17 is a plot depicting conductivity as a function of mixing time for two different shear conditions. As shown, the slurry subjected to the lower shear mixing 2010 is less sensitive to over mixing. The slurry subject to higher shear mixing 2020 has a slightly higher peak conductivity, reaches the maximum conductivity with less mixing, and is more sensitive to over mixing. In some embodiments, the optimal mixing time can be 20 seconds, 2 minutes, 4 minutes or 8 minutes, inclusive of mixing times therebetween.

Figure 18:
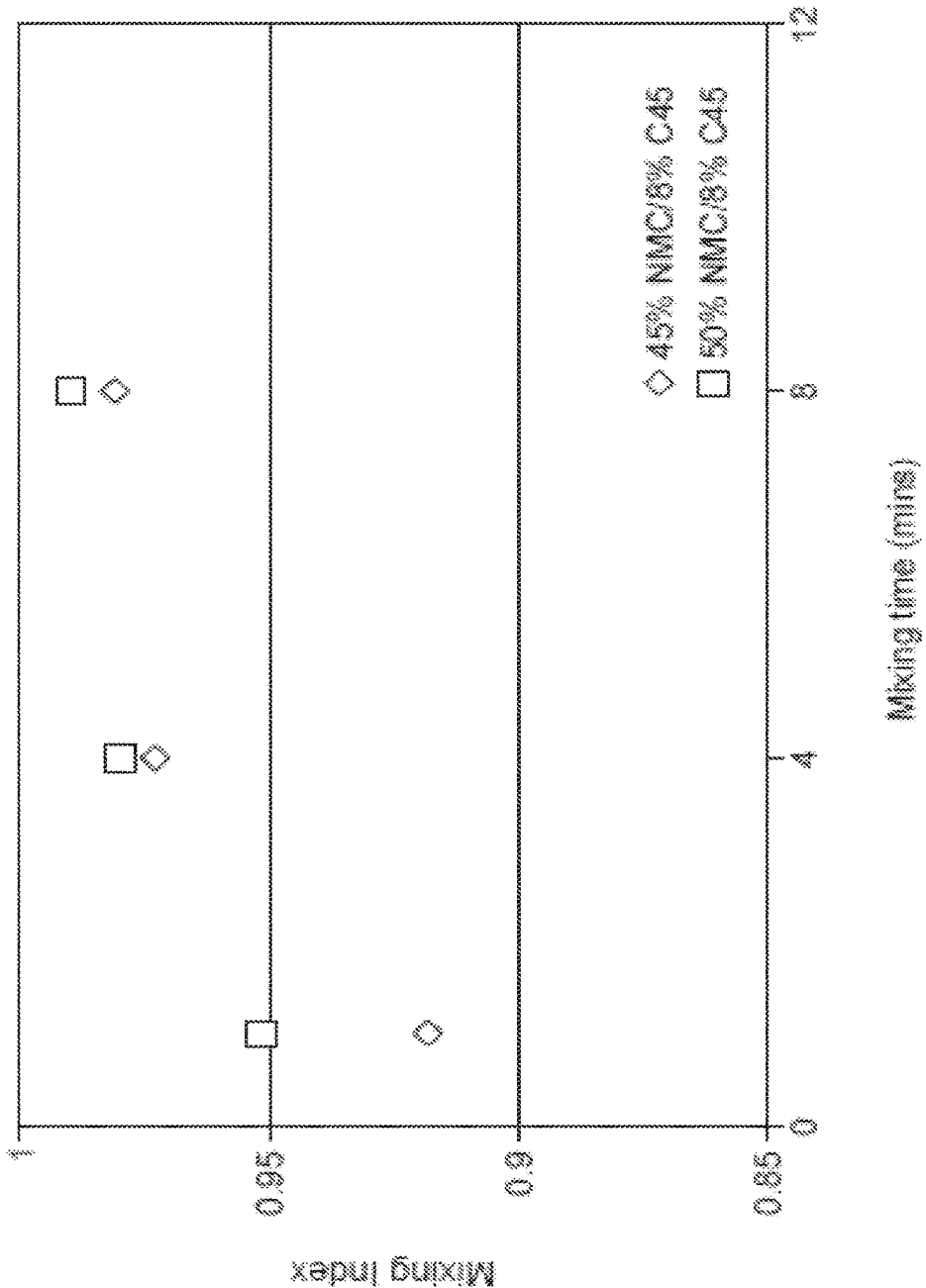
FIG. 18 illustrates the mixing index over time for two different exemplary cathode compositions.
Figure 19:
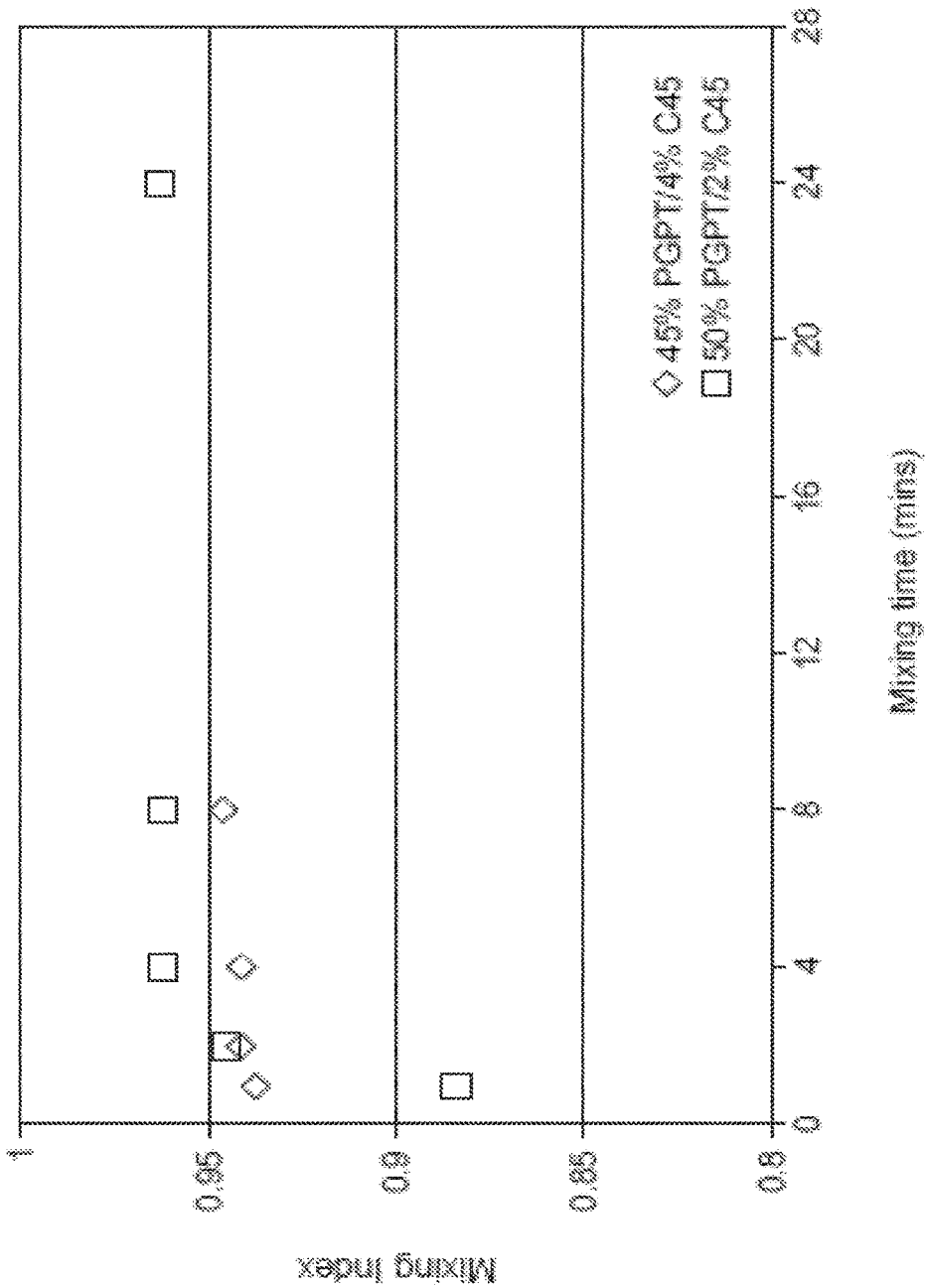
FIG. 19 illustrates the mixing index over time for two different exemplary anode compositions.

In some embodiments, the progression of mixing index over time for a fixed RPM (e.g., 100 RPM) mixing speed can depend on the composition of the materials being mixed. For example, FIG. 18 illustrates the mixing index at 100 rpm over time for a first cathode composition that includes about 45% NMC and about 8% C45, and a second cathode composition that includes about 50% NMC and about 8% C45. The mixing index of FIG. 19 illustrates the mixing index at 100 rpm over time for a first anode composition that includes about 45% PGPT and about 4% C45 and a second anode composition that includes about 50% PGPT and 2% C45. In each case, nine samples having volumes in the range of about 0.1-0.2 cubic millimeters were used to quantify the mixing index. As shown in FIG. 18 and FIG. 19 the cathode and anode slurries show an increase in the mixing index with mixing time. As shown in FIG. 19, the mixing index can, for example, plateau after a certain mixing time, e.g., 8 minutes, after which any more mixing does not cause an increase in the mixing index.

Figure 20:
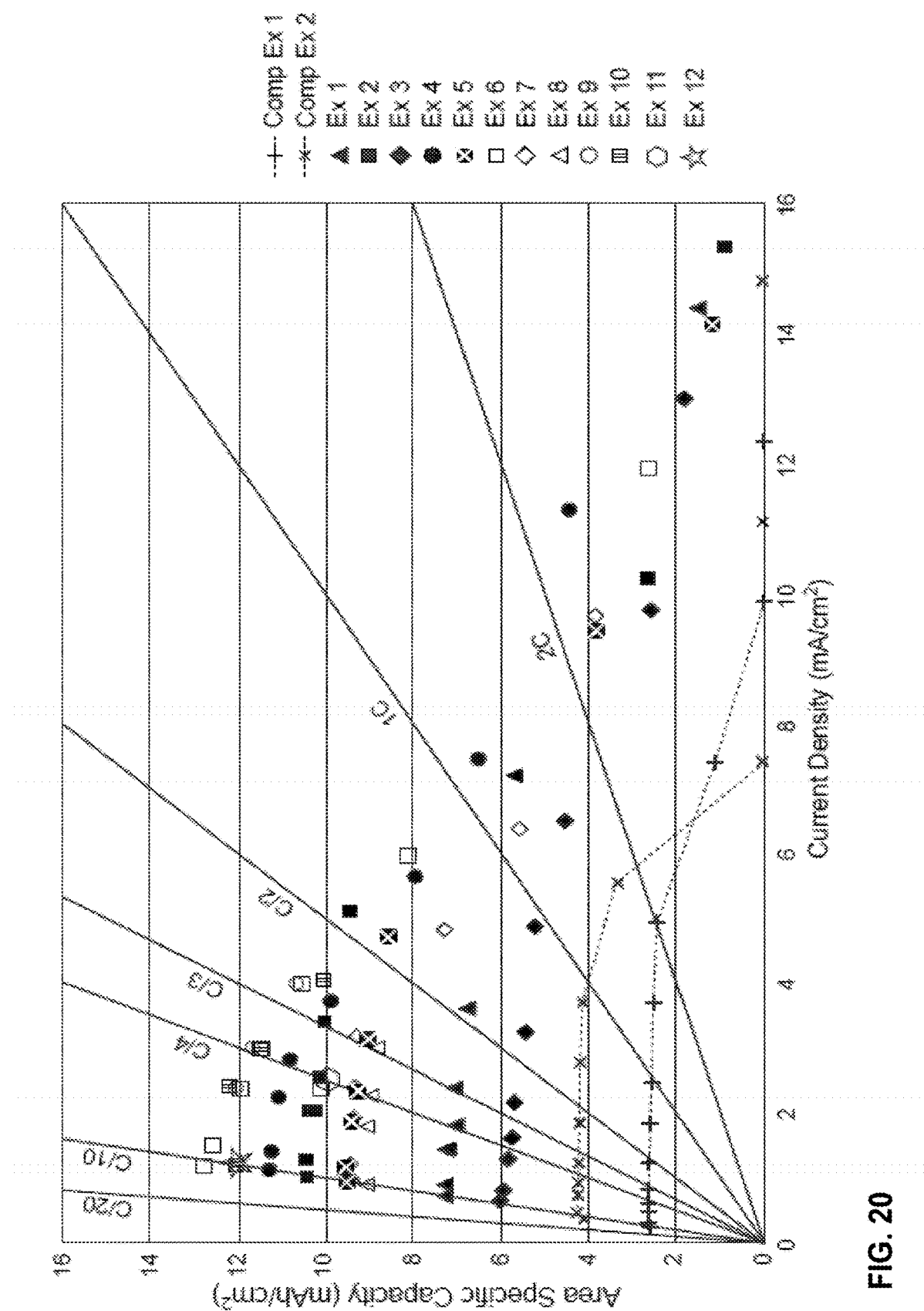
FIG. 20 illustrates the area specific capacity vs. current density at various C-rates of seven different electrochemical cells that include at least one semi-solid electrode described herein, in comparison with commercially available batteries.

The following examples show the electrochemical properties of various electrochemical cells that include the semi-solid electrodes described herein, compared with two conventional tablet batteries that include Li-ion Tablet Battery 1 and Li-ion Tablet Battery 2. FIG. 20 summarizes the electrochemical properties of the semi-solid electrode formulations and the comparative batteries. These examples are only for illustrative purposes and are not intended to limit the scope of the present disclosure.

Comparative Example 1

A first commercially available tablet battery, Li-ion Tablet Battery 1 (also referred to as "Comp Ex 1") was discharged at various C-rates as shown in FIG. 20. At C/2 rate, corresponding to a current density of about 1 mA/cm$^2$, the Comp Ex 1 battery had an area specific capacity of about 2.7 mAh/cm$^2$. At 1 C rate, corresponding to a current density of about 2.2 mA/cm$^2$, the area specific capacity is still about 2.7 mAh/cm$^2$. However, above current density of about 5 mA/cm$^2$, the area specific capacity drops rapidly until it is nearly zero at about 10 mA/cm$^2$.

Comparative Example 2

A second commercially available tablet battery, Li-ion Tablet Battery 2 (also referred to as "Comp Ex 2") was discharged at various C-rates as shown in FIG. 20. At C/2 rate, corresponding to a current density of about 1.75 mA/cm$^2$, the Comp Ex 1 battery had an area specific capacity of about 4.2 mAh/cm$^2$. At 1 C rate, corresponding to a current density of about 4 mA/cm$^2$, the area specific capacity is about 4 mAh/cm$^2$. However, above current density of about 4 mA/cm$^2$, the area specific capacity drops rapidly until it is nearly zero at about 7.5 mA/cm$^2$.

Example 1

An electrochemical half cell Example 1 (also referred to as "Ex 1") was prepared using a semi-solid cathode and a Li metal anode. The LFP semi-solid cathode was prepared by mixing 45 vol % LFP and 2 vol % carbon black with an ethylene carbonate/dimethyl carbonate/LiPF$_6$ based electrolyte. The cathode slurry was prepared using a batchmixer with a roller mill blade fitting. Mixing was performed at 100 rpm for about 2 minutes. The semi-solid slurry had a mixing index greater than 0.9 and a conductivity of 1.5×10$^{-4}$ S/cm. The slurry was made into an electrode of about 250 µm thickness and was tested against a Li metal anode in a Swagelok cell configuration. The cell was tested using a Maccor battery tester and was cycled between a voltage range of V=2-4.2 V. The cell was charged using a constant current-constant voltage (CC-CV) procedure with a constant current rate at C/10 and C/8 for the first two cycles then at C/5 for the latter cycles. The constant current charge is followed by a constant voltage hold at 4.2 V until the charging current decreased to less than C/20. The cell was discharged over a range of current densities corresponding to C-rates between C/10 and 5 C. As shown in FIG. 20, at C-rates below C/4, the Ex 1 battery had an area specific capacity of greater than about 7 mAh/cm$^2$, much greater than for the batteries in Comp Ex 1 and Comp Ex 2. At C/2 rate, corresponding to a current density of about 3.7 mA/cm$^2$, the Ex 1 battery had an area specific capacity of about 6.8 mAh/cm$^2$. At 1 C rate, corresponding to a current density of about 6 mA/cm$^2$, the area specific capacity is about 6 mAh/cm$^2$. At these C-rates, the area specific capacity is higher than for the batteries in Comp Ex 1 and Comp Ex 2. Moreover, with increasing current density beyond about 6 mA/cm$^2$, the area specific capacity falls off much more gradually than for the batteries in Comp Ex 1 and Comp Ex 2.

Example 2

An electrochemical half cell Example 2 (also referred to as "Ex 2") was prepared using a semi-solid cathode and a lithium metal anode. The cathode slurry was prepared by mixing 45 vol % Li(Ni,Mn,Co)O$_2$ and 8 vol % carbon additive with an ethylene carbonate/dimethyl carbonate/LiPF$_6$ based electrolyte. The cathode slurry was prepared using a batchmixer fitted with roller blades. Mixing was performed at 100 rpm for about 4 minutes. The slurry was made into an electrode of about 250 µm thickness and was tested against a Li metal anode in a Swagelok cell configuration. The cell was tested, using a Maccor battery tester and was cycled over a voltage range of V=2-4.3 V. The cell was charged using a CC-CV procedure with the constant current portion being at C/10 and C/8 rate for the first two cycles then at C/5 rate for later cycles. The constant current charge step was followed by a constant voltage hold at 4.2 V until the charging current decreased to less than C/20. The cell was then discharged over a range of current density. As shown in FIG. 20, at C-rates below C/4, the Ex 2 battery had an area specific capacity of greater than, about 10 mAh/cm$^2$, much greater than for the batteries in Comp Ex 1 and Comp Ex 2. At a C/2 rate, corresponding to a current density of about 4.5 mA/cm$^2$, the Ex 2 battery had an area specific capacity of about 9.5 mAh/cm$^2$. At 1 C rate, corresponding to a current density of about 8 mA/cm$^2$, the area specific capacity is about 8 mAh/cm$^2$. At these C-rates, the area specific capacity is higher than for the batteries in Comp Ex 1 and Comp Ex 2. Moreover, with increasing current density beyond about 6 mA/cm$^2$, the areal capacity falls off much more gradually than for the batteries in Comp Ex 1 and Comp Ex 2.

Example 3

An electrochemical full cell Example 3 (also referred to as "Ex 3") included a semi-solid cathode formulated from 35 vol % Li(Ni,Mn,Co)O$_2$ such that the semi-solid cathode had a thickness of about 250 μm, and was tested against a semi-solid anode formulated, from 40 vol % graphite and 2 vol % carbon additive such that the anode had a thickness of about 500 μm. The NMC semi-solid cathode was prepared by mixing 35 vol % NMC and 8 vol % carbon black with an ethylene carbonate/dimethyl carbonate/LiPF$_6$ based electrolyte. The cathode slurry was prepared using a batchmixer fitted with roller blades. Mixing was performed at 100 rpm for 4 minutes. The graphite semi-solid anode was prepared by mixing 40 vol % graphite and 2 vol % carbon black using the same electrolyte as the cathode. The anode slurry formulation was mixed at 100 rpm for about 30 seconds to yield, a semi-solid anode suspension. The electrodes were used to form a NMC-Graphite based electrochemical foil cell having active areas for both cathode and anode of approximately 80 cm$^2$. The electrochemical full cell Ex 3 was charged using a CC-CV procedure and a constant current discharge between 2.75-4.2 V using a Maccor tester. The cell was discharged, over a range of current densities. As shown in FIG. 20, at C-rates below C/4, the Ex 3 battery had an area specific capacity of about 6 mAh/cm$^2$, much greater than for the batteries in Comp Ex 1 and Comp Ex 2. At C/2 rate, corresponding to a current density of about 2.8 mA/cm$^2$, the Ex 3 battery had an area specific capacity of about 5.7 mAh/cm$^2$. At 1 C rate, corresponding to a current density of about 7.2 mA/cm$^2$, the area specific capacity is about 7.5 mAh/cm$^2$. At these C-rates, the area specific capacity is higher than for the batteries in Comp Ex 1 and Comp Ex 2. Moreover, with increasing current density beyond about 6 mA/cm$^2$, the area specific capacity falls off much more gradually than for the batteries in Comp Ex 1 and Comp Ex 2.

Example 4

An electrochemical full cell Example 4 (also referred to as "Ex 4") included a semi-solid cathode formulated from 35 vol % Li(Ni,Mn,Co)O$_2$ such that the semi-solid cathode had a thickness of about 500 μm. The semi-solid cathode tested against a semi-solid anode formulated from 40 vol % graphite and 2 vol % carbon additive such that the anode had a thickness of about 500 μm. The NMC semi-solid cathode was prepared by mixing 35 vol % NMC and 8 vol % carbon additive with an ethylene carbonate/dimethyl carbonate/LiPF$_6$ based electrolyte. The cathode slurry was mixed in a mixer fitted with roller blades for about 4 minutes at about 100 rpm. The graphite semi-solid anode was prepared by mixing 40 vol % graphite and 2 vol % carbon additive using the same electrolyte as the cathode. The anode slurry formulation was also mixed in a mixer fitted with roller blades for about 30 seconds at 100 rpm. The Ex 4 electrochemical full cell had active areas for both cathode and anode of approximately 80 cm$^2$. The Ex 4 full cell was charged and discharge using a CC-CV procedure and a constant current discharge between 2.75-4.2 V using a Maccor tester. The cell was discharged over a range of current densities. As shown in FIG. 20, at C-rates below C/4, the Ex 4 battery reaches an area specific capacity greater than about 1.1 mAh/cm$^2$, much greater than for the batteries in Comp Ex 1 and Comp Ex 2. At C/2 rate, corresponding to a current density of about 4.8 mA/cm$^2$, the Ex 4 battery had an area specific capacity of about 9.5 mAh/cm$^2$. At 1 C rate, corresponding to a current density of about 6.8 mA/cm$^2$, the area specific capacity is about 7 mAh/cm$^2$. At these C-rates, the area specific capacity is higher than for the batteries in Comp Ex 1 and Comp Ex 2. Moreover, with increasing current density beyond 6 mA/cm$^2$, the area specific capacity falls off much more gradually than for the batteries in Comp Ex 1 and Comp Ex 2.

Example 5

An electrochemical half cell Example 5 (also referred to as "Ex 5") was prepared using a semi-solid cathode and a lithium metal anode. The cathode slurry was prepared by mixing a 55 vol % Li(Ni,Mn,Co)O$_2$ and 4 vol % carbon additive with an ethylene carbonate/dimethyl carbonate/LiPF$_6$ based electrolyte. The cathode slurry was prepared using a batch mixer fitted with, roller blades. Mixing was performed at 100 rpm for about 4 minutes. The cathode slurry was formed into an about 250 μm thick semi-solid cathode which was tested against the Li metal anode in a Swagelok cell configuration. The cell was tested using a Maccor battery tester and was cycled over a voltage range of 2-4.3 V. The cell was charged using a CC-CV procedure with the constant current portion being at C/10 and C/8 rate for the first two cycles than at C/5 rate for later cycles. The constant current charge step was followed by a constant voltage hold at 4.2 V until the charging current decreased to less than C/20. The cell was discharged over a range of current densities. As shown in FIG. 20, at C-rates below C/4 the Ex 5 battery had an area specific capacity of greater than about 9.5 mAh/cm$^2$, much greater than for the Comp Ex 1 and Comp Ex 2 batteries. At C/2 rate, corresponding to a current density of about 4.5 mA/cm$^2$, the Ex 5 battery had an area, specific capacity of greater than 8 mAh/cm$^2$. At 1 C rate, corresponding to a current density of about 7 mA/cm$^2$, the area specific capacity was about 7 mAh/cm$^2$. Moreover, with increasing current density beyond about 6 mA/cm$^2$, the area specific capacity falls of much, more gradually than the Comp Ex 1 and the Comp Ex 2 batteries.

Example 6

An electrochemical half cell Example 6 (also referred, to as "Ex 6") was prepared using a semi-solid cathode and a lithium metal anode. The cathode slurry was prepared by mixing a 60 vol % Li(Ni,Mn,Co)O$_2$ and 2 vol % carbon additive with an ethylene carbonate/dimethyl carbonate/

LiPF$_6$ based electrolyte. The cathode slurry was prepared using a batch mixer fitted with roller blades. Mixing was performed at 100 rpm for about 4 minutes. The cathode slurry was formed into an about 250 μm thick semi-solid which was tested against the Li metal anode in a Swagelok cell configuration. The cell was tested using a Maccor battery tester and was cycled over a voltage range of 2-4.3 V, The Ex 6 cell was charged using a CC-CV procedure with the constant current portion being at C/10 and C/8 rate for the first two cycles than at C/5 rate for later cycles. The constant current charge step was followed by a constant voltage hold at 4.2 V until the charging until the charging current decreased to less than C/20. The cell was discharged over a range of current density. As shown in FIG. 20, at C-rates below C/4 the Ex 6 battery had an area specific capacity of greater than about 11.5 mAh/cm$^2$, much greater than for the Comp Ex 1 and Comp Ex 2 batteries. At C/2 rate, corresponding to a current density of about 4.5 mA/cm$^2$, the Ex 6 battery had an area specific capacity of greater than about 9 mAh/cm$^2$. At 1 C rate, corresponding to a current density of about 7.5 mA/cm$^2$, the area specific capacity was about 7 mAh/cm$^2$. Moreover, with increasing current density beyond about 6 mA/cm$^2$, the area specific capacity tails of much more gradually than the Comp Ex 1 and the Comp Ex 2 batteries.

Example 7

An electrochemical full cell Example 7 (also referred to as "Ex 7") included a semi-solid cathode formulated, from 40 vol % LiFePO$_4$ such that the semi-solid cathode had a thickness of about 500 μm. The semi-solid cathode was tested against a semi-solid anode formulated from 35 vol % graphite and 2 vol % carbon additive such that the anode had a thickness of about 500 μm. The LFP semi-solid cathode was prepared by mixing 40 vol % LFP and 2 vol % carbon additive with an ethylene carbonate/dimethyl carbonate/LiPF$_6$ based electrolyte. The cathode slimy was prepared using a batchmixer fitted with roller blades. Mixing was performed at 100 rpm for about 4 minutes. The graphite semi-solid anode was prepared by mixing 40 vol % graphite and 2 vol % carbon black using the same electrolyte as the cathode. The anode slurry formulation was mixed at 100 rpm for about 30 seconds to yield a semi-solid anode suspension. The Ex 7 electrochemical cell had active areas for both, cathode and anode of approximately 80 cm$^2$. The electrochemical full cell Ex 7 was charged using a CC-CV procedure and a constant current, discharge was performed between 2.0-3.9 V using a Maccor tester. The cell was discharged over a range of current densities. As shown in FIG. 20 at C-rates below C/4, the Ex 7 battery had an area specific capacity of greater than about 9 mAh/cm$^2$, much greater than for the batteries in Comp Ex 1 and Comp Ex 2. At C/2 rate, corresponding to a current density of about 4 mA/cm$^2$, the Ex 7 battery had an areal capacity of greater than about 8 mAh/cm$^2$. At 1 C rate, corresponding to a current density of about 6 mA/cm$^2$, the area specific capacity is about 6 mAh/cm$^2$. At these C-rates, the area specific capacity is higher than for the batteries in Comp Ex 1 and Comp Ex 2. Moreover, with increasing current density beyond about 6 mA/cm$^2$, the area specific capacity fails off much more gradually than for the batteries in Comp Ex 1 and Comp Ex 2.

Example 8

An electrochemical full cell Example 8 (also referred to as "Ex 8") included a semi-solid cathode formulated from 45 vol % LiFePO$_4$ such that the semi-solid cathode had a thickness of about 330 μm. The semi-solid cathode was tested against a semi-solid anode formulated from 40 vol % graphite and 2 vol % carbon additive such that the anode had a thickness of about 500 μm. The LFP semi-solid cathode was prepared by mixing 45 vol % LFP and 1.9 vol % carbon additive with an ethylene carbonate/dimethyl carbonate/LiPF$_6$ based electrolyte. The cathode slurry was prepared using a batchmixer fitted with roller blades. Mixing was performed at 100 rpm for about 25 minutes. The graphite semi-solid anode was prepared by mixing 40 vol % graphite and 2 vol % carbon black using the same electrolyte as the cathode. The anode slurry formulation was mixed at 100 rpm for about 30 seconds to yield a semi-solid anode suspension. The Ex 8 electrochemical cell had active areas for both cathode and anode of approximately 80 cm$^2$. The electrochemical full cell fix 8 was charged using a CC-CV procedure. A constant current discharge was performed between 2.0-3.9 V using a Maccor tester. The cell was discharged over a range of current densities. As shown in FIG. 20, at C-rates below C/4, the Ex 8 battery had an area specific capacity of about 9 mAh/cm$^2$, much greater than for the batteries in Comp Ex 1 and Comp Ex 2.

Example 9

An electrochemical full cell Example 9 (also referred to as "Ex 9") included a semi-solid cathode formulated from 45 vol % LiFePO$_4$ such that the semi-solid cathode had a thickness of about 470 μm. The semi-solid cathode was tested against a semi-solid anode formulated from 40 vol % graphite and 2 vol % carbon additive such that the anode had a thickness of about 500 μm. The LFP semi-solid cathode was prepared by mixing 45 vol % LFP and 2 vol % carbon additive with an ethylene carbonate/dimethyl carbonate/LiPF$_6$ based electrolyte. The cathode slurry was prepared using a batchmixer fitted with roller blades. Mixing was performed at 100 rpm for about 25 minutes. The graphite semi-solid anode was prepared by mixing 40 vol % graphite and 2 vol % carbon black using the same electrolyte as the cathode. The anode slurry formulation was mixed at 100 rpm for about 30 seconds to yield a semi-solid anode suspension. The Ex 9 electrochemical cell had active areas for both cathode and anode of approximately 80 cm$^2$. The electrochemical full cell Ex 9 was charged using a CC-CV procedure and a constant current discharge between 2.0-3.9 V using a Maccor tester. The cell was discharged over a range of current densities. As shown in FIG. 20, at C-rates below C/4, the Ex 9 battery had an area specific capacity of greater than about 11.5 mAh/cm$^2$, much greater than, for the batteries in Comp Ex 1 and Comp Ex 2.

Example 10

An electrochemical full cell Example 10 (also referred to as "Ex 10") included a semi-solid cathode formulated from 45 vol % LiFePO$_4$ such that, the semi-solid cathode had a thickness of about 500 μm. The semi-solid cathode was tested against a semi-solid anode formulated from 40 vol % graphite and 1.5 vol % carbon additive such that the anode had a thickness of about 500 μm. The LFP semi-solid cathode was prepared by mixing 45 vol % LFP and 2 vol % carbon additive with an ethylene carbonate/dimethyl carbonate/LiPF$_6$ based electrolyte. The cathode slurry was prepared using a high speed blade mixer. Mixing was performed for about 15 seconds until the semi-solid cathode slurry was homogeneous. The graphite semi-solid anode was prepared by mixing 40 vol % graphite and 1.5 vol % carbon black using the same electrolyte as the cathode. The anode slurry formulation was also mixed in the high speed blade mixer for about 15 seconds until homogeneous. The Ex 10 electrochemical cell had active areas for both cathode and anode of approximately 80 cm$^2$. The electrochemical full cell Ex 10 was charged using a CC-CV procedure and a constant current discharge between 2.0-3.9 V using a Maccor tester. The cell was discharged over a range of current densities. As shown in FIG. 20, at C-rates below C/4, the Ex 10 battery had an area specific capacity of greater than about 11 mAh/cm$^2$, much greater than for the batteries in Comp Ex 1 and Comp Ex 2.

Example 11

An electrochemical full cell Example 11 (also referred to as "Ex 11") included a semi-solid cathode formulated from 50 vol % LiFePO4 such that the semi-solid cathode had a thickness of about 454 μm. The semi-solid cathode was tested against a semi-solid anode formulated from 50 vol % graphite and 2 vol % carbon additive such that the anode had a thickness of about 386 μm. The LFP semi-solid cathode was prepared by mixing 50 vol % LFP and 0.8 vol % carbon additive with an ethylene carbonate/dimethyl carbonate/ LiPF$_6$ based electrolyte. The cathode slurry was prepared using a centrifugal planetary mixer at 1250 rpm for 90 seconds. The graphite semi-solid anode was prepared by mixing 50 vol % graphite and 2 vol % carbon black using the same electrolyte as the cathode. The anode slurry formulation was prepared using a centrifugal planetary mixer at 650 rpm for about 5 minutes. The Ex 11 electrochemical cell had active areas for both cathode and anode of approximately 80 cm$^2$. The electrochemical full cell. Ex 11 was charged using a CC-CV procedure and a constant, current discharge was performed between 2.0-3.9 V using a Maccor tester. As shown in FIG. 20 at C-rates below C/4, the Ex 11 battery had an area specific capacity of greater than about 10 mAh/cm$^2$, much greater than for the batteries in Comp Ex 1 and Comp Ex 2.

Example 12

An electrochemical full cell Example 12 (also referred to as "Ex 12") included a semi-solid cathode formulated from 60 vol % LiCoO$_2$ such that the semi-solid cathode had a thickness of about 408 μm. The semi-solid cathode was tested against a semi-solid anode formulated from 67 vol % graphite and 2 vol % carbon additive such that the anode had a thickness of about 386 μm. The semi-solid cathode was prepared by mixing 60 vol % LiCoO$_2$ and 0.9 vol % carbon additive with an ethylene carbonate/dimethyl carbonate/ LiPF$_6$ based electrolyte. The cathode slurry was prepared using a centrifugal planetary mixer at 1300 rpm for 90 seconds. The graphite semi-solid anode was prepared by mixing 67 vol % graphite and 2 vol % carbon black using the same electrolyte as the cathode. The anode slurry formulation was prepared using a centrifugal planetary mixer at 1300 rpm for about 90 seconds. The Ex 12 electrochemical cell had active areas for both cathode and anode of approximately 80 cm$^2$. The electrochemical full cell Ex 12 was charged using a CC-CV procedure and a constant current discharge was performed between 2.75-4.1 V using a Maccor tester. As shown in FIG. 20 at C-rates below C/10, the Ex 12 battery had an area specific capacity of greater than about 12 mAh/cm$^2$, much greater than for the batteries in Comp Ex 1 and Comp Ex 2.

FIG. 20 shows that each of Ex 1 to Ex 12 electrochemical cells have a substantially superior area specific capacity relative to Comp Ex 1 and Comp Ex 2 at C-rates up to about 2 C. Furthermore, at very high C-rates, for example, C-rates greater than 2 C, these electrochemical cells that include semi-solid electrodes still have an area specific capacity superior to Comp Ex 1 and Comp Ex 2. For example, above about 10 mA/cm$^2$ current density, the area specific capacity of each of Comp Ex 1 and Comp Ex 2 is about 0 mAh/cm$^2$, which means that no current can be drawn from the battery. In contrast, each of the Ex 1 to Ex 12 cells still retain a substantial portion of the their theoretical area specific capacity at the 10 mA/cm$^2$ current density. Particularly the Ex 4 cell still had about 5 mAh/cm$^2$ charge capacity at the 10 mA/cm$^2$ current density corresponding to about 2 C rate, which is about 50% of the area specific capacity seen at the C/2 C-rate. Therefore, electrochemical cells that include semi-solid electrodes described herein can have a higher area specific capacity than conventional electrochemical cells, and can also be discharged at high C-rates while maintaining a significant percentage of their area specific capacity.

While various embodiments of the system, methods and devices have been described above, it should be understood that they have been presented by way of example only, and not limitation. Where methods and steps described above indicate certain events occurring in certain order, those of ordinary skill in the art having the benefit, of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. An electrochemical cell, comprising:
   an anode; and
   a cathode;
   wherein at least one of the anode and the cathode is a slurry electrode that includes about 35% to about 75% by volume of an active material and a conductive carbon in an electrolyte,
   wherein the electrochemical cell has an area specific capacity of at least 7 mAh/cm$^2$ at a C-rate of C/4, and
   wherein the electrolyte is a liquid at room temperature.

2. The electrochemical cell of claim 1, wherein the conductive carbon includes at least one of graphite, carbon powder, pyrolytic carbon, carbon black, carbon fibers, carbon microfibers, carbon nanotubes, single walled carbon nanotubes, multi walled carbon nanotubes fullerene carbons, graphene sheets, and an aggregate of graphene sheets.

3. The electrochemical cell of claim 1, wherein the conductive carbon is about 0.5% to about 8% by volume.

4. The electrochemical cell of claim 1, wherein the electrolyte is non-aqueous.

5. The electrochemical cell of claim 1, wherein the slurry electrode has a thickness of at least about 250 μm.

6. The electrochemical cell of claim 1, wherein the slurry electrode has a thickness of at least about 400 μm.

7. The electrochemical cell of claim 1, wherein the active material includes an ordered rocksalt compound including at least one of LiCoO$_2$, LiCoO$_2$ doped with Mg, LiNiO$_2$, Li(Ni, Co, Al)O$_2$, and Li(Ni, Mn, Co)O$_2$.

8. The electrochemical cell of claim 1, wherein the electrochemical cell has an area specific capacity of at least 7 mAh/cm$^2$ at a C-rate of C/2.

9. An electrochemical cell, comprising:
an anode;
a cathode; and
a separator,
wherein at least one of the anode and the cathode is a slurry electrode that includes about 35% to about 75% by volume of an active material and a conductive carbon in an electrolyte,
wherein the electrochemical cell has an area specific capacity of at least 7 mAh/cm$^2$ at a C-rate of C/4, and
wherein the electrolyte is a liquid at room temperature.

10. The electrochemical cell of claim 9, wherein the active material includes an ordered rocksalt compound.

11. The electrochemical cell of claim 10, wherein the ordered rocksalt compound includes at least one of LiCoO$_2$, LiCoO$_2$ doped with Mg, LiNiO$_2$, Li(Ni, Co, Al)O$_2$, and Li(Ni, Mn, Co)O$_2$.

12. The electrochemical cell of claim 9, wherein the active material includes an olivine compound.

13. The electrochemical cell of claim 12, wherein the olivine compound includes LiMPO$_4$, wherein M is at least one of Mn, Fe, Co, and Ni.

14. The electrochemical cell of claim 9, wherein the conductive carbon is about 0.5% to about 8% by volume.

15. The electrochemical cell of claim 9, wherein the electrochemical cell has an area specific capacity of at least 7 mAh/cm$^2$ at a C-rate of C/2.

16. An electrochemical cell, comprising:
an anode; and
a slurry cathode including about 20% to about 75% by volume of an active material, 0.5% to about 8% by volume of a conductive material, and an electrolyte; and
wherein the cathode is a slurry electrode,
wherein the electrochemical cell has an area specific capacity of at least 7 mAh/cm$^2$ at a C-rate of C/4, and
wherein the electrolyte is a liquid at room temperature.

17. The electrochemical cell of claim 16, wherein the electrochemical cell has an area specific capacity of at least 8 mAh/cm$^2$ at a C-rate of C/2.

18. The electrochemical cell of claim 16, wherein the electrochemical cell has an area specific capacity of at least 9 mAh/cm$^2$ at a C-rate of C/2.

19. The electrochemical cell of claim 16, wherein the electrochemical cell has an area specific capacity of at least 10 mAh/cm$^2$ at a C-rate of C/2.

20. The electrochemical cell of claim 16, wherein the active material is about 35% to about 75% by volume.

21. The electrochemical cell of claim 16, wherein the active material is about 45% to about 75% by volume.

22. The electrochemical cell of claim 16, wherein the conductive material is a conductive carbon.

23. The electrochemical cell of claim 16, wherein the electrochemical cell has an area specific capacity of at least 7 mAh/cm$^2$ at a C-rate of C/2.

* * * * *